United States Patent
Loveridge et al.

(10) Patent No.: US 9,853,292 B2
(45) Date of Patent: Dec. 26, 2017

(54) ELECTRODE COMPOSITION FOR A SECONDARY BATTERY CELL

(71) Applicant: NEXEON LIMITED, Abingdon, Oxfordshire (GB)

(72) Inventors: Melanie J. Loveridge, Oxfordshire (GB); Michael Jonathan Lain, Oxfordshire (GB); Fazil Coowar, Hampshire (GB); Mamdouh Elsayad Abdelsalam, Hampshire (GB)

(73) Assignee: Nexeon Limited, Abingdon, Oxfordshire (GB)

( * ) Notice: Subject to any disclaimer, the term of this patent is extended or adjusted under 35 U.S.C. 154(b) by 250 days.

(21) Appl. No.: 14/353,730

(22) PCT Filed: Oct. 26, 2012

(86) PCT No.: PCT/GB2012/052671
§ 371 (c)(1),
(2) Date: Apr. 23, 2014

(87) PCT Pub. No.: WO2013/061079
PCT Pub. Date: May 2, 2013

(65) Prior Publication Data
US 2014/0335410 A1  Nov. 13, 2014

Related U.S. Application Data

(63) Continuation-in-part of application No. 13/286,864, filed on Nov. 1, 2011, which is a continuation-in-part
(Continued)

(30) Foreign Application Priority Data

May 11, 2009 (GB) .................................... 0908088.8
Oct. 26, 2011 (GB) .................................... 1118508.9

(51) Int. Cl.
*H01M 4/62* (2006.01)
*H01M 4/13* (2010.01)
(Continued)

(52) U.S. Cl.
CPC ............. *H01M 4/622* (2013.01); *H01M 4/13* (2013.01); *H01M 4/362* (2013.01); *H01M 4/386* (2013.01); *H01M 4/587* (2013.01); *H01M 10/052* (2013.01)

(58) Field of Classification Search
CPC .................................................... H01M 4/622
See application file for complete search history.

(56) References Cited

U.S. PATENT DOCUMENTS 3,351,445 A   11/1967   Fielder et al.
4,002,541 A    1/1977   Streander
(Continued)

FOREIGN PATENT DOCUMENTS

CN     1821446 A    8/2006
CN   101266919 A    9/2008
(Continued)

OTHER PUBLICATIONS

Badel et al., "Formation of Ordered Pore Arrays at the Nanoscale by Electrochemical Etching of N-Type Silicon", Superlattices and Microstructures, 36 (2004) 245-253.
(Continued)

*Primary Examiner* — Sarah A Slifka
*Assistant Examiner* — Brian Ohara
(74) *Attorney, Agent, or Firm* — McDonnell Boehnen Hulbert & Berghoff LLP

(57) ABSTRACT

Disclosed are a composite electrode material for a rechargeable battery; a method of making a composite electrode material; an electrode including the composite electrode material; cells including such electrodes; and devices includ-
(Continued)

ing the cells. A composite electrode material for a rechargeable battery cell includes an electroactive material; and a polymeric binder including pendant carboxyl groups. The electroactive material includes one or more components selected from the group including an electroactive metal, an electroactive semi-metal, an electroactive ceramic material, an electroactive metalloid, an electroactive semi-conductor, an electroactive alloy of a metal, an electroactive alloy of a semi-metal and an electroactive compound of a metal or a semi-metal. The polymeric binder has a molecular weight in the range 300,000 to 3,000,000. 40 to 90% of the carboxyl groups of the binder are in the form of a metal ion carboxylate salt.

28 Claims, 8 Drawing Sheets

Related U.S. Application Data of application No. PCT/GB2010/000923, filed on May 7, 2010.

(51) Int. Cl.
  *H01M 4/36* (2006.01)
  *H01M 4/38* (2006.01)
  *H01M 4/587* (2010.01)
  *H01M 10/052* (2010.01)

(56) References Cited

U.S. PATENT DOCUMENTS

| | | | |
|---|---|---|---|
| 4,436,796 A | 3/1984 | Huggins et al. | |
| 4,614,696 A | 9/1986 | Ito et al. | |
| 4,950,566 A | 8/1990 | Huggins et al. | |
| 5,260,148 A | 11/1993 | Idota | |
| 5,262,021 A | 11/1993 | Lehmann et al. | |
| 5,660,948 A | 8/1997 | Barker | |
| 5,907,899 A | 6/1999 | Dahn et al. | |
| 5,980,722 A | 11/1999 | Kuroda et al. | |
| 5,989,339 A * | 11/1999 | Tamamura | C30B 23/02 117/107 |
| 6,022,640 A | 2/2000 | Takada et al. | |
| 6,042,969 A | 3/2000 | Yamada et al. | |
| 6,063,995 A | 5/2000 | Bohland et al. | |
| 6,235,427 B1 | 5/2001 | Idota et al. | |
| 6,296,969 B1 | 10/2001 | Yano et al. | |
| 6,334,939 B1 | 1/2002 | Zhou et al. | |
| 6,337,156 B1 | 1/2002 | Narang et al. | |
| 6,353,317 B1 | 3/2002 | Green et al. | |
| 6,399,177 B1 | 6/2002 | Fonash et al. | |
| 6,399,246 B1 | 6/2002 | Vandayburg et al. | |
| 6,589,696 B2 | 7/2003 | Matsubara et al. | |
| 6,605,386 B1 | 8/2003 | Kasamatsu et al. | |
| 6,620,547 B1 | 9/2003 | Sung et al. | |
| 6,887,511 B1 | 5/2005 | Shima et al. | |
| 6,916,679 B2 | 7/2005 | Snyder et al. | |
| 7,033,936 B1 | 4/2006 | Green | |
| 7,051,945 B2 | 5/2006 | Empedocles et al. | |
| 7,070,632 B1 | 7/2006 | Visco et al. | |
| 7,094,499 B1 | 8/2006 | Hung | |
| 7,147,894 B2 | 12/2006 | Zhou et al. | |
| 7,192,673 B1 | 3/2007 | Ikeda et al. | |
| 7,298,017 B1 * | 11/2007 | Liu | F03G 7/005 257/415 |
| 7,311,999 B2 | 12/2007 | Kawase et al. | |
| 7,318,982 B1 | 1/2008 | Gozdz et al. | |
| 7,348,102 B2 | 3/2008 | Li et al. | |
| 7,358,011 B2 | 4/2008 | Fukuoka et al. | |
| 7,378,041 B2 | 5/2008 | Asao et al. | |
| 7,425,285 B2 | 9/2008 | Asao et al. | |
| 7,476,469 B2 | 1/2009 | Ota et al. | |
| 7,569,202 B2 | 8/2009 | Farrell et al. | |
| 7,659,034 B2 | 2/2010 | Minami et al. | |
| 7,674,552 B2 | 3/2010 | Nakai et al. | |
| 7,767,346 B2 | 8/2010 | Kim et al. | |
| 7,862,933 B2 | 1/2011 | Okumura et al. | |
| 8,034,485 B2 | 10/2011 | Dahn et al. | |
| 8,597,831 B2 | 12/2013 | Green et al. | |
| 2001/0023986 A1 | 9/2001 | Mancevski | |
| 2002/0086211 A1 | 7/2002 | Umeno et al. | |
| 2002/0148727 A1 | 10/2002 | Zhou et al. | |
| 2003/0135989 A1 | 7/2003 | Huggins et al. | |
| 2004/0072067 A1 | 4/2004 | Minami et al. | |
| 2004/0126659 A1 | 7/2004 | Graetz et al. | |
| 2004/0151987 A1 | 8/2004 | Kawase et al. | |
| 2004/0166319 A1 | 8/2004 | Li et al. | |
| 2004/0185346 A1 | 9/2004 | Takeuchi et al. | |
| 2004/0197660 A1 | 10/2004 | Sheem et al. | |
| 2004/0214085 A1 | 10/2004 | Sheem et al. | |
| 2004/0224231 A1 | 11/2004 | Fujimoto et al. | |
| 2004/0241548 A1 | 12/2004 | Nakamoto et al. | |
| 2005/0042515 A1 | 2/2005 | Hwang et al. | |
| 2005/0079414 A1 | 4/2005 | Yamamoto et al. | |
| 2005/0079420 A1 | 4/2005 | Cho et al. | |
| 2005/0118503 A1 | 6/2005 | Honda et al. | |
| 2005/0191550 A1 | 9/2005 | Satoh et al. | |
| 2005/0193800 A1 | 9/2005 | DeBoer et al. | |
| 2005/0214644 A1 | 9/2005 | Aramata et al. | |
| 2006/0003226 A1 | 1/2006 | Sawa et al. | |
| 2006/0019115 A1 | 1/2006 | Wang et al. | |
| 2006/0019168 A1 | 1/2006 | Li et al. | |
| 2006/0024582 A1 | 2/2006 | Li et al. | |
| 2006/0040182 A1 | 2/2006 | Kawakami et al. | |
| 2006/0051670 A1 | 3/2006 | Aramata et al. | |
| 2006/0057463 A1 | 3/2006 | Gao et al. | |
| 2006/0088767 A1 | 4/2006 | Li et al. | |
| 2006/0097691 A1 | 5/2006 | Green | |
| 2006/0127773 A1 * | 6/2006 | Kawakami | H01M 4/134 429/245 |
| 2006/0134516 A1 | 6/2006 | Im et al. | |
| 2006/0134518 A1 | 6/2006 | Kogetsu et al. | |
| 2006/0147800 A1 | 7/2006 | Sato et al. | |
| 2006/0154071 A1 | 7/2006 | Homma et al. | |
| 2006/0166093 A1 | 7/2006 | Zaghib et al. | |
| 2006/0175704 A1 | 8/2006 | Shimizu et al. | |
| 2006/0257307 A1 | 11/2006 | Yang | |
| 2006/0263687 A1 | 11/2006 | Leitner et al. | |
| 2006/0263688 A1 * | 11/2006 | Guyomard | H01G 11/38 429/217 |
| 2006/0275663 A1 | 12/2006 | Matsuno et al. | |
| 2006/0275668 A1 | 12/2006 | Peres et al. | |
| 2006/0286448 A1 | 12/2006 | Snyder et al. | |
| 2006/0286458 A1 | 12/2006 | Sato et al. | |
| 2007/0002613 A1 | 1/2007 | Rahman et al. | |
| 2007/0003835 A1 | 1/2007 | Hasegawa et al. | |
| 2007/0026313 A1 | 2/2007 | Sano | |
| 2007/0031733 A1 | 2/2007 | Kogetsu et al. | |
| 2007/0037063 A1 | 2/2007 | Choi et al. | |
| 2007/0048609 A1 | 3/2007 | Ueda | |
| 2007/0059598 A1 | 3/2007 | Yang | |
| 2007/0065720 A1 | 3/2007 | Hasegawa et al. | |
| 2007/0072074 A1 | 3/2007 | Yamamoto et al. | |
| 2007/0087268 A1 | 4/2007 | Kim et al. | |
| 2007/0092796 A1 * | 4/2007 | Matsuda | H01M 4/38 429/217 |
| 2007/0099084 A1 | 5/2007 | Huang et al. | |
| 2007/0099085 A1 | 5/2007 | Choi et al. | |
| 2007/0105017 A1 | 5/2007 | Kawase et al. | |
| 2007/0117018 A1 | 5/2007 | Huggins | |
| 2007/0122702 A1 | 5/2007 | Sung et al. | |
| 2007/0148544 A1 | 6/2007 | Le | |
| 2007/0172732 A1 | 7/2007 | Jung et al. | |
| 2007/0184345 A1 | 8/2007 | Neudecker et al. | |
| 2007/0190413 A1 | 8/2007 | Lee et al. | |
| 2007/0202395 A1 | 8/2007 | Snyder et al. | |
| 2007/0202402 A1 | 8/2007 | Asahina et al. | |
| 2007/0207080 A1 | 9/2007 | Yang | |
| 2007/0207385 A1 | 9/2007 | Liu et al. | |
| 2007/0209584 A1 | 9/2007 | Kalynushkin et al. | |
| 2007/0212538 A1 | 9/2007 | Niu | |

(56) References Cited

U.S. PATENT DOCUMENTS

| | | |
|---|---|---|
| 2007/0218366 A1 | 9/2007 | Kalynushkin et al. |
| 2007/0224508 A1 | 9/2007 | Aramata et al. |
| 2007/0224513 A1 | 9/2007 | Kalynushkin et al. |
| 2007/0238021 A1 | 10/2007 | Liu et al. |
| 2007/0243469 A1 | 10/2007 | Kim et al. |
| 2007/0264564 A1 | 11/2007 | Johnson et al. |
| 2007/0264574 A1 | 11/2007 | Kim et al. |
| 2007/0269718 A1 | 11/2007 | Krause et al. |
| 2007/0277370 A1 | 12/2007 | Kalynushkin et al. |
| 2008/0003496 A1 | 1/2008 | Neudecker et al. |
| 2008/0003503 A1 | 1/2008 | Kawakami et al. |
| 2008/0020281 A1 | 1/2008 | Kogetsu et al. |
| 2008/0038638 A1 | 2/2008 | Zhang et al. |
| 2008/0090149 A1 | 4/2008 | Sano et al. |
| 2008/0096110 A1 | 4/2008 | Bito et al. |
| 2008/0107967 A1 | 5/2008 | Liu et al. |
| 2008/0113271 A1 | 5/2008 | Ueda et al. |
| 2008/0118834 A1 | 5/2008 | Yew et al. |
| 2008/0124631 A1 | 5/2008 | Fukui et al. |
| 2008/0131782 A1 | 6/2008 | Hagiwara et al. |
| 2008/0138710 A1 | 6/2008 | Liaw et al. |
| 2008/0138716 A1 | 6/2008 | Iwama et al. |
| 2008/0145752 A1 | 6/2008 | Hirose et al. |
| 2008/0145759 A1 | 6/2008 | Sung et al. |
| 2008/0160415 A1 | 7/2008 | Wakita et al. |
| 2008/0176139 A1 | 7/2008 | White et al. |
| 2008/0187836 A1 | 8/2008 | Sakaguchi et al. |
| 2008/0187838 A1 | 8/2008 | Le |
| 2008/0206631 A1 | 8/2008 | Christensen et al. |
| 2008/0206641 A1 | 8/2008 | Christensen et al. |
| 2008/0233479 A1 | 9/2008 | Sung et al. |
| 2008/0233480 A1 | 9/2008 | Sung et al. |
| 2008/0241647 A1 | 10/2008 | Fukui et al. |
| 2008/0241703 A1 | 10/2008 | Yamamoto et al. |
| 2008/0248250 A1 | 10/2008 | Flemming et al. |
| 2008/0261112 A1 | 10/2008 | Nagata et al. |
| 2008/0286653 A1 | 11/2008 | Sano et al. |
| 2008/0305391 A1 | 12/2008 | Hirose et al. |
| 2009/0053589 A1 | 2/2009 | Obrovac et al. |
| 2009/0078982 A1 | 3/2009 | Rachmady et al. |
| 2009/0087731 A1 | 4/2009 | Fukui et al. |
| 2009/0101865 A1 | 4/2009 | Matsubara et al. |
| 2009/0117466 A1 | 5/2009 | Zhamu |
| 2009/0123840 A1 | 5/2009 | Shirane |
| 2009/0162750 A1 | 6/2009 | Kawakami et al. |
| 2009/0186267 A1 | 7/2009 | Tiegs |
| 2009/0239151 A1 | 9/2009 | Nakanishi et al. |
| 2009/0253033 A1 | 10/2009 | Hirose et al. |
| 2009/0269677 A1 | 10/2009 | Hirose et al. |
| 2009/0305129 A1 | 12/2009 | Fukui et al. |
| 2010/0009258 A1 | 1/2010 | Hasegawa et al. |
| 2010/0075217 A1 | 3/2010 | Yamamoto et al. |
| 2010/0085685 A1 | 4/2010 | Pinwill |
| 2010/0092868 A1 | 4/2010 | Kim et al. |
| 2010/0124707 A1 | 5/2010 | Hirose et al. |
| 2010/0136437 A1 | 6/2010 | Nishida et al. |
| 2010/0285358 A1 | 11/2010 | Cui et al. |
| 2010/0297502 A1 | 11/2010 | Zhu et al. |
| 2010/0330419 A1 | 12/2010 | Cui et al. |
| 2014/0087250 A1 | 3/2014 | Coowar et al. |

FOREIGN PATENT DOCUMENTS

| | | |
|---|---|---|
| CN | 101442124 A | 5/2009 |
| DE | 199 22 257 A1 | 11/2000 |
| DE | 103 47 570 A1 | 5/2005 |
| EP | 0 281 115 | 9/1988 |
| EP | 0 553 465 A1 | 8/1993 |
| EP | 0 820 110 A2 | 1/1998 |
| EP | 1 011 160 A1 | 6/2000 |
| EP | 0 936 687 B1 | 12/2001 |
| EP | 1 231 653 A1 | 8/2002 |
| EP | 1 231 654 A1 | 8/2002 |
| EP | 1 258 937 A1 | 11/2002 |
| EP | 1 083 614 B1 | 5/2003 |
| EP | 1 313 158 A2 | 5/2003 |
| EP | 1 335 438 A1 | 8/2003 |
| EP | 1 289 045 B1 | 3/2006 |
| EP | 1 657 769 A1 | 5/2006 |
| EP | 1 850 409 A1 | 10/2007 |
| EP | 1 771 899 B1 | 2/2008 |
| EP | 1 657 768 B1 | 5/2008 |
| EP | 2 058 882 | 5/2009 |
| EP | 2 204 868 A3 | 7/2010 |
| FR | 2 885 913 B1 | 8/2007 |
| GB | 0 980 513 | 1/1965 |
| GB | 1 014 706 | 12/1965 |
| GB | 2 395 059 A | 5/2004 |
| GB | 2 464 157 B | 1/2010 |
| GB | 2 464 158 | 4/2010 |
| JP | 02-209492 A | 8/1990 |
| JP | 06-283156 | 10/1994 |
| JP | 10-046366 | 2/1998 |
| JP | 10-083817 | 3/1998 |
| JP | 10-199524 | 7/1998 |
| JP | H11-176470 | 7/1999 |
| JP | 2000-003727 | 1/2000 |
| JP | 2000-173594 | 6/2000 |
| JP | 2000-348730 | 12/2000 |
| JP | 2000-348730 A | 12/2000 |
| JP | 2001-291514 | 10/2001 |
| JP | 2002-260637 | 9/2002 |
| JP | 2002-279974 A | 9/2002 |
| JP | 2002-313319 A | 10/2002 |
| JP | 2003-017040 | 1/2003 |
| JP | 2003-168426 | 6/2003 |
| JP | 04-607488 | 2/2004 |
| JP | 2004-071305 | 3/2004 |
| JP | 2004-095264 | 3/2004 |
| JP | 2004-214054 | 7/2004 |
| JP | 2004-281317 | 10/2004 |
| JP | 2004-296386 A | 10/2004 |
| JP | 2004-311429 | 11/2004 |
| JP | 2004-311429 A | 11/2004 |
| JP | 2004-533699 A | 11/2004 |
| JP | 2005-259635 | 9/2005 |
| JP | 2005-259635 A | 9/2005 |
| JP | 2005-310759 A | 11/2005 |
| JP | 2006-505901 A | 2/2006 |
| JP | 2006-276214 A | 10/2006 |
| JP | 2006-290938 A | 10/2006 |
| JP | 2006-335410 A | 12/2006 |
| JP | 2007080827 A | 3/2007 |
| JP | 2007-165079 A | 6/2007 |
| JP | 2006-196338 | 7/2007 |
| JP | 2008-034266 | 2/2008 |
| JP | 2008-186732 | 8/2008 |
| JP | 2008210618 A | 9/2008 |
| JP | 2008-234988 | 10/2008 |
| JP | 2008-235258 | 10/2008 |
| JP | 2008-235258 A | 10/2008 |
| JP | 2008277000 A | 11/2008 |
| JP | 2009523923 A | 6/2009 |
| JP | 2009-252348 A | 10/2009 |
| JP | 2010097761 | 4/2010 |
| JP | 2010192444 A | 9/2010 |
| JP | 5000787 B2 | 8/2012 |
| JP | 2013510405 A | 3/2013 |
| KR | 20050090218 A | 9/2005 |
| KR | 2007-023141 | 2/2007 |
| KR | 2007-0110569 A | 11/2007 |
| KR | 2008-038806 A | 5/2008 |
| NL | 1015956 | 8/2000 |
| SU | 471402 | 5/1975 |
| SU | 544019 | 1/1977 |
| WO | WO 99/33129 | 7/1999 |
| WO | WO 01/13414 A1 | 2/2001 |
| WO | WO 01/35473 A1 | 5/2001 |
| WO | WO 01/96847 A1 | 12/2001 |
| WO | WO 02/25356 A2 | 3/2002 |
| WO | WO 02/47185 A2 | 6/2002 |
| WO | WO 03/063271 A1 | 7/2003 |
| WO | WO 03/075372 A2 | 9/2003 |
| WO | WO 2004/042851 A2 | 5/2004 |

(56) References Cited

FOREIGN PATENT DOCUMENTS

| | | |
|---|---|---|
| WO | WO 2004/052489 A2 | 6/2004 |
| WO | WO 2004/083490 A2 | 9/2004 |
| WO | WO 2004/109839 A1 | 12/2004 |
| WO | WO 2005/011030 A1 | 2/2005 |
| WO | WO 2005/113467 A1 | 12/2005 |
| WO | WO 2005/119753 A2 | 12/2005 |
| WO | WO 2006/067891 A1 | 6/2006 |
| WO | WO 2006/073427 A2 | 7/2006 |
| WO | WO 2006/120332 A2 | 11/2006 |
| WO | WO 2007/044315 A1 | 4/2007 |
| WO | WO 2007/083152 A1 | 7/2007 |
| WO | WO 2007/083155 | 7/2007 |
| WO | WO 2007/114168 A1 | 10/2007 |
| WO | WO 2007/136164 A1 | 11/2007 |
| WO | WO 2008/029888 A1 | 3/2008 |
| WO | WO 2008/044683 A1 | 4/2008 |
| WO | WO 2008/072460 A1 | 6/2008 |
| WO | WO 2008/097723 A1 | 8/2008 |
| WO | WO 2008/139157 A1 | 11/2008 |
| WO | WO 2009/010757 | 1/2009 |
| WO | WO 2009/010758 | 1/2009 |
| WO | WO 2009/010759 | 1/2009 |
| WO | WO 2009/026466 | 2/2009 |
| WO | 2009/128589 | 10/2009 |
| WO | WO 2009/120404 A1 | 10/2009 |
| WO | WO 2009/128800 | 10/2009 |
| WO | WO 2010/040985 | 4/2010 |
| WO | WO 2010/040986 | 4/2010 |
| WO | WO 2010/060348 A1 | 6/2010 |
| WO | WO 2010/130975 A1 | 11/2010 |
| WO | WO 2010/130976 A1 | 11/2010 |

OTHER PUBLICATIONS

Barraclough et al., "Cold Compaction of Silicon Powders Without a Binding Agent", Materials Letters 61 (2007) 485-487.
Beaulieu et al., "Colossal Reversible Volume Changes in Lithium Alloys", Electrochemical and Solid-State Letters, 4 (9) (2001) A137-A140.
Beaulieu et al., "Reaction of Li with Grain-Boundary Atoms in Nanostructured Compounds", Journal of The Electrochemical Society, 147 (9) (2000) 3206-3212.
Besenhard et al., "Will Advanced Lithium-Alloy Anodes Have a Chance in Lithium-Ion Batteries?", Journal of Power Sources, 68 (1997) 87-90.
Boukamp et al., "All-Solid Lithium Electrodes with Mixed-Conductor Matrix", J. Electrochem. Soc.: Electrochemical Science and Technology, vol. 128, No. 4, (1981) 725-729.
Bourderau, et al., "Amorphous Silicon as a Possible Anode Material for Li-Ion Batteries", Journal of Power Sources, 81-82 (1999) 233-236.
Canham, L. T., "Diffusion of Li IN Si", Properties of Silicon, EMIS Datareviews Series No. 4 (1987) 454-462.
Chan et al., "Surface Chemistry and Morphology of the Solid Electrolyte Interphase on Silicon Nanowire Lithium-Ion Battery Anodes", Journal of Power Sources, 189(2), 1132-1140, (2009).
Chang et al., "Ultrafast Growth of Single-Crystalline Si Nanowires", Materials Letters, 60 (2006) 2125-2128.
Chen et al., Binder Effect on Cycling Performance of Silicon/Carbon Composite Anodes for Lithium Ion Batteries, 36 (2006) 1099-1104.
Chen et al., "Effect of Vinylene Carbonate (VC) as Electrolyte Additive on Electrochemical Performance of Si Film Anode for Lithium Ion Batteries", Journal of Power Sources, 174(2), 538-543, (2007).
Chen et al., "Selective Etching of Silicon in Aqueous Ammonia Solution", Sensors and Actuators, A 49 (1995) 115-121.
Chevrier et al., "Methods for Successful Cycling of Alloy Negative Electrodes in Li-Ion Cells", 220th ECS Meeting, Abstract #1237 (2011).

Choi et al., "Effect of Fluoroethylene Carbonate Additive on Interfacial Properties of Silicon Thin-Film Electrode", Journal of Power Sources, 161(2), 1254-1259 (2006).
Colinge, Jean-Pierre, "Silicon-on-Insulator Technology: Materials to VLSI", Chapter 2, SOI Materials, (1991), Cover page and p. 38.
Deal et al., "General Relationship for the Thermal Oxidation of Silicon", Journal of Applied Physics, vol. 36, No. 12, (Dec. 1965) 3770-3778.
De Angelis et al., "Water Soluble Nanoporous Nanoparticles for In Vivo Targeted Drug Deliver and Controlled Release in B Cells Tumor Context", Nanoscale, 1020, vol. 2, p. 2230-2236.
El Ouatani et al., "The Effect of Vinylene Carbonate Additive on Surface Film Formation on Both Electrodes in Li-Ion Batteries", J. Electrochem. Soc., 156(2), A103-A113 (2009).
Feng et al., "Lithography-Free Silicon Micro-Pillars as Catalyst Supports for Microfabricated Fuel Cell Applications", Electrochemistry Communications, 8 (2006) 1235-1238.
Garrido, et al., The Role of Chemical Species in the Passivation of <100> Silicon Surfaces by HF in Water-Ethanol Solutions, J. Electrochem Soc., vol. 143, No. 12, 1996, p. 4059-4066.
Green et al., "Mesoscopic Hemisphere Arrays for use as Resist in Solid State Structure Fabrication", J. Vac. Sci. Technol. B 17(5) (1999) 2074-2083.
Green et al., "Quantum Pillar Structures on n+ Gallium Arsenide Fabricated Using "Natural" Lithography", Appl. Phys. Lett., 62 (3) (1993) 264-266.
Green et al., "Structured Silicon Anodes for Lithium Battery Applications", Electrochemical and Solid-State Letters, 6 (5) (2003) A75-A79.
Han et al., "Neutralized Poly (Acrylic Acid) as Polymer Binder for High Capacity Silicon Negative Electrodes", 220th ECS Meeting, Abstract #1250 (2011).
Heinze et al., "Viscosity Behaviour of Multivalent Metal Ion-Containing Carboxymethyl Cellulose Solutions", Die Angewandte Makromolekulare Chamie 220, 123-132, (Nr. 3848), (1994).
Hochgatterer et al., "Silicon/Graphite Composite Electrodes for High Capacity Anodes: Influence of Binder Chemistry on Cycling Stability", Electrochemical and Solid-State Letters, 11 (5) (2008) A76-A80.
Huggins, Robert A., "Lithium Alloy Anodes" in Handbook of Battery Materials, J.O. Besenhard Ed., Wiley-VCH, Weinheim, 361-381 (1999).
Ivanovskaya et al., "The Effect of Treatment of Cation-Selective Glass Electrodes With AgNO3 Solution on Electrode Properties", Sensors and Actuators B 24-25 (1995) 304-308.
Jianfeng et al., "Large-Scale Array of Highly Oriented Silicon-Rich Micro/Nanowires Induced by Gas Flow Steering", Solid State Communications, 133 (2005) 271-275.
Kasavajjula et al., "Nano- and Bulk-Silicon-Based Insertion Anodes for Lithium-Ion Secondary Cells", Journal of Power Sources, 163 (2007) 1003-1039.
Key to Metal Aluminum-Silicon Alloys, www.keytometals.com/Article80.
Kim et al., "(110) Silicon Etching for High Aspect Ratio Comb Structures", 1997 6th International Conference on Emerging Technologies and Factory Automation Proceedings, (1997) 248-252.
Kim et al., "Improvement of Silicon Powder Negative Electrodes by Copper Electroless Deposition for Lithium Secondary Batteries", Journal of Power Sources, 147 (2005) 227-233.
Kleimann et al., "Formation of Wide and Deep Pores in Silicon by Electrochemical Etching", Materials Science and Engineering, B69-70 (2000) 29-33.
Kolasinski, Kurt W., "Silicon Nanostructures from Electroless Electrochemical Etching", Current Opinion in Solid State and Materials Science, 9 (2005) 73-83.
Komba et al., "Functional Interface of Polymer Modified Graphite Anode", Journal of Power Sources, 189, (2009), 197-203.
Komba et al., "Polyacrylate as Functional Binder for Silicon and Grapite Composite Electrode in Lithium-Ion Batteries", Electrochemistry, 79(1), (2010), 6-9.
Komba et al., "Polyacrylate Modifier for Graphite Anode of Lithium-Ion Batteries", Electrochemical and Solid-State Letters, 12(5), (2009), A107-A110.

(56) References Cited

OTHER PUBLICATIONS

Komba et al., "Study on Polymer Binders for High-Capacity SiO Negative Electrode of Li-Ion Batteries", Journal of Physical Chemistry, 115, (2011), 13487-13495.
Lang, Walter, "Silicon Microstructuring Technology", Materials Science and Engineering, R17 (1996) 1-55.
Lee et al., "Effect of Poly (Acrylic Acid) on Adhesion Strength and Electrochemical Performance of Natural Graphite Negative Electrode for Lithium-Ion Batteries", Journal of Power Sources, 161(1), (2006), 612-616.
Li et al., "A High Capacity Nano-Si Composite Anode Material for Lithium Rechargeable Batteries", Electrochemical and Solid-State Letters, 2 (11) (1999) 547-549.
Li et al., "Sodium Carboxymethyl Cellulose: A Potential Binder for Si Negative Electrodes for Li-Ion Batteries", Electrochemical and Solid-State Letters, 10(2) (2007), A17-A20.
Li et al., "The Crystal Structural Evolution of Nano-Si Anode Caused by Lithium Insertion and Extraction at Room Temperature", Solid State Ionics, 135 (2000) 181-191.
Liu et al., "A Novel Method of Fabricating Porous Silicon Material: Ultrasonically Enhanced Anodic Electrochemical Etching", Solid State Communications, 127 (2003) 583-588.
Liu et al., "Effect of Electrode Structure on Performance of Si Anode in Li-Ion Batteries: Si Particle Size and Conductive Additive", Journal of Power Source, 140 (2005) 139-144.
Liu et al., "Enhanced Cycle Life of Si Anode for Li-Ion Batteries by Using Modified Elastomeric Binder", Electrochemical and Solid-State Letters, 8(2) (2005), A100-A103.
Lu et al., "A Study of the Mechanisms of Erosion in Silicon Single Crystals Using Hertzian Fracture Tests", Wear, 186-187 (1995) 105-116.
Maranchi et al., "Interfacial Properties of the a-Si/Cu: Active-Inactive Thin-Film Anode Systems for Lithium-Ion Batteries", Journal of the Electrochemical Society: 153 (6) (2006) A1246-A1253.
Nakahata et al., "Fabrication of Lotus-Type Porous Silicon by Unidirectional Solidification in Hyrdogen", Materials Science and Engineering A 384 (2004) 373-376.
Niparko, J.K. (Editor), "Cochlear Implant Technology", Pub., Lippincott Williams and Wilkins, Philadelphia, (2000) 108-121.
Obrovac et al., "Structural Changes in Silicon Anodes During Lithium Insertion/Extraction", Electrochemical and Solid-State Letters, 7(5), (2004), A96-A96.
Ohara et al., "A Thin Film Silicon Anode for Li-Ion Batteries Having a Very Large Specific Capacity and Long Cycle Life", Journal of Power Sources, 136 (2004) 303-306.
Pei et al., "Silicon Nanowires Grown from Silicon Monoxide Under Hydrothermal Conditions", Journal of Crystal Growth, 289 (2006) 423-427.
Peng et al., "Dendrite-Assisted Growth of Silicon Nanowires in Electroless Metal Deposition", Adv. Funct. Mater., 13, No. 2 (2003) 127-132.
Peng et al., "Fabrication of Large-Area Silicon Nanowire p-n Junction Diode Arrays", Adv. Mater. (2004), vol. 16, No. 1, 73-76.
Peng et al., "Silicon Nanowires for Rechargeable Lithium-ion Battery Anodes", Applied Physics Letters (2008) vol. 93, No. 3, pp. 33105-1 to 33105-3.
Peng et al., "Simultaneous Gold Deposition and Formation of Silicon Nanowire Arrays", Journal of Electroanalytical Chemistry, 558 (2003) 35-39.
Peng et al., "Synthesis of Large-Area Silicon Nanowire Arrays via Self-Assembling Nanoelectrochemistry", Adv. Mater., 14, No. 16 (2002) 1164-1167.
Peng et al., "Uniform, Axial-Orientation Alignment of One-Dimensional Single-Crystal Silicon Nanostructure Arrays", Angew. Chem. Ind. Ed., 44 (2005) 2737-2742.
Peng, et al., "Fabrication of Single-Crystalline Silicon Nanowires by Scratching a Silicon Surface with Catalytic Metal Particles", Adv. Funct. Mater., 16 (2006), 387-394.
Peng, K. et al., "Metal-Particle-Induced, Highly Localized Site-Specific Etching of Si and Formation of Single-Crystalline Si Nanowires in Aqueous Fluoride Solution", Chemistry A European Journal 2006, 12, pp. 7942-7947 (2006).
Qiu et al., "From Si Nanotubes to Nanowires: Synthesis, Characterization, and Self-Assembly", Journal of Crystal Growth, 277 (2005) 143-148.
Qiu et al., "Self-Assembled Growth and Optical Emission of Silver-Capped Silicon Nanowires", Applied Physics Letters, vol. 84, No. 19, (2004) 3867-3869.
Russo, et al., "A Mechanical Approach to Porous Silicon Nanoparticles Fabrication", Materials 2011, vol. 4, p. 1023-1033.
Sharma et al., "Thermodynamic Properties of the Lithium-Silicon System", J. Electrochem. Soc.: Electrochemical Science and Technology, vol. 123 (1976) 1763-1768.
Shin et al., "Porous Silicon Negative Electrodes for Rechargeable Lithium Batteries", Journal of Power Sources, 139 (2005) 314-320.
Sugama, et al., "Nature of Interfacial Interaction Mechanisms Between Polyacrylic Acid Macromolecules and Oxide Metal Surfaces", Journal of Materials Science, 19 (1984) 4045-4056.
Takami et al., "Silicon Fiber Formed on Silicon Without Using a Gas Process", Journal of Applied Physics, vol. 91, No. 12, 2-5 (2002).
Tokoro et al., "Anisotropic Etching Properties of Silicon in KOH and TMAH Solutions", Proceedings of the 1998 International Symposium on Micromechatronics and Human Science (1998) 65-70.
Tsuchiya et al., "Structural Fabrication Using Cesium Chloride Island Arrays as a Resist in a Fluorocarbon Reactive Ion Etching Plasma", Electrochemical and Solid-State Letters, 3 (1) (2000) 44-46.
Ui et al., "Improvement of Electrochemical Characteristics of Natural Graphite Negative Electrode Coated With Polyacrylic Acid in Pure Propylene Carbonate Electrolyte", Journal of Power Sources, 173(1), (2007), 518-521.
Wagner et al., "Vapor-Liquid-Solid Mechanism of Single Crystal Growth", Applied Physics Letters, vol. 4, No. 5 (1964) 89-90.
Wen et al., "Chemical Diffusion in Intermediate Phases in the Lithium-Silicon System", Journal of Solid State Chemistry, 37 (1981) 271-278.
Weydanz et al., "A Room Temperature Study of the Binary Lithium-Silicon and the Ternary Lithium-Chromium-Silicon System for use in Rechargeable Lithium Batteries", Journal of Power Sources, 81-82 (1999) 237-242.
Winter, et al., "Insertion Electrode Materials for Rechargeable Lithium Batteries", Advanced Materials, 1998, 10, No. 10.
Wong et al., "Controlled Growth of Silicon Nanowires Synthesized Via Solid-Liquid-Solid Mechanism", Science and Technology of Advanced Materials, 6 (2005) 330-334.
Yabuuchi et al., "Graphite-Silicon-Polyacrylate Negative Electrodes in Ionic Liquid Electrolyte for Safer Rechargeable Li-Ion Batteries", Advanced Energy Materials, 1, (2011), 759-765.
Yan et al., "Growth of Amorphous Silicon Nanowires via a Solid-Liquid-Solid Mechanism", Chemical Physics Letters, 323 (2000) 224-228.
Yan et al., "$H_2$-Assisted Control Growth of Si Nanowires", Journal of Crystal Growth, 257 (2003) 69-74.
Ye et al., Controllable Growth of Silver Nanostructures by a Simple Replacement Reaction and Their SERS Studies, Solid State Sciences 11 (2009), p. 1088-1093.
Yoshio et al., "Electrochemical Behaviors of Silicon Based Anode Material", Journal of Power Sources, 153 (2006) 375-379.
Zhang et al., "A Review on Electrolyte Additives for Lithium-Ion Batteries", Journal of Power Sources, 162(2), 1379-1394, (2006).
Zhang et al., "Bulk-Quantity Si Nanowires Synthesized by SiO Sublimation", Journal of Crystal Growth, 212 (2000) 115-118.
Zhang et al., "Catalytic Growth of $^x$-$FiSi_2$ and Silicon Nanowires", Journal of Crystal Growth, 280 (2005) 286-291.
Zhang et al., "Synthesis of Thin Si Whiskers (Nanowires) Using $SiCl_4$", Journal of Crystal Growth, 2006 (2001) 185-191.
"Peng Yun, et al. "Comparative Analysis of Two Different Treatment Technology in PCB Spent Etching-Cyclic Regeneration Tech-

(56) References Cited

OTHER PUBLICATIONS nique and Copper Sulfate Processing Technique", Printed Circuit Information, No. 7, pp. 51-53, dated Jul. 10, 2007."
Office Action mailed Jun. 1, 2016 in U.S. Appl. No. 13/286,864.
Response filed with Request for Continued Examination and Declaration filed Feb. 18, 2016 in U.S. Appl. No. 13/286,864.
Interview Summary dated Dec. 16, 2015 in U.S. Appl. No. 13/286,864.
Office Action mailed Sep. 10, 2015 in U.S. Appl. No. 13/286,864.
Response filed with Request for Continued Examination and Declaration filed Mar. 31, 2016 in U.S. Appl. No. 13/286,864.
Office Action mailed Dec. 31, 2014 in U.S. Appl. No. 13/286,864.
Response filed Aug. 19, 2014 in U.S. Appl. No. 13/286,864.
Office Action mailed May 20, 2014 in U.S. Appl. No. 13/286,864.
Response filed Jan. 23, 2014 in U.S. Appl. No. 13/286,864.
Office Action mailed Oct. 23, 2013 in U.S. Appl. No. 13/286,864.
Appeal Brief filed Mar. 4, 2016 in U.S. Appl. No. 13/265,473.
Interview Summary mailed Oct. 2, 2015 in U.S. Appl. No. 13/265,473.
Office Action mailed Jul. 9, 2015 in U.S. Appl. No. 13/265,473.
Response filed Jun. 15, 2015 in U.S. Appl. No. 13/265,473.
Office Action mailed Mar. 17, 2015 in U.S. Appl. No. 13/265,473.
Advisory Action mailed Dec. 31, 2014 in U.S. Appl. No. 13/265,473.
Response filed with Request for Continued Examination filed Dec. 24, 2014 in U.S. Appl. No. 13/265,473.
Interview Summary mailed Nov. 21, 2014 in U.S. Appl. No. 13/265,473.
Office Action mailed Aug. 25, 2014 in U.S. Appl. No. 13/265,473.
Response filed Aug. 4, 2014 in U.S. Appl. No. 13/265,473.
Office Action mailed May 2, 2014 in U.S. Appl. No. 13/265,473.
Response filed with Request for Continued Examination filed Apr. 28, 2014 in U.S. Appl. No. 13/265,473.
Interview Summary mailed Mar. 4, 2014 in U.S. Appl. No. 13/265,473.
Response filed Feb. 26, 2014 in U.S. Appl. No. 13/265,473.
Office Action mailed Nov. 26, 2013 in U.S. Appl. No. 13/265,473.
Response filed Aug. 23, 2013 in U.S. Appl. No. 13/265,473.
Office Action mailed Apr. 23, 2013 in U.S. Appl. No. 13/265,473.
Response filed with Request for Continued Examination filed Apr. 15, 2013 in U.S. Appl. No. 13/265,473.
Office Action mailed Jan. 14, 2013 in U.S. Appl. No. 13/265,473.
Response filed Oct. 29, 2012 in U.S. Appl. No. 13/265,473.
Office Action mailed Jul. 31, 2012 in U.S. Appl. No. 13/265,473.
Advisory Action and Interview Summary mailed Mar. 10, 2014 in U.S. Appl. No. 13/265,473.
Response and Declaration Pursuant to 37 CFR 1.132 filed Aug. 31, 2016 in U.S. Appl. No. 13/286,864.
International Search Report for PCT/GB2010/000923 dated Jul. 20, 2010.
Written Opinion of the International Searching Authority for PCT/GB2010/000923 dated Jul. 20, 2010.
International Preliminary Report on Patentability for PCT/GB2010/000923 dated May 30, 2011.

* cited by examiner

ELECTRODE COMPOSITION FOR A SECONDARY BATTERY CELL

This application is the entry into the national phase of International Application No. PCT/GB2012/052671 which was filed on Oct. 26, 2012 and claims priority from British Application Serial No. 1118508.9 which was filed on Oct. 26, 2011. The instant application is also a continuation-in-part application of U.S. Ser. No. 13/286,864 which was filed on Nov. 1, 2011 and is still pending. That application, in turn, is a continuation-in-part application of International Application No. PCT/GB2010/000923 which was filed on May 7, 2010 and claims priority from British Application Serial No. GB 0908088.8 which was filed on May 11, 2009.

The present invention relates to a composite electrode material for a rechargeable battery; to a method of making a composite electrode material; to an electrode comprising the composite electrode material, especially an anode; to cells including electrodes or anodes including the composite electrode material; and to devices including said cells.

Secondary batteries, such as lithium ion rechargeable batteries comprise a family of batteries in which one or more charge carriers such as lithium, sodium, potassium, calcium or magnesium ions move from the negative electrode to the positive electrode during discharge and back again during the charging phase. Secondary batteries such as lithium ion batteries are common in consumer electronics because they generally exhibit a good energy to weight ratio, a negligible memory effect and a slow loss of charge when not in use. The high energy density characteristics of these batteries mean that they can also be used in aerospace, military and vehicle applications.

A secondary battery such as a lithium ion rechargeable battery cell typically comprises an anode, a cathode and an electrolyte. The anode conventionally comprises a copper current collector having a graphite based composite layer applied thereto. The cathode is generally formed from a material comprising a charge carrier species or comprises a current collector having a composite layer including a charge carrier species applied thereto. Examples of commonly used charge carriers include alkali metal ions such as ions of lithium, sodium and potassium and alkali earth metal ions such as calcium and magnesium. For lithium ion rechargeable batteries, the cathode conventionally comprises an aluminium current collector having a lithium containing metal oxide based composite layer applied thereto. A porous plastic spacer or separator is provided between the anode and the cathode and a liquid electrolyte is dispersed between the porous plastic spacer, the composite anode layer and the composite cathode layer.

The battery can be charged by applying a charging voltage across the current collectors of the anode and the cathode. During the charging process of a lithium-ion battery, lithium ions migrate from the lithium containing composite metal oxide layer of the cathode to the anode where they become embedded in the graphite in a process known as insertion to form a lithium carbon insertion compound, for example $LiC_6$. During the discharge process, the lithium ions are extracted or removed from the graphite and travel back through the electrolyte to the cathode. Similarly, charge and discharge of a sodium or magnesium based battery requires the reversible transfer of sodium or magnesium ions respectively from one electrode to another.

Useful work can be obtained from the battery on discharge by placing the battery across a closed external circuit. The amount of useful work that can be obtained from a battery cell depends upon both the magnitude of the charging voltage applied to the cell as well as the gravimetric capacity of both the anode active material and the cathode active material. A lithium intercalated graphite material, for example, has a maximum theoretical gravimetric capacity of 372 mAh/g. Although the gravimetric capacity provided by graphite based electrodes has been found to be sufficient for many applications, the development of new applications having greater power requirements has necessitated the development of lithium ion rechargeable batteries including electrode materials having a greater gravimetric capacity than graphite. This, in turn, has led to the development of electrodes such as anodes in which a silicon, germanium, tin or gallium-based composite layer is applied to the current collector. Electrodes comprising silicon-based composite layers have been most extensively investigated. Like graphite, silicon also forms insertion compounds with lithium during the charging phase of the battery. The lithium-silicon insertion compound, $Li_{21}Si_5$ has a maximum theoretical gravimetric capacity of 4,200 mAh/g; this compound is only formed at high temperatures. However, the compound $Li_{15}Si_4$ exists at room temperature and has a maximum theoretical capacity of 3,600 mAh/g. Germanium also forms a lithium insertion compound, $Li_{21}Ge_5$; this has a maximum theoretical capacity of 1624 mAh/g. Tin forms an insertion compound, $Li_{21}Sn_5$, which has a maximum theoretical gravimetric capacity of between 800 and 1000 mAh/g. Lithium insertion compounds of gallium are also known, these compounds have a maximum theoretical gravimetric capacity of 577 mAh/g. This means that batteries containing silicon, germanium, gallium and tin based anodes potentially have significantly higher inherent capacities than batteries containing graphite based anodes; these higher energy densities mean that batteries including a silicon, germanium or tin-based anode are potentially suitable for use in devices having substantial power requirements.

Unfortunately, the process of lithium insertion and extraction or removal (into and from the silicon, germanium, gallium and tin anode material during the charging and discharging phases respectively) is associated with a huge volume change (e.g. up to 300% increase in volume during charging for silicon compounds), which is much larger than the corresponding volume changes observed for cells containing graphite anodes. These significant volume changes result in the build up of a significant amount of stress within the electrode structure, which causes the electrode material to crack and leads to both a loss of cohesion within the composite material and a loss of adhesion of the composite electrode material from the current collector.

For most secondary battery applications, the composite layer (silicon or graphite) applied to the electrode current collector typically comprises an electroactive material such as silicon, tin, germanium, gallium or graphite and a binder. A binder is used to provide good cohesion between the components of the composite electrode material, good adhesion of the electroactive material to the current collector and to promote good electrical conductivity between the electroactive material and the current collector.

By the term "composite electrode material" it should be understood to mean a material comprising a mixture, preferably a substantially homogeneous mixture, of an electroactive material, a binder and optionally one or more further ingredients selected from the group comprising a conductive material, a viscosity adjuster, a filler, a cross-linking accelerator, a coupling agent and an adhesive accelerator. The components of the composite material are suitably mixed together to form a homogeneous composite electrode material that can be applied as a coating to a substrate or current collector to form a composite electrode layer. Preferably the components of the composite electrode material are mixed with a solvent to form an electrode mix, which electrode mix can then be applied to a substrate or current collector and dried to form the composite electrode material.

By the term "electrode mix" it should be understood to mean compositions including a slurry or dispersion of an electroactive material in a solution of a binder as a carrier or solvent. It should also be understood to mean a slurry or dispersion of an electroactive material and a binder in a solvent or liquid carrier.

By the term "electroactive material" it should be understood to mean a material, which is able to incorporate into its structure and substantially release there from, metal ion charge carriers such as lithium, sodium, potassium, calcium or magnesium during the charging phase and discharging phase of a battery. Preferably the material is able to incorporate (or insert) and release lithium.

According to EP 2 058 882 a binder for a composite electrode material for a rechargeable lithium ion battery must exhibit the following properties:

It must provide good corrosion resistance by providing the current collector with a protective layer to prevent damage by the electrolyte;

It must be able to hold the components of the composite electrode material together as a cohesive mass;

It must provide strong adhesion between the composite layer and the current collector.

It must be stable under battery conditions; and

It must be conductive or have a low internal resistance.

The binders typically used in the manufacture of graphite composite electrodes include thermoplastic polymers such as polyvinylidene fluoride (PVdF), polyvinylalcohol (PVA) or styrene butadiene rubber (SBR). However, use of these binders in silicon systems has, unfortunately, not resulted in electrodes having sufficient strength or charge characteristics to allow use on a commercial scale. For example, according to KR 2008038806A, a polyvinylalcohol (PVA) binder in a silicon based anode system is unable to produce a uniform coating on a copper current collector. In addition it has been observed (KR 2008038806A) that the electrically insulating polymer binders polyvinylidine fluoride (PVDF) and styrene butadiene rubber (SBR) are unable to retain either cohesion within the body of the composite electrode material or adhesion of this material to the anode current collector during the charging and discharging phases of the battery. This loss of cohesion and/or adhesion results in an increase in the internal resistance of the electrode and leads to a rapid deterioration in the electrical performance of batteries including composite electrode materials containing these binders. In order to overcome these problems, KR 2008038806A teaches ultra-violet and ozone treatment of the conductive component and binder of the composite material disclosed therein prior to fabrication.

The first cycle irreversible capacity loss for cells comprising an anode formed from a composite of a silicon-comprising electroactive material and one or more binders selected from the group comprising PVDF, aromatic and aliphatic polyimides and polyacrylates has been found to be unacceptably large (WO 2008/097723). This may be due to the tendency of these binders to swell in the electrolyte solutions used in batteries.

It will be appreciated from the foregoing that a major problem associated with the use of binders traditionally used in graphite based systems (such as PVdF, PVA and SBR) in silicon based systems is the build up of electrical resistance within the electrode structure due to decomposition of the composite electrode material itself (loss of cohesion) and loss of adhesion between the composite material and the current collector. Attempts to solve this problem have included approaches such as improving the electrical conductivity of the binder and modifying the binder in order to achieve improved cohesiveness within the composite material itself and improved adhesion between the composite material and the current collector.

An example of the first approach to this problem (improving the conductivity of the binder) is presented in US 2007/0202402, which discloses composite electrode materials including polymer binders including carbon nano-tubes. Examples of suggested polymer binders to which the carbon nano-tubes can be added to enhance the binder conductivity include polyester acrylates, epoxy acrylates, urethane acrylates, polyurethanes, fluoropolymers such as PVdF, polyvinylalcohol (PVA), polyimides, polyacrylic acids and styrene butadiene rubbers. Of these suggested binders, only PVDF and PVA are exemplified.

The second approach (binder modification) provides a composite electrode material comprising a binder including a polymer or a polymer mixture in which the or at least one polymer in the polymer mixture includes within its structure a functional group that is able to bond to the surface of the electroactive material of the composite and/or the surface of the current collector. This approach is outlined in more detail by Sugama et al in J. Materials Science 19 (1984) 4045-4056, by Chen et al, J. Applied Electrochem. (2006) 36:1099-1104 and by Hochgatterer et al, Electrochem. & Solid State Letters, 11(5) A76-A80 (2008).

Sugama et al (J. Materials Science 19 (1984) 4045-4056) investigated the interaction between iron (III) orthophosphate or zinc phosphate hydrate films and polyacrylic acid macromolecules in which between 0 and 80% of the carboxyl (COON) groups in the macromolecule had been neutralised with sodium hydroxide. The study was based on the assumption that macromolecules containing a carboxyl group (COON) would be able to form strong bonds with the metal (iron or zinc) surface as a result of a condensation reaction between the carboxyl group of the macromolecule and the hydroxyl (OH) groups found on the surface of the metal film. The adhesive strength and wetting characteristics of the macromolecules was found to depend upon the degree of neutralisation of the polyacrylic acid macromolecule. Polyacrylic acid macromolecules in which either 0 or 80% of the carboxyl groups had been neutralised exhibited poor wetting or adhesion characteristics. It was suggested that the extensive hydrogen bonding present in the un-neutralised polyacrylic acid macromolecules reduced the number of active groups available to bind to the hydroxyl groups on the metal surface. Conversely, it was suggested that for the polyacrylic acid system in which 80% of the carboxyl groups had been neutralised, the reduction in available inter-molecular hydrogen bonding resulted in increased inter-molecular entanglement, which also limited the availability of active groups for bonding to the metal surface. The best results were obtained using a polyacrylic acid having an intermediate level of neutralisation. It was observed that since polyacrylic acid macromolecules have a tendency to swell in water optimum adhesive properties could be achieved by ensuring that the polyacrylic acid macromolecules contained only sufficient carboxyl groups to react with the hydroxyl groups on the surface of the metal film; an excess of carboxyl groups was believed to lead to the swelling of polyacrylic acid macromolecules on the metal surface in aqueous systems.

Chen et al (J. Applied Electrochem. (2006) 36:1099-1104) investigated the effect of PVDF, an acrylic adhesive binder and a modified acrylic adhesive binder on the cycling performance of silicon/carbon composite electrodes containing nano-sized silicon powder in lithium ion batteries. The acrylic adhesive, referred to as LA132, is believed to be a mixture of acrylonitrile and butadiene in methylethyl ketone, ethyl acetate and toluene. The modified acrylic adhesive binder was a mixture of LA132 and sodium carboxymethyl cellulose (CMC). Electrodes formed using the acrylic adhesives were found to exhibit better adhesion and cycling performance compared to the PVDF binder. The best performance was obtained from electrodes including the modified acrylic binder. It was observed that PVDF binders had a greater tendency to swell in electrolyte solutions compared to acrylic adhesive binders.

Hochgatterer et al, Electrochem. & Solid State Letters, 11(5) A76-A80 (2008) investigated the effect of sodium carboxymethylcellulose, hydroxyethyl cellulose, cyanocellulose and PVDF based binders on the cycling stability of silicon/graphite based composite anodes using a lithium cathode. The authors observed that improved cycling performance was obtained by replacing the flexible PVDF based binder with a more brittle sodium carboxymethyl cellulose based binder and suggested that this improved performance was due to bond formation between the CMC and the silicon surface (similar to the scheme outlined by Sugama et al), which bond formation helps to retain the shape of the silicon particles during the charge and discharge cycles. It was suggested that the establishment of a chemical bond between the electroactive material and the binder was a more important factor for battery life than binder flexibility.

The preparation of silicon based anodes using carboxymethyl cellulose and sodium carboxymethyl cellulose binders is further disclosed in Electrochemical and Solid State Letters, 10 (2) A17-A20 (2007) and Electrochemical and Solid State Letters, 8 (2) A100-A103 (2005). These papers also demonstrate that the use of sodium CMC results in an improved cycle life over the 'standard' PVdF binder when using micron scale powdered Si anode materials or Si/C composite anode material. However, these binders are only able to provide effective adhesion for electroactive materials having a silicon purity of greater than 99.95%. The divalent and trivalent metal ion impurities in silicon materials having a purity of less than 99.95% cause degradation of the carboxymethyl cellulose binders in battery environments and loss of performance. Composite electrode materials including binder systems comprising a chelating agent and carboxymethyl cellulose or sodium carboxymethylcellose can be used for silicon based anodes in which the silicon purity is less than 99.90% (WO 2010/130975). However, the inclusion of a chelating agent increases the complexity of the binder system and may affect the amount of lithium available for inclusion into and release from the silicon structure during the charging and discharging cycles of the battery.

WO 2010/130976 discloses silicon based composite electrodes containing a polyacrylic acid binder. Cells produced using these polyacrylic acid binders and sodium salts of these polyacrylic acid binders exhibited a capacity retention of the order of 98% over between 150 and 200 cell cycles. The binders of WO 2010/130976 can be used in the preparation of anodes containing highly pure silicon powder, metallurgical grade silicon powder, silicon fibres and pillared particles of silicon as the electroactive material.

WO 2008/097723 discloses composite anodes for lithium ion electrochemical cells. The anodes comprise a silicon based alloy as the electroactive material and a non-elastic lithium polysalt binder. Examples of lithium polymer salts that can be used as binders include lithium polyacrylate, lithium poly(ethylene-alt-maleic acid), lithium polystyrenesulfonate, lithium polysulfonate fluoropolymer, polyacrylonitrile, cured phenolic resin, cured glucose, a lithium salt of a copolymer that includes maleic acid or sulfonic acid or mixtures thereof; the inventors believe that these lithium polysalts are able to coat a powdered active material to form an ionically conductive layer. Composite anodes including either a silicon-iron-titanium alloy or graphite as an active material and a binder selected from the group comprising lithium polyethylene-alt-maleic acid, lithium polyacrylic acid, lithium poly(methylvinylether-alt-maleic acid) and lithium polysulfonate fluoropolymer were prepared. For both of the active materials referred to above, the capacity loss associated with cells including these composite materials was inversely proportional to the amount of binder in the composite. There was very little difference in the performance of the cells over 50 cycles (graphite vs silicon alloy) for a fixed amount of binder. Cells including lithium polysalt binders exhibited comparable or marginally superior performance per cycle compared to cells including binders such as PVDF, polyimide or sodium carboxymethylcellulose; lithium polysulfonate binders exhibited marginally better performance compared to the other binders disclosed in WO 2008/097723.

US 2007/0065720 discloses a negative electrode for a lithium ion secondary battery, which includes a composite electrode material comprising a binder having an average molecular weight in the range 50,000 to 1,500,000 and an electroactive material that is capable of absorbing and desorbing lithium. The electroactive material can be selected from silicon or tin and alloys and oxides of silicon or tin. Alloys of silicon with titanium are preferred. The binder comprises at least one polymer selected from the group comprising polyacrylic acid and polymethacrylic acid, with the proviso that 20 to 80% of the carboxyl groups in the polymer structure have been condensed to produce acid anhydride groups, which reduces the tendency of the binder to absorb water and therefore the consequential breakdown of the electrode material. Partial replacement of the carboxyl groups within the binder structure means that the binder is still able to effectively adhere to the surface of the electroactive material.

US 2007/0026313 discloses a molded negative electrode for a lithium ion battery, which includes a silicon-comprising electroactive material and a non-cross linked polyacrylic acid binder having an average molecular weight of 300,000 to 3,000,000. Cross-linked polyacrylic acids, their alkali metal salts and alkali metal salts of non-cross linked polyacrylic acid are excluded from US 2007/0026313 because they are hygroscopic and tend to absorb water, which reacts with the silicon in the electroactive material to release a gas. The evolution of gas tends to impede the performance of the electrode. It was suggested that the use of non-cross linked polyacrylic acids having an average molecular weight of 300,000 to 3,000,000 provides a balance between electrode strength and dispersion of the electroactive material within the electrode structure.

Electrodes comprising a composite layer of silicon fibres on a copper current collector have also been prepared (WO 2007/083155). Silicon fibres having a diameter in the range 0.08 to 0.5 microns, a length in the range 20 to 300 microns and an aspect ratio (diameter:length) in the range 1:100 were mixed with a conductive carbon and were subsequently formed into a composite felt or mat using a PVDF binder.

It will be appreciated from the foregoing that one problem associated with composite electrode materials comprising binders containing a carboxyl (COON) group is that the binders are not always stable in the cell electrolytes and may undergo reactions with the electrolyte and other cell components during the cell cycling, which leads to a breakdown of the cell structure. In addition non-elastic binders such as polyacrylic acid are not always able to accommodate the volume changes that take place within anodes including an electroactive material such as silicon, germanium, tin or gallium during the charging and discharging phases of the battery. This can lead to a breakdown of cohesiveness within the electrode structure and loss of lamination from the current collector.

There has also been a considerable amount of research into binder mixtures for composite electrode materials. WO 2010/060348 discloses a polymer mixture that can be used as a binder for a composite silicon-based lithium ion electrode. The binder is formed from a three component mixture comprising, as a first component, polymers that improve the elasticity of the film; a second component comprising polymers that increase the interactions between the components of the electroactive material; as a third component comprising polymers that are able improve the binding force of the silicon negative electrode to the current collector. Examples of polymers that are believed increase the elasticity of the film and may avoid flaking of the negative electrode material include those formed by polymerisation of a fluorine-containing monomer. Copolymers of the fluorine-containing monomer with a functional group-containing monomer are preferred. Examples of fluorine-containing monomers include vinylidene fluoride, fluoroethylene, trifluoroethylene, tetrafluoroethylene, pentafluoroethylene and hexafluoroethylene. Examples of monomers containing a functional group include monomers containing a functional group such as a halogen, oxygen, nitrogen, phosphorus, sulphur, a carboxyl group or a carbonyl group. Compounds such as acrylic acid, methacrylic acid, maleic acid, unsaturated aldehydes and unsaturated ketones provide examples of monomers containing a carboxyl or carbonyl functional group. Polymers having a number average molecular weight of between $1 \times 10^5$ and $1 \times 10^6$ are preferred. Where the polymer contains a functional group the weight ratio of the functional group containing monomer and the fluorine-containing monomer is in the range 1:10 to 1:1000.

Examples of polymers that are believed to increase the interaction between the components of the electroactive material in WO 2010/060348 include polymers formed by polymerisation of a monomer such as acrylonitrile, methacrylonitrile, an acrylate, a methacrylate or mixtures thereof. Polymers having a number average molecular weight of between $1 \times 10^3$ and $1 \times 10^6$ are preferred.

Examples of polymers that are believed to improve the binding force of the silicon negative electrode in WO 2010/060348 include polyvinylpyrrolidone (PVP), polyglycol (PEG), poly(alkylidene)glycol, polyacrylamide and mixtures thereof. Polymers having a number average molecular weight of between 500 and $1 \times 10^7$ are preferred.

KR 845702 also discloses a composite electrode material including a binder comprising a polymer formed by copolymerisation of at least one monomer selected from the group comprising a (meth)acrylic acid ester-based monomer, a vinyl based monomer, a conjugated diene based monomer and a nitrile group-containing compound with at least one compound selected from the group comprising an acrylate based monomer including a group selected from alkyl, alkenyl, aryl, $C_{2-20}$ pentaerythritol, ethylene glycol, propylene glycol and a $C_{2-20}$ urethane. The copolymer binders include both a hydrophilic group, which is believed to enhance the adhesion of the binder to the current collector and the components of the composite; and a hydrophobic group, which promotes dispersion of the active particles within the electrode mass. The copolymer binders of the composite materials of KR 845702 are believed to have excellent adhesive strength and coating properties.

JP 2004095264 discloses a silicon composite anode for a lithium ion battery, the anode comprising a current collector, a composite layer including an acrylate-containing binder and a separate adhesive layer provided between the binder containing composite layer and the current collector. The adhesive layer comprises an acrylate-substituted high molecular weight fluorine-containing polymer. The high molecular weight fluorine-containing polymer coats the current collector and provides a protective film to prevent corrosion of the current collector. Strong adhesion between the high molecular weight fluorine-containing polymer and the acrylate-containing binder is also observed.

A molded silicon-comprising composite electrode comprising a polyimide and a polyacrylic acid mix is disclosed in WO 2010/130976.

The composite electrode materials referred to above tend to be both costly and complex to prepare. Care is required to ensure that the components of the mixture are combined in the correct proportions. Minor variations in the number average molecular weight may have detrimental effects on the binding capability. In addition, any impurities in the components of the composite electrode material may adversely affect the binding capability of the binder mixture.

There is a need, therefore, for a composite electrode material including a binder that is able to adhere to both the components of the composite electrode material and to the current collector. There is also a need for a composite electrode material including a binder that is able to at least partially accommodate the volume changes undergone by the electroactive silicon material during the charging and discharging phases of the battery. There is also a need for a composite electrode material including a binder that does not undergo excessive swelling in an electrolyte solution. There is also a need for a composite electrode material including a binder comprising a minimum number of components. There is also a need for a composite electrode material including a binder that does not significantly impede the insertion of the charge transportion (e.g. lithium ion) into the electroactive material. There is a further need for a composite electrode material including a binder that is able to bind a silicon-comprising composite material including a highly pure silicon material as well as a silicon-comprising composite material having a silicon purity in the range 90.00% to 99.95%, preferably 95 to 99.95% and especially 98.00% to 99.95%.

There is a still further need for a composite electrode material including a binder, which helps to promote the formation of a more stable and less resistive solid electrolyte interphase (SEI) layer during the initial charge/discharge cycles. The present invention addresses those needs.

A first aspect of the invention provides a composite electrode material for a rechargeable battery cell comprising:
  a. an electroactive material; and
  b. a polymeric binder including pendant carboxyl groups characterised in that (i) the electroactive material comprises one or more components selected from the group comprising an electroactive metal, an electroactive semi-metal, an electroactive ceramic material, an electroactive metalloid, an electroactive semi-conductor, an electroactive alloy of a metal, an electroactive alloy of a semi metal and an electroactive compound of a metal or a semi-metal, (ii) the polymeric binder has a molecular weight in the range 300,000 to 3,000,000 and (iii) 40 to 90% of the carboxyl groups of the polymeric binder are in the form of a metal ion carboxylate salt.

By the term "carboxyl group" it should be understood to mean a structure in which a hydrogen atom attached to a carbon atom within the polymer structure has been replaced by a carboxyl substituent. This may be a hydrogen atom attached to the backbone of the polymer or it may be a hydrogen atom attached to a pendant carbon atom. Preferably the carboxyl groups are attached to the backbone of the polymer.

The polymeric binder of the composite electrode material of the first aspect of the present invention is suitably derived from an acrylic acid monomer unit or derivatives thereof. Examples of suitable polymeric binders include homopolymers of one or more monomers selected from the group comprising but not limited to acrylic acid, 3-butenoic acid, 2-methacrylic acid, 2-pentenoic acid, 2,3-dimethylacrylic acid, 3,3-dimethylacrylic acid, trans-butenedioc acid, cis-butenedioc acid and itaconic acid.

By the term "unit" or "monomer unit" it should be understood to mean the most basic repeating structural unit found in the polymer molecule; this is typically derived from and has identity to the corresponding structure of the monomer from which the polymer is formed.

Suitable metal ion salts of the polymers of the present invention include salts of lithium, sodium, potassium, calcium, magnesium, caesium and zinc. Sodium and lithium salts are preferred, with sodium salts being especially preferred.

The composite electrode material of the first aspect of the invention is a cohesive material in which the short term order of the components of the material is substantially retained over at least 100 charging and discharging cycles of a battery including a binder as defined herein. The composite electrode material of the first aspect of the invention can be used to prepare electrodes, preferably anodes suitable for use in the manufacture of secondary batteries such as lithium ion rechargeable batteries. It has been found that batteries including anodes prepared using the composite electrode material of the present invention exhibit good capacity retention over at least 100 cycles, for example over 120 cycles. Further, it has been found that when the composite electrode materials of the present invention are included in a battery, they exhibit a discharge capacity of in excess of 500 mAh/g, preferably in excess of 800 mAh/g and typically in the range of 1,000-3,000 mAh/g (where the capacity is calculated per gram of electroactive material in the composite). Depending upon the capacity to which they are charged.

The life cycle of a battery can be defined in terms of the number of charging and discharging cycles that it is able to undergo before the discharge capacity falls to either 50% or 80% of the initial charging capacity. The cycle number at which the discharge capacity falls to 50% of its initial charging capacity is defined as the $D_{50}$ value. The cycle number at which the discharge capacity falls to 80% of its initial charging capacity is defined as the $D_{80}$ value. It has been found, for example, that cells comprising a lithium cobalt oxide cathode and an anode comprising a composite electrode material according to the first aspect of the invention exhibit a D50 value of more than 100 cycles when charged at a rate of C/1. Slower charging rates lead to cells having a longer cycle life. Charging cells including the composite electrode material of the first aspect of the invention and a lithium cobalt oxide cathode at a rate of C/2 produces cells having a cycle life in excess of 250 cycles. Charging at C/5 leads to a cycle life in excess of 350 cycles; a cycle life in excess of 500 cycles has been observed in some instances. Cells comprising an anode comprising a composite electrode material of the present invention and a lithium cobalt oxide cathode tend to exhibit a first cycle loss in the range 10 to 40%, typically 10 to 30%, more typically 10 to 20%. Such cells typically exhibit an average efficiency over fifty cycles of between 96 and 99%, preferably between 98 and 99%.

Half cells (anodes comprising a composite electrode material according to the first aspect of the invention and a lithium cathode) tend to exhibit a first cycle loss of the order of 10 to 20%, typically 10 to 15%, more typically 10 to 12%.

The metal ion carboxylate salt of the polymeric binder contained within the composite electrode material of the first aspect of the invention may be a metal ion salt of a homopolymer or of an alternating, periodic, block or graft copolymer. By the term homopolymer it should be understood to mean a polymer characterised by a repeating series of identical monomer units. Homopolymers can be linear comprising a single chain of identical repeating units, but may also be branched, wherein the polymer comprises a main chain (backbone) having one or more side chains bonded thereto. By the term alternating copolymer it should be understood to mean a polymer (usually a linear copolymer) comprising a backbone having alternating monomer units. By the term "periodic copolymer" it should be understood to mean a polymer comprising monomer units arranged in a repeating (or periodic) sequence along the polymer backbone. By the term "alternating copolymer" it should be understood to mean a copolymer, in which the different monomer units comprising the copolymer are arranged alternately along the length of the polymer backbone. By the term "statistical copolymer" it should be understood to mean a polymer comprising monomer units in a backbone, which monomer units are arranged according to a statistical rule. By the term "block copolymer" it should be understood to mean a polymer having two or more monomer comprising sub-units in the polymer backbone, wherein the subunits are linked by a covalent bond. By the term "graft copolymer" it should be understood to mean a polymer including a polymer backbone and which also has side chains, which are of a different composition to the composition of the polymer backbone. Preferably the metal ion carboxylate polymer salt is a sodium salt of a polymeric binder. More preferably, the metal ion carboxylate salt is a sodium salt of a homopolymeric carboxyl binder. Sodium salts of polyacrylic acid are most preferred. Sodium salts of polyacrylic acid having a molecular weight more than 240,000 are preferred, with a molecular weight in the range 300,000 to 3,000,000 being especially preferred. As indicated above, the number of pendant carboxyl groups present in the polymer carboxylic acid salts of the present invention will suitably be in the range 50 to 100% of the total number of monomers units present in the polymer, preferably 50 to 90%, more preferably 60 to 80%, most preferably 65 to 75% and especially 70%. Suitably and as indicated above, 40 to 90% of the carboxyl groups present in the polymer structure are in the form of a metal ion salt, preferably 40 to 80%, more preferably 60 to 80% and especially 65 to 76% and more especially 70%. In a preferred embodiment of the first aspect of the invention, the composite electrode material preferably comprises a metal ion salt of a polyacrylic acid, particularly the sodium or lithium salt having a degree of salt formation of 40 to 90% and especially the sodium salt thereof. In a further preferred embodiment, the composite electrode material comprises a sodium salt of polyacrylic acid having a molecular weight in the range 300,000 to 3,000,000, preferably 450,000 to 1,250,000 wherein 40 to 90% of the carboxyl groups are in the form of a salt. The composite electrode material according to the first aspect of the invention may comprise one or more polymeric binders including pendant carboxyl groups or may be provided in the form of a mixture with one or more other known binders such as PVDF, styrene butadiene rubber, carboxymethyl cellulose, sodium carboxymethyl cellulose and the like. Where the composite electrode material of the first aspect of the invention comprises two or more polymeric binders comprising a carboxyl group, one or both of the polymeric binders may be in the form of a metal ion carboxylate salt, wherein the overall degree of salt formation is in the range 40 to 90% with respect to each binder component or with respect to the binder mixture as a whole.

As indicated above, the polymeric binder or binders contained within the composite electrode material of the present invention is or are provided in the form of a metal ion salt. These polymeric metal ion salts according to the first aspect of the invention may be prepared by reacting a polymer including a pendant carboxyl group with a metal ion base, for example a base such as a hydroxide or a carbonate of a suitable metal ion. Preferably the polymer includes one or more carboxyl groups within its structure. More preferably, the carboxyl groups are derived from acrylic acid. Preferred metal ion bases include hydroxides and carbonates of sodium. The anion of the base suitably reacts with the acid group of the polymer to give the corresponding carboxyl group. The metal ions then react with the pendant carboxyl groups present in the polymer structure to give the salt of the corresponding maleic acid.

Bases including anions such as hydroxyl and carbonate groups are preferred since their use leaves little or no residue in the composite electrode material structure. A metal hydroxyl will react with a carboxylic acid group to form water on formation of a metal ion carboxylic acid salt, which is evaporated when the electrode is dried. A metal ion carbonate reacts with a carboxylic acid group to form carbon dioxide gas on formation of a metal ion carboxylic acid salt, which gas is evolved from the mixture.

The number of metal ion carboxylate salt units formed within the polymer structure depends on both the total number of carboxylic acid groups in the polymer and the concentration and amount of the metal ion containing base that reacts therewith. Since an acrylic acid group is capable of reacting with one equivalent of a base containing a monovalent metal ion (such as a hydroxide or carbonate of sodium or potassium) or half an equivalent of a base containing a divalent metal ion (such as calcium or magnesium), it will be appreciated that it is possible to control the total number of carboxyl groups that are converted to the corresponding acid salt within the polymer structure by controlling amount and the concentration of a solution containing a base of a mono-valent or di-valent metal ion that reacts with the polymer. In a preferred embodiment, it is possible to control the number of acrylic acid groups that are converted to a metal ion acrylic acid salt (metal ion acrylate) using polyacrylic acid as a starting material by controlling the amount and concentration of the base of the metal ion that reacts therewith. The number of acrylic acid groups that are converted to the corresponding acrylic acid salt within the polymer molecule can be expressed in terms of the total number of acrylic acid groups present in the molecule and is commonly referred to as either the degree of salt formation or the degree of neutralisation.

Preferably the metal ion carboxylate salt of the polymer contained within the composite electrode material of the first aspect of the present invention is characterised by a degree of salt formation in the range 40% to 90%, preferably 40 to 80%, more preferably 60 to 80%, especially 65 to 76% and more especially 70%. It should be appreciated that a polymer having a degree of salt formation of 50% can be obtained by reacting one equivalent of acrylic acid with 0.5 equivalents of a base including a mono-valent metal ion or 0.25 equivalents of a base including a divalent metal ion. Similarly, a salt having a degree of neutralisation of 75% can be obtained by reacting one (1) equivalent of acrylic acid groups with 0.75 equivalents of a base including a mono-valent metal ion or 0.375 equivalents of a base including a divalent metal ion. Mono-valent metal ion salts of the polymer are generally preferred. Although metal ion salts such as those of lithium, sodium, potassium, magnesium, calcium, magnesium and zinc can be used to form the carboxylic acid salts of the polymeric binder contained within the composite electrode material of the first aspect of the invention, polymeric sodium salts are most preferred. The use of sodium polyacrylate having a degree of formation in the range 40 to 90% is preferred. It should be appreciated that the metal ion salts of the polymeric binders contained within the composite electrode material of the present invention have a greater solubility in solvents such as water than the polymers from which they are derived. The metal ion salt of the polymeric binder contained within the composite electrode material of the first aspect of the invention suitably comprises a linear polymer having a number average molecular weight of more than 240,000, suitably no more than 4,000,000, preferably in the range 300,000 to 3,000,000, preferably 400,000 to 3,000,000, especially 450,000 to 3,000,000. Particularly preferred sodium polyacrylate binders are those derived from polyacrylic acid species having a molecular weight of 450,000; 1,000,000; 1250,000 and 3,000,000. It has been found that polymers having a number average molecular weight in the upper part of this region have been found to exhibit superior adhesive properties and are less likely to dissolve in the electrolyte solution of an electrochemical cell. However, polymers characterised by a higher number average molecular weight also tend to be less soluble in the solvents used to prepare the electrode mix. It has been found, for example, that sodium polyacrylate having a molecular weight of 450,000 and a degree of salt formation of 70% has a solubility of up to 30 wt % in water, preferably 15 to 30 wt % in water. In contrast, sodium polyacrylate having a molecular weight of the order of 1,250,000 and a degree of salt formation of 70% has a room temperature solubility of 1 to 2 wt % in water. The solubility of the polymer can be increased by either warming the solution and/or through step-wise addition of the polymer to the aqueous based solvent (usually water). Polymer solutions comprising up to 30 wt % polyacrylic acid having a molecular weight of up to 3,000,000 have been prepared using these techniques. Preferably polymer solutions comprising polyacrylic acid having a molecular weight of up to 3,000,000 and having a strength of at least 5 wt %, preferably at least 10 wt % and more preferably between 15 and 25 wt % are used. It will therefore be appreciated that the upper limit of the number average molecular weight of the metal ion salts of the polymers contained within the composite electrode material of the present invention will depend, in part, on their solubility in the solvents used for the preparation of that composite electrode material. The solubility of the polymer will also depend upon its degree of salt formation. Polymers having a degree of salt formation in the range 40 to 90%, preferably 60% to 80%, more preferably 65 to 80% and especially 70% to 75% are generally more soluble in the solvents used to form the electrode mix compared to polymers having a degree of salt formation of 40% or less. It is important that the number average molecular weight of the polymer together with its degree of salt formation be such that the solubility of the polymer salt in the solvents used to prepare the electrode mix is in the range 1 to 40%, preferably 10 to 40 wt %, preferably 15 to 40 wt % and especially 15 to 35 wt %. Solutions having a polymer concentration in this range have a viscosity, which makes them suitable for the preparation of electrode mixes that can be readily applied to a substrate or a current collector to form a composite electrode material. Solutions having a higher polymer concentration are too viscous and do not easily form a homogeneous, cohesive layer. Solutions having a lower polymer concentration are insufficiently cohesive to form a composite electrode material layer. The polymeric binder solutions used to form the composite electrode material according to the first aspect of the invention suitably have a viscosity in the range 800 to 30000 mPa/s, preferably 1000 to 25000 mPa/s, more preferably 1500 to 20,000 mPa·s. It has been found that solutions of polymeric carboxylate metal ion salts of the type contained within the composite electrode material according to the first aspect of the invention are able to exhibit a good balance of solubility, viscosity and binding values necessary for inclusion in a battery cell.

It has further been found that a polymer having a solubility of 1 to 40 wt %, preferably 10 to 40 wt % in the solutions used to form an electrode mix also tends to form a gel when a composite material comprising the polymer is incorporated into an electrochemical cell including an electrolyte solution. The formation of a gel is believed to promote transport of the charge carriers within a cell structure. Less soluble polymers are unable to form a gel on contact with the electrolyte and are less able to facilitate the transport of charge carriers across the interface between the electrolyte solution and the electroactive material of the composite layer. The metal ion carboxylate polymeric binder salts contained within the composite electrode material of the first aspect of the invention are able to exhibit these gel forming properties on contact with the electrolyte solutions used for cell formation.

In a preferred embodiment of the first aspect of the invention, the composite electrode material includes a polymeric binder having a degree of salt formation in the range 40 to 90%, preferably 40 to 80%, more preferably 60 to 80% and especially 65 to 76% and more especially 70% and a molecular weight of the order of 300,000; 450,000; 750,000; 1,000,000; 1,250,000 or 3,000,000, preferably 450,000 to 3,000,000. A number of suitable solvents can be used to solubilise the polymer binder to form the composite electrode material or electrode mix according to the first aspect of the invention. The solvent must be able to form a solution containing at least 1 wt % of the binder, preferably at least 10 wt % of the binder, more preferably at least 15 wt % and especially 15 to 35 wt %. Suitable solvents include water, NMP, lower alcohols such as ethanol, propanol or butanol or mixtures of these lower alcohols with water. Preferably the solvent is water.

The metal ion salt of the polymeric binder contained within the composite electrode material according to the first aspect of the invention suitably exhibits elastomeric properties. Preferably the polymer exhibits a Youngs Modulus of up to 5 GPa. Further the metal ion polymeric salts are preferably able to undergo an elongation of up to five times their original length before breakage. By the term "elongation to breakage" it should be understood to mean that each polymer strand can withstand being stretched up to five times its original length before it breaks or snaps. Without wishing to be constrained by theory, it is believed that the composite electrode material of the first aspect of the invention is able maintain its cohesive mass even under conditions which cause it to undergo a large volume expansion. The polymeric metal ion carboxylate salts having a number average molecular weight more than 240,000, suitably no more than 4,000,000, preferably in the range 300,000 to 3,000,000 and a degree of salt formation in the range 40% to 90%, preferably 40 to 80%, more preferably 60 to 80% and especially 65 to 76% and more especially 70% have been found to exhibit a Young's Modulus of up to 5 GPa and are suitable for inclusion in the composite electrode material of the first aspect of the invention. These polymeric metal ion carboxylate salts and have found to be suitable for inclusion in the composite electrode materials of the first aspect of the invention. Preferably the polymeric metal ion carboxylate salt is a sodium salt of polyacrylic acid having a molecular weight of more than 240,000, for example in the range 300,000 to 3,000. Polyacrylic acids having molecular weights of the order of 300,000; 450,000; 750,000; 1,000,000; 1,250,000 and 3,000,000 are preferred.

The polymeric binder contained within the composite electrode material of the first aspect of the invention can be characterised by its strength of adhesion to a substrate such as a current collector and/or by its solubility in a solvent used to prepare an electrode mix. By the term "adhesion" it should be understood to mean the ability of a body to stick to or be attracted to the substrate. The strength of adhesion is suitably measured using the peel test. The peel test involves applying a thin layer of binder to a substrate and measuring the average and peak load (or force) required to peel the adhered layer away from the substrate. The solubility of the polymeric binder can be determined by measuring the weight of the metal ion salt of the polymer that can be dissolved in a fixed volume of solvent. For example, it has been found that typical loads of between 100 and 550 mN/cm are required to peel a 1 cm wide layer of a composite electrode material of the present invention from a copper substrate, preferably between 115 and 530 mN/cm.

Composite electrode materials of the first aspect of the present invention are also characterised by good internal cohesion. By the term "cohesion" it should be understood to mean the tendency of the particles of the material to stick to or be attracted to each other within the mass of the material. Strongly adherent materials comprise particles that are strongly attracted to each other and tend to stick together. The number of cycles that an electrode comprising an electrode material undergoes before it reaches 50% of its initial capacity ($D_{50}$) is a good measure of the cohesive nature of the material; a composite electrode material needs to be cohesive in order to support prolonged cycling within a battery environment.

The composite electrode materials of the first aspect of the invention can also be characterised by their conductivity on a mylar substrate, which can be measured using a four point probe. The composite materials of the present invention typically exhibit a conductivity of between 0.013 and 1.5 S/cm, preferably between 0.3 and 0.8 S/cm.

The composite electrode material of the present invention is simply and easily prepared and a second aspect of the invention provides a method of making a composite electrode material according to the first aspect of the invention, the method comprising the steps of mixing a metal ion carboxylic acid salt of a polymer including pendant carboxyl containing groups with an electroactive material to form an electroactive composition, with the proviso that (i) the electroactive material comprises one or more components selected from the group comprising an electroactive metal, an electroactive semi-metal, an electroactive ceramic material, an electroactive alloy of a metal, an electroactive alloy of a semi-metal and an electroactive compound of a metal or a semi-metal, (ii) the polymeric binder has a molecular weight in the range 300,000 to 3,000,000 and (iii) 40 to 90% of the carboxyl groups of the polymeric binder are in the form of a metal ion carboxylate salt. In a preferred embodiment of the second aspect of the invention, there is provided a further step of forming a metal ion carboxylic acid salt of the polymer binder prior to mixing with the electroactive material. In a particularly preferred embodiment of the second aspect of the invention the composite electrode materials of the first aspect of the invention are suitably prepared by forming a solution of the polymeric binder in a suitable solvent, mixing the resulting binder solution with the electroactive material to form an electrode mix as defined above. The electrode mix can be coated onto a substrate (such as a current collector) to a predefined coating thickness and dried to remove the solvent to give a layer of a composite electrode material on the substrate or current collector. Preferably the substrate is a copper current collector.

In an alternative embodiment of the second aspect of the invention, the binder is provided in the form of a solution and the electroactive material is provided in the form of a dispersion, which dispersion is mixed with the binder solution. It is especially preferred that the solvent used in the formation of the binder solution is the same as or is miscible with the liquid carrier used to form a dispersion of the electroactive material. The solvent and the liquid carrier may be the same or different. In any event it is preferred that the solvent and the liquid carrier each have a boiling point in the range 80 to 200° C., so that they can be removed from the electrode mix via evaporation when the electrode is dried to form the composite electrode material. The composite electrode material prepared according to this second aspect of the invention can be used in the manufacture of electrodes, preferably anodes for use in lithium ion batteries. In a preferred embodiment of the second aspect of the invention, the method comprises the steps of mixing a silicon-comprising electroactive material with an aqueous solution of a sodium salt of polyacrylic acid; the concentration of the polyacrylic acid sodium salt in the aqueous solution is preferably in the range 1 to 40 wt %, preferably 10 to 20 wt %, especially 15 wt % and the binder preferably has a degree of salt formation of 60% to 70%.

Solutions of a metal ion carboxylate polymer salt that can be used in the formation of an electrode mix may suitably be formed by adding sufficient metal ions to a dispersion or solution of the polymer in a solvent. Alternatively metal ion carboxylate salts can be formed by adding a solution of a base salt of a metal ion to a polymer including pendant carboxyl groups. In a preferred embodiment of the second aspect of the invention, a solution of a metal ion carboxylate polymer salt is mixed with an electroactive material to form an electrode mix. The electrode mix is suitably applied to a substrate, preferably a substrate in the form of a current collector and dried to form the composite electrode material of the present invention. Alternatively the metal ion carboxylate polymer salt can be formed by adding a metal ion base to a solution or dispersion of the polymer in a solvent. Preferably a sodium or lithium hydroxyl or carbonate species is mixed with a solution of polyacrylic acid having a molecular weight of more than 240,000, more preferably in the range 300,000 to 3,000,000 to give a sodium or lithium salt having degree of salt formation of 60 to 70% and a solubility in water of at least 1 wt %, preferably at least 10 wt %, more preferably at least 15% and especially 15 to 35 wt %.

The precise nature of the solvent used in the preparation of the binder solutions used in the preparation of composite electrode materials according to the first aspect of the invention is not important as long it is able to facilitate the formation of a solution containing at least 1 wt %, preferably at least 10 wt %, more preferably at least 15 wt % and especially 15 to 35 wt % of the polymeric binder. The solvent must be miscible with any liquid carrier supporting a dispersion of an electroactive material with which the binder solution is mixed during formation of an electrode mix. Further, the solvent suitably supports the formation of a coating on a substrate such as a current collector. In addition the solvent is preferably sufficiently volatile to evaporate from the electrode mix, when the coated electrode is dried. Examples of solvents used to form the binder solution include water, N-methyl-pyrrolidone (NMP), polyvinyldifluoride, polyvinyl alcohol and lower alcohols such as ethanol, propanol and butanol and mixtures thereof.

It will be appreciated that in order to form a composite electrode material according to the first aspect of the invention in which 40 to 90% of the carboxyl groups of the polymeric binder are in the form of a metal ion carboxylate salt, it is essential to determine the concentration of carboxyl groups within the polymer solution or dispersion using a sample of the polymer as a control prior to formation of the solution or dispersion of the metal ion carboxylate polymer salt. It should be appreciated that such methods are well known to a skilled person and that by determining the concentration of carboxyl containing groups present in the polymer, it is possible to calculate the amount and concentration of a base containing either mono-valent or divalent metal ions that will be required to form a metal ion carboxylate polymer salt having a predetermined degree of salt formation. Preferably, the polymeric binder including pendant carboxyl groups is acrylic acid and the concentration of pendant carboxyl groups within the polymer solution is determined prior to the reaction of the acrylic acid with the base. Methods of determining the concentration of carboxyl groups within a polymer structure are known to a person skilled in the art. The number average molecular weight of the polymeric binder can also be readily determined using techniques such as osmometry and laser light scattering techniques, both of which are well known to a person skilled in the art.

In a further embodiment of the second aspect of the invention, the amount and concentration of the metal ions added to the polymer dispersion or solution is monitored in order to control the degree of salt formation thereof. Since polymer salts having a degree of salt formation of between 40 and 90% are preferred, the amount of a base containing either mono-valent metal ions or divalent metal ions, which is added to the polymer must be equivalent to between 0.2 and 0.9 times the concentration of acrylic acid monomer units in the dispersion.

The final concentration of the metal ion carboxylate polymer salt in the solution used to form the composite electrode material is suitably between 1 and 40 wt %, more suitably between 10 and 40 wt %, preferably between 15 and 40% and especially between 15 and 35 wt %. Solutions having a polymer concentration within this range have good rheological properties and produce composite electrode materials with good cohesive and adhesive properties. As indicated previously, solutions having a viscosity in the range 800 to 3000 mPa/s, preferably 1000 to 2500 mPa/s are preferred. Solutions having a polymer concentration greater than 40% are too viscous and composite electrode materials formed using such solutions tend to be inhomogeneous. Composite electrode materials produced using solutions having a polymer concentration of below 10 wt % are generally poorly cohesive and do not adhere well to the current collector. An exception to this is a solution of the sodium salt (70%) of polyacrylic acid having a molecular weight of 1,250,000, which exhibits a room temperature water solubility of 1 to 2%, but which is able to form a very stable cell, with a cycle life of over 200 cycles. The sodium salt (70%) of polyacrylic acid having a molecular weight of 3,000,000 is also able to form stable cells, despite a low room temperature solubility. The use of polymer salt solutions having a concentration of at least 1 wt %, preferably at least 10 wt %, more preferably at least 15 wt % and especially 15 to 35 wt % in the manufacture of electrode materials results in the formation of a composite electrode material that forms a gel on contact with the electrolyte solution used for battery formation. Gel formation has been found to enhance conductivity within battery cells.

Preferred composite electrode materials of the first aspect of the invention are formed using metal ion salts of polymers in which the degree of salt formation is the minimum necessary to achieve at least 1 wt %, preferably at least 10 wt % solubility of the metal ion carboxylate polymer salt in the solvent used for the formation of the electrode mix, more preferably at least 15 wt % and especially 15 to 35 wt % solubility. This means that during preparation of the composite electrode material of the first aspect of the invention, only the minimum concentration of metal ions should be added to solubilise sufficient of the polymeric binder to form a solution containing at least 1 wt %, preferably at least 10 wt %, more preferably at least 15 wt % and especially 15 to 35 wt % of the metal ion carboxylate polymer salt It will be appreciated from the foregoing that the composite electroactive material of the first aspect of the invention comprises an electroactive material as well as a polymeric binder.

Examples of suitable electroactive materials for inclusion in the composite electrode material according to the first aspect of the invention include silicon, tin, gallium, germanium, aluminium, lead, zinc, gold, silver, platinum, palladium, bismuth, arsenic, antiminony, tellurium, boron, selenium and indium and mixtures thereof, alloys of these electroactive materials with a non-electroactive metal and ceramic titanates ($Ti_5O_{12}$). In a preferred embodiment of the first aspect of the invention the electroactive material is a silicon-comprising electroactive material.

The electroactive materials included in the composite electrode material of the first aspect of the invention may be provided in the form of particles, tubes, wires, nano-wires, filaments, fibres, rods, flakes, sheets, ribbons and scaffolds.

The particles, tubes, wires, nano-wires, filaments, fibres, rods, flakes, sheets, ribbons and scaffolds that may be included in the composite electrode material of the present invention may include electroactive materials selected from, but not limited to, Si, Sn, Ge, Ga, Se, Te, B, P, BC, BSi, SiC, SiGe, SiSn, GeSn, WC, $SiO_x$, $TiO_2$, BN, Bas, AlN, AlP, AlAs, AlSb, GaN, GaP, GaAs, GaSb, InN, InP, InAs, ZnO, ZnS, ZnSe, ZnTe, CdS, CdSe, CdTe, BeSe, BeTe, GeS, GeSe, GeTe, SnS, SnSe, SnTe, PbO, PbSe, PbTe, AgF, AgCl, Agbr, AgI, $BeSiN_2$, $ZnGeP_2$, $CdSnAs_2$, $ZnSnSb_2$, $CuGeP_3$, $CuSi_2P_3$, $Si_3N_4$, $Ge_3N_4$, $Al_2O_3$, $Al_2CO$ or mixtures thereof. Preferably the structures comprise silicon or electroactive silicon alloys or compounds. These structures may also comprise organic polymers, ceramics, inorganic semiconductors and biologically derived compounds, or the like.

The electroactive materials used to form composite electrode materials referred to herein above may include within their structure a dopant such as a p-type or an n-type dopant. Dopants may suitably be included in the material structure to improve the electronic conductivity of the materials. The use of doped silicon is preferred. Examples of p-type dopants for silicon include B, Al, In, Mg, Zn, Cd and Hg. Examples of n-type dopants for silicon include P, As, Sb and C. The electronic conductivity of the electroactive materials may alternatively be enhanced by including in the structure chemical additives that reduce its resistivity or increase its conductivity. The electronic conductivity of a material, particularly a silicon-comprising electroactive material, may also be enhanced by providing a coating or inclusion of an electroactive material having a higher conductivity than the electroactive material used to form the composite on or in the structure of that material. Suitable conducting materials include metals or alloys that are compatible with cell components such as copper or carbon.

By the term "silicon-comprising electroactive material" it should be understood to mean an electroactive material, which consists silicon or which includes silicon within its structure.

The silicon-comprising electroactive material can comprise silicon having a purity of greater than 90%. The silicon-comprising electroactive material suitably has a purity of less than 99.99%. Preferably the silicon-comprising electroactive material comprises silicon having a purity in the range 90 to 99.99%, preferably 95 to 99.99%, more preferably 99.90% to 99.99% and especially 99.95% to 99.97%. The silicon-comprising electroactive material can also include alloys of silicon with metals such as iron and copper, which metals do not inhibit the insertion and release of charge carriers such as lithium into the alloyed silicon during the charging and discharging phases of the battery. The silicon-comprising electroactive material can also include structures having one or more silicon coatings over an electroactive or non-electroactive core or structures having a silicon core and one or more coatings applied thereto, wherein the structure of each coating layer is different to the composition of the preceding layer or the core, where the core precedes the coating layer.

Where the term "silicon-comprising electroactive material" is used herein to describe specific embodiments of the invention, it should be understood that the characteristics exhibited by these silicon-comprising materials also extend to other electroactive materials such as tin, germanium, gallium and mixtures thereof. In this respect it should further be understood that all references to electroactive silicon particles and other silicon structures referred to herein include references to identical particles and structures formed from an electroactive material such as tin, germanium, gallium and mixtures thereof.

Examples of silicon-comprising electroactive materials that can be used in the preparation of the composite electrode material according to the first aspect of the invention include one or more silicon-comprising structures selected from the group comprising silicon-comprising particles, tubes, flakes, wires, nano-wires, filaments, fibres, rods, sheets and ribbons and scaffolds including an interconnected network of any one or more of the preceding structures. Preferably the composite electrode material according to the first aspect of the invention comprises one or more silicon-comprising electrode materials selected from particles and fibres.

The silicon-comprising electroactive particles that can be included in the composite electrode material of the first aspect of the invention may be in the form of native particles, pillared particles, porous particles, porous particle fragments, porous pillared particles or substrate particles. The silicon-comprising particles may be coated or uncoated. A composite electroactive material comprising silicon-comprising pillared particles or native silicon-comprising particles are preferred.

By the term "native particle" it is to be understood to include one or more particles that have not been subjected to an etching step. Such particles typically have a principle diameter in the range 10 nm to 100 µm, preferably 1 µm to 20 µm, more preferably 3 µm to 10 µm and especially 4 µm to 6 µm and are obtained by milling bulk or particulate silicon, preferably metallurgical grade silicon to the size required. By the term "metallurgical grade" silicon, it should be understood to mean a silicon material having a silicon purity in the range 90 to 99.99%, preferably 95 to 99.97%. Metallurgical grade silicon is typically made by reducing silicon dioxide in the presence of carbon in an electric arc furnace using a carbon electrode at a temperature at or around 1900° C. The resulting elemental silicon typically includes as principle impurities calcium, aluminium and iron. Examples of metallurgical silicon-comprising native particles that can be used in the composite electroactive composition of the first aspect invention include silicon particles sold under the product description "Silgrain" and "Silgrain HQ" by Elkem® of Norway. Particularly preferred native silicon particles are those sold as Silgrain HQ. Silgrain HQ includes a range of silicon particles of different size distributions. The Silgrain HQ range includes jet-milled particles having a size in the range 0.2 to 15 µm, with a $D_{50}$ of 4.5 µm and a BET bulk surface area value of 2.7 m$^2$/g as well as particles having a size in the range 5 to 30 µm, a $D_{50}$ value of 15 µm and a BET bulk surface area value of 0.48 m$^2$/g.

In a preferred embodiment of the first aspect of the invention a composite electroactive composition comprises a native silicon particle having a diameter in the range 0.2 to 15 µm, with a $D_{50}$ of 4.5 µm and a polymeric binder including pendant carboxyl groups, the polymeric binder having a molecular weight in the range 300,000 to 3,000,000 and a degree of salt formation in the range 40 to 90%. In a further preferred embodiment of the first aspect of the invention the electroactive material comprises a native silicon particle having a diameter in the range 5 to 30 µm, with a $D_{50}$ of 15 µm. Preferably the native silicon particle comprises metallurgical grade silicon. Typically metallurgical grade silicon includes impurities such as aluminium, copper, titanium, iron and vanadium. These impurities are generally present in parts per million (ppm) concentrations. Table 1 lists some of the more common impurities that are found in metallurgical grade silicon together with the concentrations in which they are present.

TABLE 1

| Element | Impurity Level (ppm) |
| --- | --- |
| Aluminium | 1000-4350 |
| Boron | 40-60 |
| Calcium | 245-500 |
| Chromium | 50-200 |
| Copper | 15-45 |
| Iron | 1550-6500 |
| Magnesium | 10-50 |
| Manganese | 50-120 |
| Molybdenum | <20 |
| Nickel | 10-105 |
| Phosphorous | 20-50 |
| Titanium | 140-300 |
| Vanadium | 50-250 |
| Zirconium | 20 |

By the term "Pillared Particles" it is to be understood to mean particles comprising a particle core and a plurality of pillars extending there from, wherein the pillars have a length in the range 0.5 to 25 µm, preferably 0.5 µm to 10 µm, more preferably 1 to 5 µm. The pillared particles suitably comprise an electroactive material such as silicon, germanium, gallium, tin or alloys thereof. Silicon-comprising pillared particles are preferred. The composition of the core may be identical or different to that of the pillars. Where the pillars and the core are of different compositions, both the pillars and the core may comprise an electroactive material. Alternatively either the pillars or the core may comprise an electroactive material. Where the composition of the pillars is different to that of the core it is preferred that the pillars are formed from an electroactive material and the core is formed from either a non-electroactive material or an electroactive material exhibiting a smaller volume expansion than the pillars during charging. Electroactive pillared particles can be prepared by etching particles of an electroactive material such as silicon having dimensions in the range 5 to 60 µm, preferably 5 to 25 µm using the procedure set out in WO 2009/010758. Such pillared particles include particles having a principle diameter (core diameter plus pillar height) in the range 5 to 15 µm, 15 to 25 µm and 25 to 35 µm. Particles having a principle diameter in the range 5 to 15 µm typically include pillars having heights in the range 0.5 to 3 µm. Particles having a principle diameter in the range 15 to 25 µm typically include pillars having heights in the range 1 to 5 µm. Particles having a principle diameter in the range 25 to 35 µm typically include pillars having heights in the range 1 to 10 µm, preferably 1 to 5 µm. Pillared particles having a core diameter of the order of 14 µm and a pillar length of the order of 4 µm are particularly preferred. Examples of preferred pillared particles that can be included in the electroactive composition according to the first aspect of the invention are silicon-comprising pillared particles that are prepared by etching a native Silgrain® silicon particle having a diameter in the range 20 to 35 µm, with a $D_{50}$ value of 24 µm. Such particles are sold as Silgrain HQ native particles and on etching exhibit a BET bulk surface area of 26.6 m$^2$/g. It is also to be understood that the term pillar when used with reference to the term "pillared particle" includes wire, nanowire, rod, filament or any other elongated structure such as a tube or cone. The pillars can also be formed on or attached to a particle core using methods such as growing, adhering or fusing. In a further preferred embodiment of the first aspect of the invention, the composite electrode composition comprises a pillared particle having a diameter in the range 20 to 35 µm, with a $D_{50}$ of 24 µm and a BET bulk surface area of 26.6 m²/g.

By the term "porous particle" it should be understood to include a particle comprising a plurality of pores, voids or channels within a particle structure, wherein each of the pores, voids or channels within the particle structure is defined, bound, partially bound or separated by the electroactive material from which the particle is formed. The term "porous particle" should also be understood to include a particulate material comprising a random or ordered network of linear, branched or layered elongate elements, wherein one or more discrete or interconnected void spaces or channels are defined between the elongate elements of the network; the elongate elements suitably include linear, branched or layered fibres, tubes, wires, pillars, rods, ribbons or flakes. Layered elongate elements include structures in which the elongate elements are fused together. The individual branched elongate elements typically have a smallest dimension in the range 50 to 100 nm with branches every 100 to 400 nm. The porous particles from which the porous particle fragments are derived can further be defined in terms of a smallest dimension (or pore wall thickness), this being the average thickness of material separating any one pore or void within a pore containing porous particle structure from an adjacent void, or where the particle comprises a network of elongate elements, the average thickness (this being the average smallest dimension) of an elongate element within the network. By the term porous particle fragment it should be understood to include all fragments derived from a porous particle, preferably a porous particle formed from an electroactive material such as silicon, tin, germanium, gallium, aluminium and lead. Silicon containing porous particles are especially preferred. Such fragments include structures having a substantially irregular shape and surface morphology, these structures being derived from the electroactive material originally defining, bounding, partially bounding or separating the pores or network of pores within the porous particle from which the fragment structures are derived, without themselves comprising pores, channels or a network of pores or channels. Preferably these fragments are derived from the electroactive material, preferably the silicon material either (a) defining the network of elongate elements or (b) originally defining bounding, partially bounding or separating the pores or network of pores within the porous particle from which the fragment structures are derived, without the fragments themselves comprising pores, channels or a network of pores or channels. These fragments will hereafter be referred to as fractals. The appearance of the fractals may or may not resemble the porous particles from which they are derived. Typically the term "fractal" as described herein describes a structure obtained through the random fragmentation of a larger porous particle. The surface morphology of these fractal structures (which are devoid of pores or channels or a network of pores or channels) may include an ordered or disordered array of indentations or irregularities arising from the pores or channels or network of pores or channels originally bound or partially bound by the electroactive material structure, preferably the silicon structure of the parent porous particle. These fractal fragments will typically be characterised by the presence of peaks and troughs extending over the surface thereof and will include particles having a spiky appearance as well as those including a plurality of ridges or bumps extending from the surface of the particle. The peaks are characterised by a peak height and a peak width. The peak height is defined as the distance between the base of the peak (the place where the peak merges with the body of the fractal) and the apex of the peak. The peak width is defined as the minimum distance between one side of the peak and the other at half height. The fractal can also be defined by the average thickness of the fractal body; this value is typically identical to the average thickness (smallest dimension) of an elongate element derived from a porous particle comprising a network of elongate elements or the average thickness (preferably the pore wall thickness) of the electroactive material originally separating any two adjacent pores within the pore containing porous particle from which the fractal is derived.

The term porous particle fragment also includes porous particle fragments comprising a network of pores and/or channels defined and separated by the electroactive material defining the walls of the particle. Pore-containing porous particle fragments can also be defined in terms of the average thickness of the electroactive material separating two adjacent pore structures within the parent particle (also referred to herein as the pore wall thickness). Preferably the electroactive material is a silicon containing electroactive material and the term "silicon-containing electroactive material" should be interpreted to include electroactive materials comprising essentially substantially pure or metallurgical grade silicon, alloys of silicon with both electroactive and non-electroactive elements as well as materials comprising electroactive compounds of silicon. Suitable silicon alloys include alloys of silicon with one or more metallic elements selected from aluminium, copper, titanium, strontium, nickel, iron, antimony, chromium, cobalt, tin, gold, silver, beryllium, molybdenum, zirconium and vanadium. These fragments will herein after be referred to as pore containing fragments. By the term "pore" or "channel" as defined in relation to the particles from which the fragments are derived as well as the porous particle fragments themselves, it should be understood to mean a void or channel enclosed or partially enclosed within the total volume of the particle as well as a channel extending into the interior of the particle from its surface. These pore and/or channel comprising porous particle fragments are also generally but not exclusively characterised by an irregular shape and surface morphology. In contrast, the particles from which the fragments are derived are generally but not exclusively characterised by a disc-like or substantially spherical shape and a relatively smooth outer surface morphology (inbetween the surface voids). Where the fractals and pore containing porous particle fragments are described together hereinafter they will collectively be referred to as either porous particle fragments or silicon containing porous particle fragments as appropriate. The network of pores and/or channels suitably comprises a three dimensional arrangement of pores and/or channels extending through the volume of the particle in which the pore and/or channel openings are provided on two or more planes over the surface of the pore containing porous particle fragment. Porous particles typically have a principle diameter in the range 1 to 15 µm, preferably 3 to 15 µm and contain pores having diameters in the range 1 nm to 1500 nm, preferably 3.5 to 750 nm and especially 50 nm to 500 nm. Such particles are typically fabricated using techniques such as stain etching of silicon particles or wafers or by etching particles of silicon alloy, such as an alloy of silicon with aluminium. Methods of making such porous particles are well known and are disclosed, for example, in US 2009/0186267, US 2004/0214085 and U.S. Pat. No. 7,569,202. The term "particle" in relation to the particles referred to herein includes essentially spherical and non-spherical particles. Non-spherical particles include cubic, prismatic and decahedric shaped particles having a principle diameter and a minor diameter. It is preferred that the aspect ratio of the principle diameter to the minor diameter is in the range 3:1, preferably 2:1 and especially 1:1.

By the term "substrate particle" it should be understood to mean a particle comprising a particle core having a dispersion of an electroactive material formed there on. The core essentially provides a substrate onto which the electroactive material is dispersed. The core or substrate may be an electroactive material, a non-electroactive material or a conductive material. Where the core or substrate is an electroactive material, it suitably has a different composition to that of the electroactive material dispersed there on. Preferably the core or substrate is a carbon based material, such as graphite, graphene or a conductive carbon such as carbon black. Preferably the dispersed electroactive material is selected from one or more of the group comprising silicon, tin, gallium or germanium or a mixture thereof. Preferably the dispersed electroactive material is provided in the form of nano-particles. Preferred substrate particles therefore comprise a dispersion of nano-particles of an electroactive material having a diameter in the range 1 nm to 500 nm, preferably 1 to 50 nm, on a carbon core or substrate, the substrate particle having a diameter (defined as the sum of the diameter of the core (or substrate) and two oppositely positioned nano-particles) in the range 5 to 50 μm, preferably 20 μm. Alternatively the substrate particles comprise a dispersion of nano-wires of an electroactive material having a diameter in the range 10 to 500 nm and an aspect ratio in the range 10:1 to 1000:1, on a carbon core or substrate, the substrate particle having a diameter in the range 5 to 50 μm. Silicon is preferred as the dispersed electroactive material. Suitably, the dispersed electroactive silicon is a metallurgical grade silicon. Preferably the dispersed electroactive material comprises silicon nano-particles or silicon nano-wires. Coverage of the substrate by the silicon nano-particles may be complete or incomplete and is preferably incomplete. Examples of substrate particles that can be used in combination with the binder of the present invention are disclosed in US 2010/0297502.

The terms "fibre, nano-wire, wire, thread, pillar and rod" should each be understood to include an elongate element which can be defined by two smaller dimensions and one larger dimension, the aspect ratio of the larger dimension to the smallest dimension being in the range 5:1 to 1000:1. In this respect the terms may be used interchangeably with each other and also with the terms pillars and threads. Preferably the fibres, nano-wires, wires, threads, pillars and rods contained within the composite electroactive composition of the first aspect of the invention comprise silicon, more preferably metallurgical grade silicon. As specified in United Kingdom patent application number GB 1014706.4, silicon-comprising fibres preferably have a diameter in the range 0.02 to 2 μm, preferably 0.05 to 1 μm and especially 0.05 to 0.5 μm. Silicon fibres having a diameter of 0.2 μm are preferred. The composite electrode material of the third aspect of the invention may include silicon fibres, wires, nano-wires, threads, pillars or rods having a length in the range 0.1 μm to 400 μm, preferably 2 μm to 250 μm. Silicon fibres, rods, threads, pillars or wires having a length of 20 μm are preferred. The elongate structures referred to herein may be provided in the form of an individual unbranched element or may be provided in the form of a branched element. Branched structures may be referred to as bipods, tripods or tetrapods depending upon the number of branches attached to a main stem.

In the context of the foregoing, the term "nano-wire" should be further understood to mean an element having a diameter in the range 1 nm to 500 nm, a length in the range 0.1 μm to 200 μm and an aspect ratio of greater than 10, preferably greater than 50 and especially greater than 100. Preferably the nano-wires have a diameter in the range 20 nm to 400 nm, more preferably 20 nm to 200 nm and especially 100 nm. Examples of nano-wires that can be included in the binder compositions of the present invention are disclosed in US 2010/0297502 and US 2010/0285358.

By the term "ribbon" it should be understood to mean an element, which can be defined by three dimensions: a first dimension, which is smaller in size than the other two dimensions; a second dimension, which is larger than the first dimension; and a third dimension, which is larger than both the first and second dimensions.

By the term "flake" it should be understood to mean an element, which can also be defined by three dimensions: a first dimension, which is smaller in size than the other two dimensions; a second dimension, which is larger than the first dimension and a third dimension, which is of similar size or marginally larger than the second dimension.

By the term "tube" it should be understood to mean an element, which is also defined by three dimensions as follows: the first dimension is the tube wall thickness, which is smaller than the other two dimensions; the second dimension defines the outer diameter of the tube wall, which is larger than the first dimension; and the third dimension defines the length of the tube, which is larger than both the first and second dimensions.

By the term "scaffold" it should be understood to mean a three dimensional arrangement of one or more structured elements selected from the group comprising fibres, wires, nano-wires, threads, pillars, rods, flakes, ribbons and tubes, which structures are bonded together at their point of contact. The structured elements may be arranged randomly or non-randomly in the three dimensional arrangement. The three dimensional scaffold may comprise coated or uncoated structures having a core comprising an electroactive material such as silicon, tin, germanium or gallium. Alternatively, the scaffold may be a hetero-structure comprising a three-dimensional arrangement of structures comprising an electroactive or a non-electroactive base scaffold material onto which is deposited small islands, nano-wires or a coating of an electroactive material having a composition different to that of an electroactive material from which the scaffold is formed. Preferred scaffolds comprise a network of carbon fibres, threads, wires or nano-wires having small islands, nano-wires or a thin film coating of an electroactive material such as silicon, germanium, gallium, tin or alloys or mixtures thereof applied thereto. Where the scaffold comprises a silicon based coating, one or more additional coating layers may be applied thereto. A coating layer may be continuous and extend over substantially the entire surface of the scaffold structure. Alternatively, a coating layer may be discontinuous and may be characterised by an absence of a coating layer over some regions of the surface of the scaffold structure. In one embodiment, the coating material may be distributed randomly or in a set pattern over the surface of the scaffold. Examples of scaffold structures that can be included in the binder compositions of the present invention are disclosed in US 2010/0297502.

Each of the particles, tubes, wires, nano-wires, fibres, rods, sheets and ribbons and scaffolds that can be included in the composite electrode composition of the present invention may be crystalline, microcrystalline, polycrystalline or amorphous or may include crystalline or polycrystalline regions within an amorphous structure. These structures may be fabricated using etching techniques such as those outlined in WO 2009/010758 or electrospinning as described in US2010/0330419. Alternatively, they can be manufactured using growth techniques such as a catalysed Vapour-Liquid-Solid approach as described in US 2010/0297502. It will be apparent to a skilled person that it is possible to grow nano-particles, nano-wires and nano-tubes on the surface of a carbon substrate to fabricate substrate particles using the technique set out in US 2010/0297502. An electroactive material comprising a carbon substrate particle having an electroactive material disposed over the surface thereof, wherein the electroactive material is a structure selected from the group comprising nano-particles, nano-wires and nano-tubes can be mixed with the binder compositions according to the first aspect of the invention to form both an electrode mix and a composite material.

Elongate structures such as tubes, nano-wires, fibres, rods, sheets and ribbons may also be growth rooted to a substrate or may be harvested there from. Growth rooted structures can be fabricated using techniques known to a person skilled in the art and exemplified in US 2010/0285358. Examples of suitable techniques include affixing structures to a substrate using annealing or impact techniques, for example. Other techniques include chemical vapour deposition, physical vapour deposition, epitaxial growth, atomic layer deposition and the like; these techniques result in growth rooted structures. Alternatively the structures can be formed using etching techniques such as those referred to above.

Where the wires, nano-wires, fibres, rods, pillars, sheets, ribbons and tubes are attached to a substrate, the composition of these structures may be the same or different to that of the substrate.

By the term "carbon substrate" it should be understood to mean a core or substrate that contains at least 50 w/w % to 100 w/w % carbon and can be used to support the growth thereon of nano-particles, nano-wires or nano-tubes, for example. Examples of carbon based materials that can be used as substrates to support VLS growth of an electroactive particle, nano-wire or nano-tube thereon include carbon black, fullerene, soot, graphite, graphene, graphene powder or graphite foil. Examples of suitable carbon substrates are disclosed in US 2010/0297502.

For each of the ribbons, tubes, threads, pillars and flakes referred to above, the first dimension is suitably of a length in the range 0.03 µm to 2 µm, preferably 0.05 µm to 1 µm, more preferably 0.1 µm to 0.5 µm. The second dimension is usually two or three times larger than the first dimension for ribbons and between 10 and 200 times larger for flakes and between 2.5 and 100 times larger for tubes. The third dimension should be 10 to 200 times as large as the first dimension for ribbons and flakes and between 10 to 500 times as large as the first dimension for tubes. The total length of the third dimension may be as large as 500 µm, for example. In a preferred embodiment of the first aspect of the invention, the composite electrode composition comprises as an electroactive material a silicon-comprising fibre having a diameter in the range 50 to 2000 nm, a length in the range 0.8 to 100 µm, and an aspect ratio in the range. 5:1 to 1000:1.

The terms tubes, wires, nano-wires, threads, pillars, fibres, rods, sheets and ribbons should be understood to include both coated and uncoated elongate elements such as wires, nano-wires, threads, pillars, fibres, rods, sheets, tubes, ribbons.

Uncoated elongate elements, particles, porous particles and porous particle fragments include silicon-comprising particles, porous particles, porous particle fragments, pillared particles, wires, nano-wires, fibres, threads, pillars, rods, sheets, tubes and ribbons having a uniform composition through a cross-section of the structure, as well as particles, porous particles, porous particle fragments, wires, nano-wires, fibres, threads, pillars, rods, sheets, tubes and ribbons having a silicon-comprising core or base layer comprising a silicon-comprising material having a first silicon purity and an outer layer comprising a silicon-comprising material having a second silicon purity, wherein the second silicon purity is different to the first silicon purity.

Coated particles, porous particles, porous particle fragments, pillared particles, substrate particles, wires, nano-wires, fibres, threads, pillars, rods, sheets, tubes and ribbons include particles, porous particles, porous particle fragments, substrate particles, wires, nano-wires, fibres, rods, sheets, tubes and ribbons comprising a core of an electroactive material such as silicon and having one or more coatings applied thereto are envisaged. Particles, porous particles, porous particle fragments, pillared particles, substrate particles, wires, nano-wires, fibres, threads, pillars, rods, sheets, tubes and ribbons having one or more coatings including an electroactive material such as silicon applied to a core other than silicon are also envisaged. Where a coating is applied, it may provide continuous coverage over the surface to which it is applied or it may only partially cover the exposed area of the underlying surface. Where multiple coatings are applied, each coating may be applied either continuously or discontinuously so that it either fully or partially overlaps an exposed surface area created by a previous layer.

Where multiple layers are applied to a core or an underlying surface (for example, a substrate) it is preferred (although not essential) that each of the coating layers has a different composition to that of the underlying or preceding layer (or the core or substrate where the coat in question is the first coating layer). It will be appreciated that the electroactive materials that can be mixed with the binder compositions of the present invention include one or more elements having a core-shell structure, the structure comprising a core which is surrounded by one or more shells or layers, wherein each shell or layer has a composition that differs from the composition of its preceding shell.

For the avoidance of doubt, coated structures may include structures in which both the core and one or more of the coating layers comprises an electroactive material, structures in which the core comprises an electroactive material and all the coating layers are formed from a non-electroactive material and structures in which the core comprises a non-electroactive material and one or more of the coating layers are formed from an electroactive material. Structures comprising a electroactive core having one or more electroactive coating layers applied thereto are also envisaged.

Where particles and elongate elements referred to herein above include a coating of an electroactive material, the cores of these coated elongate elements and particles are suitably selected from materials such as carbon, preferably hard carbon or graphite, an electroactive ceramic material or a suitable metal such as silicon, tin, germanium, gallium or alloys or mixtures thereof. Where the silicon-comprising structures referred to herein above include a coating, the coating preferably comprises a carbon coating including one or more species selected from the group comprising amorphous carbon, graphite, electroactive hard carbon, conductive carbon, carbon based polymers or carbon black. Coats are typically applied to the silicon-comprising structures to a thickness of between 5 and 40% by weight of the coated silicon-comprising structure. Methods of coating silicon-comprising particles and elongate elements are known to a person skilled in the art and include chemical vapour deposition, pyrolysis and mechanofusion techniques. Carbon coating of silicon structures through the use of Chemical Vapour Deposition techniques is disclosed in US 2009/0239151 and US 2007/0212538. Pyrolysis methods are disclosed in WO 2005/011030, JP 2008/186732, CN 101442124 and JP 04035760. Carbon coatings are able to assist in controlling the formation and stability of SEI layers on the surface of the electroactive material. As indicated above coatings other than carbon based coatings can be used.

Examples of suitable alternative coatings include metals such as aluminium, copper, gold and tin as well as conductive ceramic materials and polymer based coatings. Preferably the electroactive elongate element or particle comprises silicon and the coating is a silicon-comprising coating.

Where the electroactive material present in the composite electrode material of the third aspect of the invention is a silicon-comprising electroactive material, it can suitably be selected from one or more of silicon metal, a silicon-alloy or a silicon oxide. By the term silicon metal it should be understood to include silicon having a silicon purity in the range 90% to 99.999%, preferably 90 to 99.95% and especially 98.0% to 99.95%. Silicon having a purity in the range 99.90 to 99.95% is preferred because higher purity silicon is more expensive to process. Silicon metal having a silicon purity of less than 90% should be avoided since the high level of impurities present in the material leads to a significant reduction in cell performance.

By the term silicon-alloy material, it should be understood to mean an alloy material containing at least 50 wt % silicon.

By the term silicon oxide material, it should be understood to include electroactive silicon oxide materials of formula SiOx, where 0≤x≤2, wherein x is either a constant value across a cross-section of the material or x varies either radially (along a radius defined by a cross-section through the silicon oxide based structure) or linearly (from one side to the other of a cross-section through the silicon oxide based structure).

It is preferred to include in the composite electrode material of the third aspect of the invention an electroactive material having a purity in the range 90.0 to 99.99%, preferably 95.0 to 99.99%, more preferably 98.0 to 99.97% and especially 99.90 to 99.95%. An electroactive material having a purity in the range 99.95% to 99.99% can be used, but is less preferred due to problems in processing. Preferably the electroactive material is a silicon material having a silicon purity in the range 90.0 to 99.99%, preferably 98.0 to 99.99% and especially 99.90 to 99.97%.

Porous particle fragments suitable for inclusion in the composite electrode material of the third aspect of the invention are disclosed in United Kingdom patent application GB1014706.4. This document discloses coated and uncoated pore-containing porous particle fragments and fragments derived from porous particles that do not contain pores. Both the pore containing and non-pore containing fragments have particle diameters in the range 1 to 40 μm, preferably 1 to 20 μm and especially 3 to 10 μm. The average thickness of the walls defining the pores is of the order of 0.05 to 2 μm. The average ratio of the pore diameter to wall thickness for pore containing porous particle fragments is suitably in the range 2:1 to 25:1, preferably greater than 2.5:1.

Preferred composite electrode compositions of the first aspect of the invention comprise a silicon-comprising electroactive material selected from the group silicon-comprising native particles, silicon-comprising pillared particles and silicon-comprising fibres and a binder comprising a sodium salt of polyacrylic acid having a molecular weight in the range 300,000 to 3,000,000, preferably 450,000 to 3,000,000 and a degree of salt formation of 60 to 70%. The silicon-comprising electroactive material preferably comprises metallurgical grade silicon.

A composite electrode material according to any of the preferred embodiments of the first aspect of the invention will suitably comprise at least 50 wt % of an electroactive material as specified herein above. In a preferred embodiment of the first aspect of the invention, the composite electrode material comprises 60 to 90 wt % of an electroactive material, preferably 70 to 80%, more preferably 65 to 75% and especially 70 to 75%. The electroactive material suitably comprises from 15 to 100% of a silicon-comprising electroactive material, preferably 40 to 90% and more preferably 50 to 85% and especially 70 to 85%. Preferably the silicon-comprising electroactive material comprises at least 50 wt % of the electroactive material referred to above. The electroactive material may include additional components selected from the group comprising Sn, Ge, Ga, Se, Te, B, P, BC, BSi, SiC, SiGe, SiSn, GeSn, WC, $SiO_2$, $TiO_2$, BN, $Bas$, AlN, AlP, AlAs, AlSb, GaN, GaP, GaAs, GaSb, InN, InP, InAs, ZnO, ZnS, ZnSe, ZnTe, CdS, CdSe, CdTe, HgS, HgSe, HgTe, BeS, BeSe, BeTe, MgS, MgSe, GeS, GeSe, GeTe, SnS, SnSe, SnTe, PbO, PbSe, PbTe, CuF, CuCl, CuBr, CuI, AgF, AgCl, Agbr, AgI, $BeSin_2$, $CaCN_2$, $ZnGeP_2$, $CdSnAs_2$, $ZnSnSb_2$, $CuGeP_3$, $CuSi_2P_3$, $Si_3N_4$, $Ge_3N_4$, C, $Al_2O_3$, $Al_2CO$ or mixtures thereof. These additional components suitably comprise 0 to 50% by weight of the electroactive material and 0 to 40% by weight of the composite electrode material.

The composite electrode material according to the first aspect of the invention suitably comprises 3 to 40 wt % of a metal salt of a polymeric binder, preferably 3 to 30 wt % and especially 3 to 17 wt % of a metal salt of a polymeric binder as defined herein above. Preferably the metal salt of the polymeric binder comprises 8 to 12 wt %. Examples of suitable binders are provided herein and include metal ion salts of homo-polymers of one or more monomers selected from the group comprising but not limited to acrylic acid, 3-butenoic acid, 2-methacrylic acid, 2-pentenoic acid, 2,3-dimethylacrylic acid, 3,3-dimethylacrylic acid, trans-butenedioc acid, cis-butenedioc acid and itaconic acid. Homopolymeric polyacrylic acid is preferred. Metal ion salts of polyacrylic acid are preferred. Sodium polyacrylate salts are most preferred. Especially preferred are sodium salts of polyacrylic acid having a molecular weight in excess of 240,000, in the range 300,000 to 3,000,000 and a degree of salt formation of 40 to 90%, preferably 60 to 80% and especially 60 to 70%.

In a preferred embodiment of the third aspect of the invention, the composite electrode material comprises, in addition to the silicon-comprising electroactive material, an electroactive carbon material. These electroactive carbon materials may be present in an amount comprising 0 to 70% of the total weight of the electroactive material, suitably 8 to 70 wt %, preferably 10 to 20 wt % and especially 12 wt %. Examples of suitable electroactive carbons include graphite, hard carbon, carbon microbeads and carbon flakes, nanotubes, graphene and nanographitic platelets or mixtures thereof. Suitable graphite materials include natural and synthetic graphite materials having a particle size in the range 3 to 30 μm. Electroactive hard carbon suitably comprises spheroidal particles having a diameter in the range 2 to 50 µm, preferably 20 to 30 µm and an aspect ratio of 1:1 to 2:1. Carbon micro-beads having a diameter in the range 2 to 30 µm can be used. Suitable carbon flakes include flakes derived from either graphite or graphene.

The composite electrode material according to the first aspect of the invention suitably includes 4 to 16 wt % of a conductive carbon. Preferably the conductive carbon comprises 4 to 12 wt % of a conductive carbon. Examples of conductive carbons that may be included in the composite electrode materials of the first aspect of the invention include carbon black, acetylene black, ketjen black, lamp black, vapour grown carbon fibres, carbon nano-tubes and mixtures thereof.

A further preferred embodiment of the first aspect of the invention provides a composite electrode material comprising 10 to 95% by weight of a silicon-comprising electroactive material, 5 to 85% by weight of non-silicon-comprising electroactive components and 0.5 to 15% by weight of a polymeric binder including pendant carboxyl groups characterised in that (i) the polymeric binder has a molecular weight in the range 300,000 to 3,000,000 and (ii) 40 to 90% of the carboxyl groups of the polymeric binder are in the form of a metal ion carboxylate salt. A particularly preferred embodiment of the first aspect of the invention provides a composite electrode material comprising 70% by weight of a silicon-comprising electroactive material, 12% by weight of a sodium polyacrylate binder having a degree of salt formation in the range 40 to 90% and a molecular weight in the range 300,000 to 3,000,000, 12% by weight graphite and 6% by weight of a conductive carbon material. Preferred metal ion salts include those derived from lithium, sodium or potassium, especially sodium. Preferably the silicon-comprising electroactive material is a silicon structure selected from the group comprising native silicon particles, silicon-comprising pillared particles, silicon-comprising porous particles, silicon-comprising substrate particles, silicon-comprising porous particle fragments and elongate silicon-comprising elements selected from wires, nano-wires, threads, fibres, threads, rods, pillars and tubes. Silicon-comprising pillared particles and/or native silicon particles are especially preferred. Preferably the silicon-comprising components have a purity in the range 90 to 99.99% or in the range 95 to 99.97%.

An especially preferred embodiment of the first aspect of the invention provides a composite electrode material comprising 70 wt % of a silicon-comprising pillared particles and/or native silicon-comprising particles, 12 wt % of a sodium salt of polyacrylic acid having a molecular weight of 450,000 and a degree of salt formation of 75%, 12 wt % of graphite and 6 wt % of carbon black.

A further preferred embodiment of the first aspect of the invention provides a composite electrode material comprising 70% by weight of a silicon-comprising electroactive material, 14% by weight of a sodium polyacrylate binder having a degree of salt formation in the range 40 to 90% and a molecular weight in the range 300,000 to 3,000,000, 12% by weight graphite and 4% by weight of a conductive carbon material. Preferred metal ion salts include those derived from lithium, sodium or potassium, especially sodium. Preferably the silicon-comprising electroactive material is a silicon structure selected from the group comprising native silicon particles, silicon-comprising pillared particles, silicon-comprising porous particles, silicon-comprising substrate particles, silicon-comprising porous particle fragments and elongate silicon-comprising elements selected from wires, nano-wires, threads, fibres, threads, rods, pillars and tubes. Silicon-comprising pillared particles and/or native silicon particles are especially preferred. Preferably the silicon-comprising components have a purity in the range 90 to 99.99% or in the range 95 to 99.97%.

A still further especially preferred embodiment of the first aspect of the invention provides a composite electrode material comprising 70 wt % of a silicon-comprising particulate, 14 wt % of a sodium salt of a polyacrylic acid having a molecular weight of 3,000,000 and a degree of salt formation of 70%, 12 wt % of graphite and 4 wt % of a conductive carbon. The silicon comprising particulate is selected from the group comprising native silicon particles, silicon pillared particles and silicon fibres. The conductive carbon is suitably a mixture of carbon nano-tubes, carbon nano-fibres and carbon black, preferably in a ratio of 5:5:2.

A viscosity adjuster may be present and is a component used to adjust the viscosity of the electrode mix prior to formation of the composite electrode material so that the mixing process and the application of the material to a current collector can be easily carried out. The viscosity adjuster can be added in an amount of 0 to 30% by weight based on the total weight of the anode mix. Examples of viscosity adjusters include, but are not limited to, carboxymethylcellulose, polyvinylidene fluoride and polyvinyl alcohol. Where appropriate, in order to adjust the viscosity of the anode mix, a solvent such as water, ethanol, propanol, butanol or N-methylpyrrolidone (NMP) may be used in an amount of 0 to 30% based on the total weight of the anode mix. In this case the solvent is removed before or after any polymerization or curing process.

A conductive material may also be provided in the composite electrode material to further improve the conductivity of the composite electrode material and may be added in an amount of 1 to 20% by weight based on the total weight of the composite electrode material. There is no particular limit to the type of conductive material that can be used, providing it has suitable conductivity without causing chemical changes in a battery in which it is included. Suitable examples of conductive materials include hard carbon; graphite, such as natural or artificial graphite; carbon blacks such as carbon black, acetylene black, ketjen black, channel black; conductive fibres such as carbon fibres (including carbon nanotubes) and metallic fibre; metallic powders such as carbon fluoride powder, aluminium powder, copper powder and nickel powder; conductive whiskers such as zinc oxide and potassium titanate; conductive metal oxides such as titanium oxide and polyphenylene derivatives. A 5:5:2 mixture of carbon nano-tubes, carbon fibres and carbon black is especially preferred.

A filler is a further ingredient that may be present in the composite electrode material and can be used to inhibit anode expansion. There is no particular limit to the nature of the filler so long as it does not cause chemical changes in the fabricated battery and is a fibrous material. Examples of fillers that may be used include olefin polymers such as polyethylene and polypropylene and fibrous materials such as glass fibre and carbon fibres.

An adhesive accelerator may be added in an amount of less than 10% by weight based on the weight of the binder. There is no particular limit to the nature of the adhesive accelerator so long as it is a material that improves the adhesive strength of the anode mix to the current collector. Examples of adhesive accelerators include oxalic acid, adipic acid, formic acid, acrylic acid and derivatives, itaconic acid and derivatives and the like.

The silicon-comprising components or structures of the composition of the first aspect of the invention suitably comprise a high purity polycrystalline silicon material as well as polycrystalline silicon materials comprising either n-type or p-type dopants as impurities. Polycrystalline silicon materials comprising n-type or p-type dopants are preferred because these materials exhibit a greater conductivity compared to that of high purity polycrystalline silicon. Polycrystalline silicon materials comprising p-type dopants are preferred; these materials suitably include one or more impurities selected from aluminium, boron or gallium as dopants.

It will be appreciated that the composite electrode material may contain, in addition to an electroactive material and a binder one or more components selected from the group comprising a conductive material, a viscosity adjuster, a filler, a cross-linking accelerator, a coupling agent and an adhesive accelerator. The binder is preferably provided in the form of a solution; when it is mixed with the electroactive material and any other optional ingredients an electrode mix is formed.

As discussed above, the composition according to the first aspect of the invention can be used in the manufacture of an electrode. The electrode is typically an anode. The electrodes are preferably used in the manufacture of a lithium secondary battery. A third aspect of the invention therefore provides an electrode comprising a current collector and a composite electrode material according to the first aspect of the invention. The composite electrode material can be provided in the form of a free-standing felt or mat or as a moulded structure for connection to a current collector. Alternatively the composite electrode material can be in the form of a layer, which is adhered to a substrate and connected to a current collector. In a particularly preferred embodiment, the substrate is a current collector and the composite electrode material is in the form of a layer applied thereto. The components of the composite electrode material from which the felt or mat is formed are preferably randomly entangled to provide optimum connectivity between the elements.

The composite electrode material is preferably porous with voids or pores extending into the structure thereof. These voids or pores provide spaces into which the liquid electrolyte can permeate; provide room into which the electroactive material can expand during the charging phase and generally increase the active surface area of the electrode. The preferred amount of porosity depends on factors such as the nature of the electroactive material, the dimensions of the electroactive material structures present in the composite and the maximum charge level of the electrode during use. The composite porosity may be defined as the total volume of pores, voids and empty spaces in the composite electrode material in the uncharged state before any electrolyte is added to or contacted with the composite material, divided by the total volume occupied by the composite material layer. It may be measured by, for example, mercury or nitrogen porosimetry.

However if the porosity is too high the mechanical integrity of the electrode may be affected and the charge capacity per unit volume (or mass) may be reduced A suitable level of porosity may depend on several factors including but not limited to composition, particle size, type of electrolyte/binder, layer thickness, cell type/design. At least some of the porosity will be provided by the void space between the pillars of the pillared particles.

Preferably the porosity of the composite in the uncharged state is at least 10%, more preferably at least 20% and especially 30%. Preferably the porosity of the composite in the uncharged state is no more than 80%, more preferably no more than 60%.

Preferably the porosity of the composite material is at least twice the ratio of the volume of the pillars of the pillared particles contained in the composite to the total volume occupied by the composite material layer.

If the composite material contains pillared particles with particle cores comprising electroactive material the porosity may be higher to further accommodate the expansion of the particle cores when they are lithiated. In this case a suitable minimum composite porosity may be given by the sum of the volume of pillars multiplied by two and the volume of particle cores multiplied by 1.2, as a percentage of the total volume of the composite material layer.

The electrodes of the third aspect of the invention are easily prepared and a fourth aspect of the invention provides a method for fabricating an electrode comprising the steps of forming an electrode mix comprising an electroactive material, a binder and a solvent; casting the electrode mix onto a substrate and drying the product to remove the solvent. The electrode mix comprises a mixture of the electroactive material, the binder and a solvent. The electrode mix typically comprises a slurry or dispersion of the electroactive material in a liquid carrier; the liquid carrier may be a solution of a binder in a suitable solvent. The electrode mix is suitably prepared by dispersing the electroactive material in a solution of the binder. Preferably the electroactive material is a silicon-comprising electroactive material. Preferably the binder is a sodium salt of polyacrylic acid having a molecular weight in the range 300,000 to 3,000,000 and a degree of salt formation of 40 to 90%. Preferred binder solutions comprise water as a solvent. Alternatively, the electrode mix can be prepared by mixing a dispersion of the electroactive material in a first liquid carrier (or solvent) with a solution of a binder in a second solvent. The first or second solvents may be the same or different. Where the solvents are different they are suitably miscible. The miscible solvents typically have similar boiling points and are removed from the electrode mix by evaporation on drying. Removal of the solvent or solvents from the electrode mix results in the formation of the composite electrode material of the first aspect of the invention. The composite electrode material is suitably in the form of a cohesive mass which may be removed from the substrate, connected to a current collector and/or used as an electrode. Alternatively, where the composition according to the first aspect of the invention is adhered to the current collector as a result of casting and drying the electrode mix, the resulting cohesive mass (composite electrode material) will be connected to a current collector. In a preferred embodiment of the fourth aspect of the invention the composite electrode material is formed by casting the electrode mix as a layer onto a substrate, which is itself a current collector to form an electrode. Additional components selected from the group comprising a conductive material, a viscosity adjuster, a filler, a cross-linking accelerator, a coupling agent and an adhesive accelerator may also be included in the mix. Examples of suitable conductive materials, viscosity adjusters, fillers, cross-linking accelerators, coupling agents and adhesive accelerators are provided above. Suitable solvents include water, alcohols such as ethanol, propanol or butanol, N-methylpyrrolidone and mixtures thereof. Other suitable solvents known to a person skilled in the art of electrode design may also be used. The amount of solvent used in the preparation of the electrode mix will depend, in part, on the nature of the electroactive material, the binder and other optional components present in the composite electrode mix. The amount of solvent is preferably sufficient to give a slurry or dispersion with a viscosity in the range 800 to 3000 mPa/s.

Dispersions or slurries having a viscosity in this range give homogeneous materials having good adhesion to a substrate or current collector.

Suitable current collectors for use in electrodes according to the fourth aspect of the invention include copper foil, aluminium, carbon, conducting polymers and any other conductive materials. Preferably the current collector is a copper foil. The current collectors typically have a thickness in the range 10 to 50 μm. Current collectors can be coated with the composite electrode material on one side or can be coated with the composite electrode material on both sides. In a preferred embodiment of the fourth aspect of the invention a composite electrode material of the first aspect of the invention is preferably applied to one or both surfaces of the current collector to a thickness of between 1 mg/cm$^2$ and 6 mg/cm$^2$ per surface such that the total thickness of the electrode (current collector and coating) is in the range 40 μm to 1 mm where only one surface of the current collector is coated or in the range 70 μm to 1 mm where both surfaces of the current collector are coated. In a preferred embodiment, the composite electrode material is applied to a thickness of between 30 and 40 μm onto one or both surfaces of a copper substrate having a thickness of between 10 and 15 μm. Preferably the composite electrode material is applied as a layer of thickness of at least 6 μm, preferably at least 10 μm, more preferably at least 15 μm and especially at least 20 μm. Coating layers having a thickness of around 12 μm are preferred. Preferably the thickness of the composite electrode material does not exceed 60 μm, preferably it does not exceed 40 μm and more preferably it does not exceed 30 μm. The current collector may be in the form of a continuous sheet or a porous matrix or it may be in the form of a patterned grid defining within the area prescribed by the grid metallised regions and non-metallised regions. Where the current collector comprises a continuous sheet, the electrode may be readily manufactured by applying an electrode mix directly to the current collector. Where the current collector comprises a metallised grid, this metallised grid may be formed onto a non-stick substrate such as PTFE to give a metallised non-stick surface (such as metallised PTFE) and the electrode mix is applied to the metallised non-stick surface and dried to give a metallised mat or felt including a layer of a composite electrode material.

In one embodiment of the fourth aspect of the invention, the electrode may be formed by casting an electrode mix including a composition according to the first aspect of the invention onto a substrate thereby to form a self supporting structure and connecting a current collector directly thereto. In a preferred embodiment of the fourth aspect of the invention, a silicon-comprising electroactive material, preferably a material comprising silicon-comprising pillared particles; a binder and optionally one or more components selected from the group comprising a conductive material, a viscosity adjuster, a filler, a cross-linking accelerator, a coupling agent and an adhesive accelerator in a solvent is applied to a substrate and dried to remove the solvent. The resulting product can be removed from the substrate and used as a self supporting electrode structure. Alternatively, in a further embodiment, an electrode mix including a composition according to the first aspect of the invention is cast onto a current collector and dried to form an electrode comprising a layer of composite electrode material applied to a current collector.

The electrode of the third aspect of the invention can be used as an anode in the formation of a lithium secondary battery. A fifth aspect of the invention provides a secondary battery comprising a cathode, an anode comprising an electroactive material according to the third aspect of the invention and an electrolyte.

Many of the embodiments described herein correspond to both anodes and cathodes. Although many of the references refer to anodes, it will be appreciated that cathode design is generally concerned with similar issues of ion insertion and removal, swelling, electrical conductivity, ionic mobility and others. Therefore many of the design considerations referred to herein above apply to both anodes and cathodes. The cathode is typically prepared by applying a mixture of a cathode active material, a conductive material and a binder to a cathode current collector and drying. Examples of cathode active materials that can be used together with the anode active materials of the present invention include, but are not limited to, layered compounds such as lithium cobalt oxide, lithium nickel oxide or compounds substituted with one or more transition metals such as lithium manganese oxides, lithium copper oxides and lithium vanadium oxides. Examples of suitable cathode materials include $LiCoO_2$, $LiCo_{0.99}Al_{0.01}O_2$, $LiNiO_2$, $LiMnO_2$, $LiCo_{0.5}Ni_{0.5}O_2$, $LiCo_{0.7}Ni_{0.3}O_2$, $LiCo_{0.8}Ni_{0.2}O_2$, $LiCo_{0.82}Ni_{0.18}O_2$, $LiCo_{0.8}Ni_{0.15}Al_{0.05}O_2$, $LiNi_{0.4}Co_{0.3}Mn_{0.3}O_2$ and $LiNi_{0.33}Co_{0.33}Mn_{0.34}O_2$. Cathodes comprising $LiCo_{0.8}Ni_{0.15}Al_{0.05}O_2$ are preferred. The cathode current collector is generally of a thickness of between 3 to 500 μm. Examples of materials that can be used as the cathode current collector include aluminium, stainless steel, nickel, titanium and sintered carbon.

The electrolyte is suitably a non-aqueous electrolyte containing a lithium salt and may include, without limitation, non-aqueous electrolytic solutions, solid electrolytes and inorganic solid electrolytes. Examples of non-aqueous electrolyte solutions that can be used include non-protic organic solvents such as N-methylpyrrolidone, propylene carbonate, ethylene carbonate, butylenes carbonate, dimethyl carbonate, diethyl carbonate, gamma butyro lactone, 1,2-dimethoxy ethane, 2-methyl tetrahydrofuran, dimethylsulphoxide, 1,3-dioxolane, formamide, dimethylformamide, acetonitrile, nitromethane, methylformate, methyl acetate, phosphoric acid trimester, trimethoxy methane, sulpholane, methyl sulpholane and 1,3-dimethyl-2-imidazolidione.

Examples of organic solid electrolytes include polyethylene derivatives polyethyleneoxide derivatives, polypropylene oxide derivatives, phosphoric acid ester polymers, polyester sulphide, polyvinyl alcohols, polyvinylidine fluoride and polymers containing ionic dissociation groups.

Examples of inorganic solid electrolytes include nitrides, halides and sulphides of lithium salts such as $Li_5NI_2$, $Li_3N$, LiI, $LiSiO_4$, $Li_2SiS_3$, $Li_4SiO_4$, LiOH and $Li_3PO_4$.

The lithium salt is suitably soluble in the chosen solvent or mixture of solvents. Examples of suitable lithium salts include LiCl, LiBr, LiI, $LiClO_4$, $LiBF_4$, $LiB_{10}C_{20}$, $LiPF_6$, $LiCF_3SO_3$, $LiAsF_6$, $LiSbF_6$, $LiAlCl_4$, $CH_3SO_3Li$ and $CF_3SO_3Li$.

Where the electrolyte is a non-aqueous organic solution, the battery is provided with a separator interposed between the anode and the cathode. The separator is typically formed of an insulating material having high ion permeability and high mechanical strength. The separator typically has a pore diameter of between 0.01 and 100 μm and a thickness of between 5 and 300 μm. Examples of suitable electrode separators include a micro-porous polyethylene films.

The battery according to the fifth aspect of the invention can be used to drive a device, which relies on battery power for its operation. Such devices include mobile phones, laptop computers, GPS devices, motor vehicles and the like.

A sixth aspect of the invention therefore includes a device including a battery according to the fifth aspect of the invention.

It will also be appreciated that the invention can also be used in the manufacture of solar cells, fuel cells and the like.

The invention will now be described with reference to the following non-limiting figures and examples. Variations on these falling within the scope of the invention will be evident to a person skilled in the art.

FIGURES

EXAMPLES

Example 1

Figure 1A:
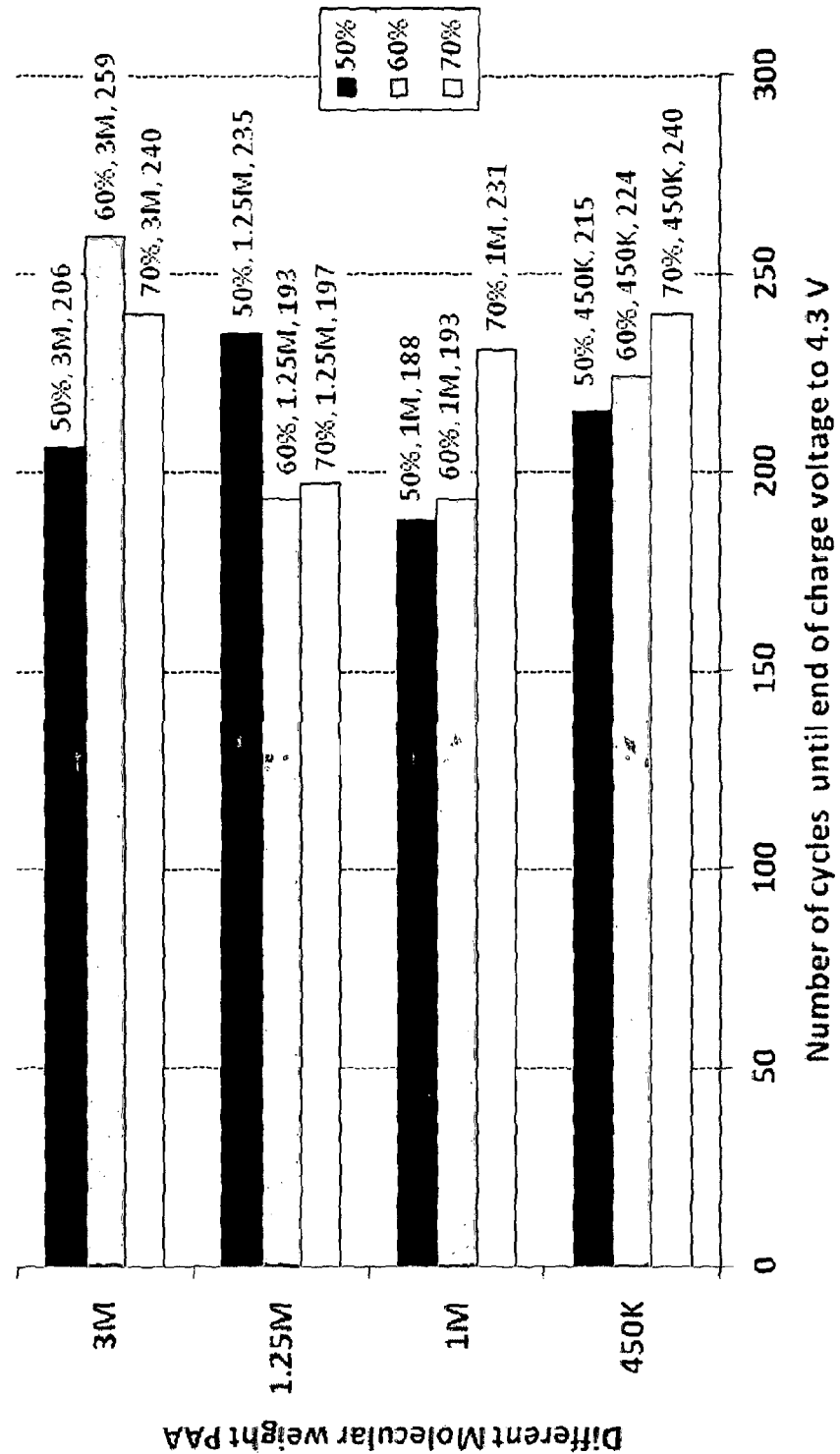
FIG. 1a is a bar chart comparing the average number of cycles achieved by a cell before the end of charge voltage reaches 4.3V where the cells comprise different molecular weights of sodium polyacrylate binder having a degree of neutralisation of 50%, 60% or 70% for each molecular weight.

Preparation of Metal Ion Salts of Polyacrylic Acid

Example 1a

Preparation of Sodium Polyacrylate (70%, 240,000)

Polyacrylic acid (18 g; 0.25M) having a molecular weight of 240,000 was dissolved in water to a concentration of 20%. Sodium carbonate (9.1 g; 0.09M) was added to the solution and stirred using a magnetic follower at room temperature for 3 hours or more to give a sodium polyacrylate binder salt having a molecular weight of 240,000 and a degree of salt formation of 70%.

Example 1b

Preparation of Sodium Polyacrylate (70%, 450,000)

The method of Example 1a was followed, except that polyacrylic acid having a molecular weight of 450,000 was used instead of a polyacrylic acid having a molecular weight of 240,000. The resulting solution comprised the polymeric metal ion carboxylate binder at a concentration of 15 wt %.

Example 1c

Preparation of Sodium Polyacrylate (70%, 1,000,000)

The method of Example 1a was followed, except that polyacrylic acid having a molecular weight of 1,000,000 was used instead of a polyacrylic acid having a molecular weight of 240,000. The resulting solution comprised the polymeric metal ion carboxylate binder at a concentration of 15 wt %.

Example 1d

Preparation of Sodium Polyacrylate (70%, 1,250,000)

The method of Example 1a was followed, except that polyacrylic acid having a molecular weight of 1,250,000 was used instead of a polyacrylic acid having a molecular weight of 240,000. The resulting solution comprised the polymeric metal ion carboxylate binder at a concentration of 1 to 2 wt %.

Example 1e

Preparation of Sodium Polyacrylate Solutions Having a Degree of Salt Formation of Between 1 and 400%

Sodium polyacrylate solutions having a degree of salt formation of between 1 and 400% were prepared by mixing between 0.005 and 4 molar equivalents of sodium ions with one molar equivalent of polyacrylic acid.

Example 1f

Preparation of Polyacrylic Acid Salts of Sodium, Potassium, Lithium and Caesium

Polyacrylic acid salts of lithium, sodium, potassium and caesium were prepared by mixing one molar equivalent of polyacrylic acid with 0.7 molar equivalents of the hydroxide salt of either sodium, potassium, lithium or sodium.

Example 2

Preparation of Electrodes

Example 2a

Preparation of an Electrode Containing Elkem Silgrain HQ Powder as an Active Ingredient Electrodes were manufactured using silicon powder as the active material, a binder as specified in Example 1 and a conductive carbon black in a ratio of silicon active material: binder:carbon black of ranging from 70:12.4:17.7 to 82:10: 7.8. Examples of silicon powder used include Silgrain HQ powders manufactured by Elkem of Norway which include particles having a mean particle diameter of 4.5 μm. The electrodes are made by mixing pre-made polymer solutions with the electrode material in the ratios specified in Table 2.

Specific composite mixes commence with dispersion of the relevant wt % of the Si active material into a 10-15 wt % bead-milled solution of the carbon black (Super P carbon or Denka Black) by shear stirring for 12 hours. The relevant wt % of polymer solution is then added to this and the resulting composite is subjected to Dual Asymmetric Centrifugation dispersion for 20 minutes.

Further electrodes were manufactured using a composition comprising silicon powder, PAA binder, graphite (SFG6) and a conductive carbon (carbon nanotubes, vapour grown carbon fibres and carbon black (5:5:2)) in a ratio of 70:14:12:4. Examples of silicon powder used include Silgrain HQ powders manufactured by Elkem of Norway which include particles having a mean particle diameter of 2 µm, 4.5 µm and 13.45 µm. The electrodes are made by mixing pre-made polymer solutions with the electrode material in the ratios specified in Table 1b. Specific composite mixes commence with dispersion of the relevant wt % of the Si active material into a 10-15 wt % bead-milled solution of the carbon black mixture (including Super P carbon or Denka Black) by shear stirring for 12 hours. The relevant wt % of polymer solution is then added to this and the resulting composite is subjected to Dual Asymmetric Centrifugation dispersion for 20 minutes.

Alternatively the carbon black or carbon black mixture may be dispersed into the polymer solution by shear stirring. The silicon material is then added to polymer/carbon mix with a further shear stirring step.

The resultant mix is deposited as a thin 'wet' film onto a copper foil substrate using a draw down blade. The deposited film is left to dry (preferably on a hot-plate at 50 to 70° C.) such that all the solvent (water or organics) is removed to leave the dried composite electrode adhered to the copper foil substrate, which acts as a current collector in the battery cell.

Batteries (full cells) were prepared by incorporating the silicon, polymer binder material and carbon (optionally including graphite) into a cell with a mixed metal oxide ($LiNiCoAlO_2$) counter electrode, a microporous separator (Tonen®) and an electrolyte in the form of 1.2 mol $dm^{-3}$ lithium hexafluorophosphate in an ethylene carbonate/ethyl methyl carbonate mixture. Discrete samples of the dried composite electrode (containing the silicon, polymer and carbon) of an approximate area of 15 $cm^2$ were assembled in a dry environment with a similar sized area of mixed metal oxide electrode between which was placed a microporous separator. The cell structure was soaked in the electrolyte solution prior to heat sealing in an aluminium laminate packaging material such that composite electrode and metallic lithium counter electrode could be connected externally via two terminals. The cells were tested for first cycle losses (FCL) by measuring the difference between the charge and discharge capacity (a product of the current and time) for the first charge/discharge cycle of the cell.

Half cells were prepared as above except lithium metal was used instead of a mixed metal oxide cathode.

The number of charge/discharge/cycles that could be performed reversibly before the capacity of the cell had reached less than 50% of the initial charge capacity was recorded on a computer controlled battery test station. The computer measures the charge and discharge capacity for each cycle and determines the cycle number at which the discharge capacity is less than 50% of the maximum discharge capacity.

Example 2b

Preparation of an Electrode Containing Pillared Particles of Silicon as an Active Ingredient Electrodes and batteries were manufactured in accordance with the procedure set out in Example 2a above, except that the active material comprised pillared particles having a diameter ($d_{50}$) of 11.1 µm made according to the procedure disclosed in WO2009/010758.

Example 2c

Preparation of an Electrode Containing Silicon Fibres as an Active Ingredient

Electrodes and batteries were manufactured in accordance with the procedure set out in Example 2a above, except that the active material comprised silicon fibres made according to the procedure disclosed in WO2009/010758.

Cell Cycling Parameters

Chemical analysis of Jetmilled Silgrain® HQ (used as the starting material in the preparation of pillared particles and fibres described in WO2009/010758) from a batch analysis reported as below

| Analysis: | Si wt % | Fe wt % | Al wt % | Ca wt % | Ti wt % |
| --- | --- | --- | --- | --- | --- |
| Max | 99.7 | 0.05 | 0.12 | 0.02 | 0.003 |
| Min | 99.6 | 0.03 | 0.09 | 0.01 | 0.001 |
| Typical | 99.6 | 0.04 | 0.11 | 0.02 | 0.0021 |

Half cells were charged and discharged at C/25 for the first cycle between 1 and 0.005V. Thereafter the cells were charged and discharged (cycled) between 1 and 0.005V for subsequent cycles at a charging rate of C/5.

Full cells were charged and discharged at C/25 for the first cycle between 4.2 and 3V. Thereafter the cells were cycled between 4.1 and 3V at a charging rate of C/3.

The effect of binder weight, degree of salt formation, structure of the electroactive silicon material, neutralisation agent, amount of silicon present and the composition of the electrode material on the physical and electrical properties of the cell was examined. In particular, the cycle life (number of cycles that could be performed reversibly before the capacity of the cell had reached less than 50% of the initial charge (D50)) (was recorded and is set out in the tables below.

Results 1

The effect that the binder weight and the degree of salt formation had on the cycle life of a full cell comprising a $LiNiCoAlO_2$ cathode and an anode comprising an electrode mixture comprising silicon pillared particles, graphite and a binder in the proportions shown below was investigated. The results are set out in Table 2 below.

TABLE 2

Effect of Molecular Weight of PAA binder on Cell Life of a cell including a composite silicon-comprising electrode including NaPAA as binder. All cells were charged to 1200 mAh/g at a charging rate of C/1. It can be seen that silicon based cells comprising silicon pillared particles (ppSi) including a NaPAA binder having a molecular weight of 3,000,000 and a degree of neutralisation of 70% exhibit better cycling performance compared to cells comprising NaPAA binders having a similar neutralisation degree and a lower molecular weight.

| MW of PAA Binder | Degree of neutralisation ($Na_2CO_3$) | Silicon Structure | Characteristics of Silicon structure | Composition of Composite Material Si:binder:carbon | Cathode Type | D50 | Coat Weight |
|---|---|---|---|---|---|---|---|
| 240,000 | 70 | ppSi | Elkem Silgrain HQ $d_{50}$ = 24 μm BET = 26.6 $m^2/g$ | 72:12:16 | $LiNiCoAlO_2$ | 100+ | 10 |
| 450,000 | 70 | ppSi | From Elkem Silgrain HQ $d_{50}$ = 13.5 μm BET = 10.8 $m^2/g$ | 70:14:16 | $LiNiCoAlO_2$ | 250+ | 15 |
| $1.25 \times 10^6$ | 70 | ppSi | From Elkem Silgrain HQ $d_{50}$ = 13.5 μm BET = 10.8 $m^2/g$ | 70:14:16 | $LiNiCoAlO_2$ | 270+ | 15 |
| $3 \times 10^6$ | 70 | ppSi | From Elkem Silgrain HQ $d_{50}$ = 13.5 μm BET = 20.2 $m^2/g$ | 70:14:16 | $LiNiCoAlO_2$ | 300+ | 15 |

Results 2

The effect that the binder weight and the degree of salt formation had on the cycle life of a half cell comprising a Li metal cathode and an anode comprising an electrode mixture comprising silicon pillared particles, graphite and a binder in the proportions shown below was investigated. The results are set out in FIGS. 1a and 1b below. From FIG. 1a (where the labels for each bar indicate the % degree of neutralisation, the molecular weight and number of cycles) it can be seen that cells comprising a ppSi based electrode including a NaPAA binder having a degree of neutralisation of 70% exhibit superior cycling performance over cells comprising an NaPAA binder having a degree of neutralisation of 50 or 60% for NaPAA molecular weights of from 450,000 to 1,250,000. However, a cell comprising a silicon based anode including a NaPAA binder having a degree of neutralisation of 60% and a molecular weight of 3,000,000 outperforms both the 50% and 70% neutralised NaPAA (3,000,000) and all other NaPAA binders irrespective of their degree of neutralisation.

Figure 1B:
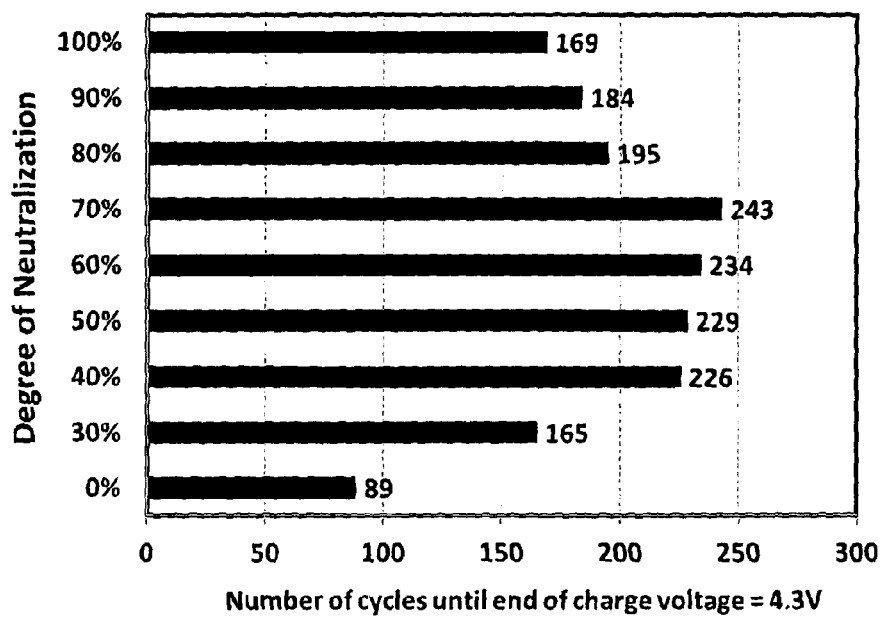
FIG. 1b is a bar chart comparing the average number of cycles achieved by a cell before the end of charge voltage reaches 4.3V where the cells comprise sodium polyacrylate binder with a molecular weight of 450,000 and having a degree of neutralisation varying from 0 to 100%.

FIG. 1b illustrates the superior cycling characteristics associated with cells comprising an NaPAA binder having a molecular weight of 3,000,000 and a degree of neutralisation of 70% compared with cells comprising a similar binder having a molecular weight of 450,000. The composite material comprises silicon pillared particles having a d50 of 11.1 μm, NaPAA binder having a degree of neutralisation of 70%, graphite (SFG6) and a mixture of conductive carbons (5:5:2 vapour grown carbon fibres, carbon nano-tubes and carbon black).

Results 3

The effect that the degree of neutralisation of a PAA binder having a molecular weight of 450,000 had on the cycle life of a full cell prepared as described above was investigated and the results are presented in Table 3a below. An anode composition comprising silicon pillared particles, a NaPAA binder and carbon black was used.

TABLE 3a

Effect of Degree of neutralisation on Cell life of a cell including a composite silicon-comprising electrode including a NaPAA binder and a $LiNiCoAlO_2$ cathode. All cells were charged to 1200 mAh/g at a charging rate of C/1. From the table it can be seen that cells including anodes comprising a composite material comprising a silicon pillared particle, a NaPAA binder having a degree of neutralisation of 70% and carbon black exhibit superior cycling performance compared to cells comprising a similar composition comprising a NaPAA binder having a degree of neutralisation of 100%.

| MW of PAA Binder (1000s) | Degree of neutralisation (Na2CO3) | Silicon Structure | Characteristics of Silicon structure | Composition of Composite Material Si:Binder:Carbon | D50 | Coat Weight |
|---|---|---|---|---|---|---|
| 450 | 100 | ppSi | From Elkem Silgrain HQ $d_{50}$ = 13.5 μm BET = 10.8 $m^2/g$ | 70:14:16 | 170 | 15 |
| 450 | 70 | ppSi | From Elkem Silgrain HQ $d_{50}$ = 13.5 μm BET = 10.8 $m^2/g$ | 70:14:16 | 250 | 15 |

Results 4

A further study into the effect that the degree of neutralisation had on cycle life was carried out using a series of full cells, each comprising an LiNiCoAlO$_2$ cathode and an anode including a composite anode material comprising silicon pillared particle ($d_{50}$=11.1 µm), NaPAA binder (MW=450,000), graphite (SFG6) and a conductive carbon (a 5:5:2 mixture of carbon nanotubes, vapour grown carbon fibres and carbon black) in a ratio 70:14:12:4. All cells were charged to 1200 mAh/g at a charging rate of C/1. The results (giving the average cell value for the number of cycles before the end of charge reaches the limit for the cathode of 4.3V) are shown in table 3b below.

A similar study comparing the capacity retention of a series of full cells, each comprising an LiNiCoAlO$_2$ cathode and an anode including a composite anode material comprising silicon pillared particle ($d_{50}$=11.1 µm), a NaPAA binder (having a MW of either 450,000 or 3,000,000 and a degree of neutralisation of 70%), graphite (SFG6) and a conductive carbon (a 5:5:2 mixture of carbon nanotubes, vapour grown carbon fibres and carbon black) in a ratio 70:14:12:4 was carried out. The results are shown in FIG. 2.

| MW of PAA Binder | Degree of Neutralisation (%) (Na$_2$CO$_3$) | Number of cycles to 4.3 V | Peel Strength (mN/cm) |
|---|---|---|---|
| 450,000 | 0 | 89 | 24 |
| 450,000 | 30 | 165 | |
| 450,000 | 40 | 226 | 115 |
| 450,000 | 50 | 229 | 430 |
| 450,000 | 60 | 234 | 522 |
| 450,000 | 70 | 243 | 322 |
| 450,000 | 80 | 195 | 326 |
| 450,000 | 90 | 184 | 106 |
| 450,000 | 100 | 169 | 202 |

Table 3b shows that both the cycling performance and Peel Test strength increase as the degree of netralisation increases from 0 to 60%. The cycling performance peaks at 70%. Both parameters decrease as the degree of neutralisation increases to 100%. It would therefore appear that the degree of neutralisation is an important factor affecting both the cycling performance of a cell comprising a composite material including that binder. The adhesion of the composite material to the underlying curren collector is also significantly affected.

Figure 2:
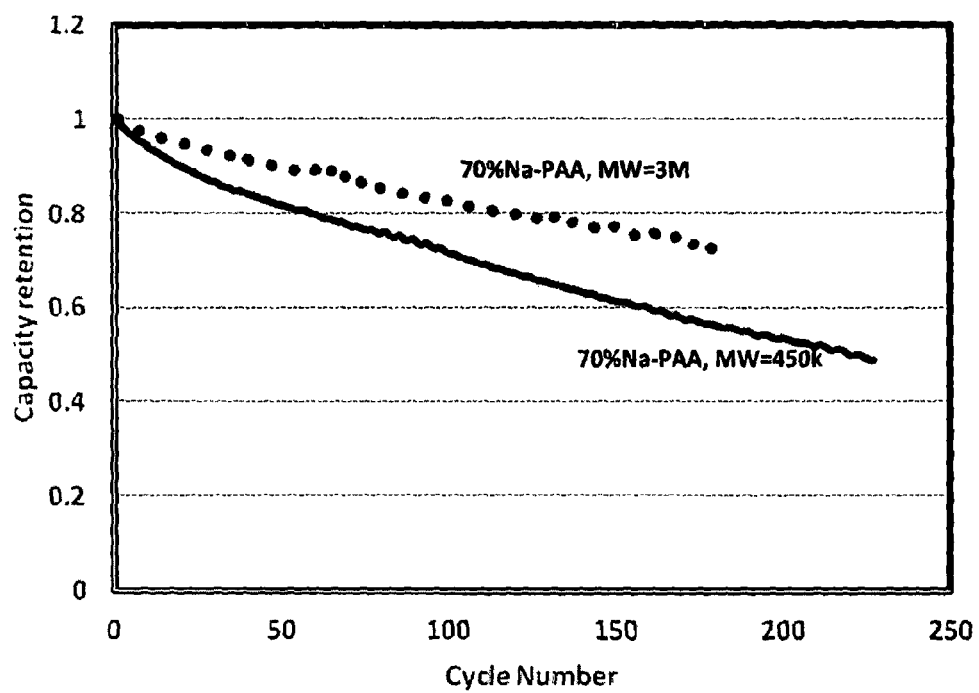
FIG. 2 is a graph of the capacity retention (%) vs the cycle number for cells comprising sodium polyacrylate binder having a molecular weight of either 450,000 or 3,000,000 and a degree of neutralisation of 70%.

FIG. 2 shows that the capacity retention for cells prepared using a NaPAA binder having a molecular weight of 3,000,000 are superior to those of cells prepared using a NaPAA binder having a molecular weight of 450,000 at 70% neutralisation.

Results 5

The effect of silicon structure on the cycle life of full and half cells is illustrated in Tables 4a and 4b below.

TABLE 4a

Effect of Silicon Structure on Cell life of a full cell prepared as described above including a composite silicon-comprising electrode comprising a NaPAA binder and a LiNiCoAlO$_2$ cathode. All cells were charged to 1200 mAh/g at a charging rate of C/1.

| MW of PAA Binder | Degree of neutralisation | Silicon Structure | Characteristics of Silicon Structure | Composition of Composite Material Si:Binder:carbon | D50 | Coat Weight |
|---|---|---|---|---|---|---|
| 450 k | 70 | ppSi | From Elkem Silgrain HQ $d_{50}$ = 13.5 µm BET = 10.8 m$^2$/g | 70:14:16 | 250 | 15 |
| 450 k | 70 | Silgrain HQ (Elkem) | BET = 0.697 m$^2$/g | 70:14:16 | 100 | |
| 450 k | 70 | Silgrain HQ | Elkem Silgrain HQ $d_{50}$ = 4.5 µm BET = 5.2 m$^2$/g | 74:13:13 | 390 | 14 |
| 450 k | 70 | fSi | 10-11.5 m$^2$/g | 74:13:13 | 275 | 15 |

From Table 4a it can be seen that an improved cycle life can be achieved through the use of metallurgical grade silicon powder. The use of pillared silicon particles and silicon fibres also gives encouraging results.

TABLE 4b

Effect of Silicon Structure on cycle life of a half cell including a composite silicon-comprising electrode comprising a NaPAA binder and a Li cathode. All cells comprised silicon, a NaPAA binder (450,000 or 3,000,000 having a degree of neutralisation of 70%), SFG6 graphite and a mixture of conductive carbon species comprising 5:5:2 mixture of carbon nanotubes, vapour grown carbon fibres and carbon black.

| MW of PAA Binder (1000's) | Degree of Neutralisation (%) & neutralisation agent | Silicon Structure | Characteristics of Silicon Structure | Composition of composite material Si:Binder:carbon | Coat weight gsm | First Cycle Efficiency | Efficiency over 2-50 cycles (%) | Viscosity of Electrode Mix (mPa · s) and solids content (%) | Conductivity (S/cm) and Peel Strength (mN/cm) |
|---|---|---|---|---|---|---|---|---|---|
| 450 | 70, Na$_2$CO$_3$ | Pillared particle | $D_{10}$ = 6.1 µm $D_{50}$ = 11.1 µm $D_{90}$ = 19.9 µm BET = 23-51 m$^2$/g | 70:14:12:4 | 6.0 | 99.5% | 90.5% | 2487 (34.79%) | 0.324 S/cm 132 mN/cm |

TABLE 4b-continued

Effect of Silicon Structure on cycle life of a half cell including a composite silicon-comprising electrode comprising a NaPAA binder and a Li cathode. All cells comprised silicon, a NaPAA binder (450,000 or 3,000,000 having a degree of neutralisation of 70%), SFG6 graphite and a mixture of conductive carbon species comprising 5:5:2 mixture of carbon nanotubes, vapour grown carbon fibres and carbon black.

| MW of PAA Binder (1000's) | Degree of Neutralisation (%) & neutralisation agent | Silicon Structure | Characteristics of Silicon Structure | Composition of composite material Si:Binder:carbon | Coat weight gsm | First Cycle Efficiency | Efficiency over 2-50 cycles (%) | Viscosity of Electrode Mix (mPa·s) and solids content (%) | Conductivity (S/cm) and Peel Strength (mN/cm) |
|---|---|---|---|---|---|---|---|---|---|
| 450 | 70, NaOH | Silgrain HQ | $D_{10}$ = 2.8 µm<br>$D_{50}$ = 4.7 µm<br>$D_{90}$ = 7.6 µm<br>BET = 5.2 m$^2$/g | 70:14:12:4 (half cell) | 5.6-6.0 | 90% | 99% | 2900 mPa·s (32%) | 0.32 S/cm |
| 450 | 70, NaOH | Silgrain HQ | $D_{50}$ = 2 µm | 70:14:12:4 (half cell) | 5.8-6 | 90.5% | 99.5% | 2200 mPa·s (33%) | 0.045 s/cm |
| 450 | 70, NaOH | Silgrain HQ | $D_{10}$ = 8.25 µm<br>$D_{50}$ = 13.45 µm<br>$D_{90}$ = 21.77 µm<br>BET = 1.68 m$^2$/g | 70:14:12:4 (half cell) | 5.8-6.4 | 88% | 89% | 14500 mPa·s (40%) | 0.5 S/cm<br>620 mN/cm |
| 450 | 70, NaOH | fSi (fibre) | D = 100-900 nm (av. 330 nm)<br>Length = 1.35-8.5 µm;<br>av. 4.25 µm<br>BET = 144.9 m$^2$/g | 70:14:12:4 (half cell) |  | 65.9% | 99.6% | 5350 mPa·s (28%) |  |
| 3000 | 70 Na$_2$CO$_3$ | Pillared particle | $D_{10}$ = 6.1 µm<br>$D_{50}$ = 11.1 µm<br>$D_{90}$ = 19.9 µm<br>BET = 23-51 m$^2$/g | 70:14:12:4 |  | 95% | 95% | 9991 mPa·s (21%) | 0.636 S/cm<br>123.5 mN/cm |
| 3000 | 70, NaOH | Silgrain HQ | $D_{10}$ = 2.8 µm<br>$D_{50}$ = 4.7 µm<br>$D_{90}$ = 7.6 µm<br>BET = 5.2 m$^2$/g | 70:14:12:4 (half cell) | 6.0-6.7 | 90% | 99.5% | 21600 mPa·s (28.5%) | 0.38 S/cm<br>380 mN/cm |
| 3000 | 70, NaOH | Silgrain HQ | $D_{50}$ = 2 µm | 70:14:12:4 (half cell) | 5.8-6.5 | 89.4% | 99.4% | 15250 mPa·s (28%) | 0.15 S/cm<br>325 mN/cm |
| 3000 | 70, NaOH | Silgrain HQ | $D_{10}$ = 8.25 µm<br>$D_{50}$ = 13.45 µm<br>$D_{90}$ = 21.77 µm<br>BET = 1.68 m$^2$/g | 70:14:12:4 (half cell) | 6.6 | 89% | 98.5% | 23150 mPa·s 36% | 1.5 S/cm<br>462 mN/cm |
| 3000 | 70, NaOH | fSi (fibre) | D = 100-900 nm (av. 330 nm)<br>Length = 1.35-8.5 µm;<br>av. 4.25 µm<br>BET = 196.8 m$^2$/g | 70:14:12:4 (half cell) |  | 71% | 99.0% | 1500 mPa·s (21.8%) | 0.0136 S/cm |

From Table 4b it can be seen that cells comprising anodes including a NaPAA binder having a molecular weight of 3,000,000 exhibited (overall) improved conductivity and Peel Test strength compared to cells comprising anodes including a NaPAA binder having a molecular weight of 450,000.

Results 6

The effect that a neutralising agent has on the cycle life of a series of full cells, each comprising an LiNiCoAlO$_2$ cathode and an anode including a composite anode material comprising silicon powder particles having the composition as set out in Table 5 was investigated. The results are shown in Table 5 and FIG. 3 below.

TABLE 5

Effect of Neutralisation Agent on the Cell life of a cell including a composite silicon-comprising electrode comprising a NaPAA binder and a LiNiCoAlO2 cathode. All cells were charged to 1200 mAh/g at a charging rate of C/1. From the results presented in Table 5 it can be seen that cells comprising a NaPAA binder neutralised with sodium exhibit superior cycling performance to those neutralised with lithium.

| MW of Binder | Neutralising Agent (degree) | Si Type | Characteristics of Si Structure | Composition of Composite Material Silicon:Binder:Carbon | D50 | Coat Weight gsm |
|---|---|---|---|---|---|---|
| 240,000 | Li$_2$CO$_3$ (70%) | Silgrain HQ | $d_{50}$ = 4.5 µm<br>BET = 5.2 m$^2$/g | 76:12:12 | 200 | 19.1 |
| 240,000 | Li$_2$CO$_3$ (70%) | Silgrain HQ | $d_{50}$ = 4.5 µm<br>BET = 5.2 m$^2$/g | 76:12:12 | 100+ | 22.1 |
| 240,000 | Na$_2$CO$_3$ | Silgrain HQ | $d_{50}$ = 4.5 µm<br>BET = 5.2 m$^2$/g | 76:12:12 | 152 | 21.1 |
| 240,000 | Na$_2$CO$_3$ | Silgrain HQ | $d_{50}$ = 4.5 µm<br>BET = 5.2 m2/g | 76:12:12 | 253 | 15.4 |

TABLE 5-continued

Effect of Neutralisation Agent on the Cell life of a cell including a composite silicon-comprising electrode comprising a NaPAA binder and a LiNiCoAlO2 cathode. All cells were charged to 1200 mAh/g at a charging rate of C/1. From the results presented in Table 5 it can be seen that cells comprising a NaPAA binder neutralised with sodium exhibit superior cycling performance to those neutralised with lithium.

| MW of Binder | Neutralising Agent (degree) | Si Type | Characteristics of Si Structure | Composition of Composite Material Silicon:Binder:Carbon | D50 | Coat Weight gsm |
|---|---|---|---|---|---|---|
| 450,000 | $Na_2CO_3$ 70% | Silgrain HQ | $d_{50}$ = 4.5 μm BET = 5.2 m2/g | 76:12:12 | >250 | 15.6 |
| 450,000 | NaOH 70% | Silgrain HQ | $d_{50}$ = 4.5 μm BET = 5.2 m2/g | 76:12:12 | >250 | 15.4 |
| 450,000 | LiOH 70% | Silgrain HQ | $d_{50}$ = 4.5 μm BET = 5.2 m2/g | 76:12:12 | 150 | 15.5 |
| 450,000 | LiOH 100% | Silgrain HQ | $d_{50}$ = 4.5 μm BET = 5.2 m2/g | 76:12:12 | 150 | 15.5 |

Figure 3:
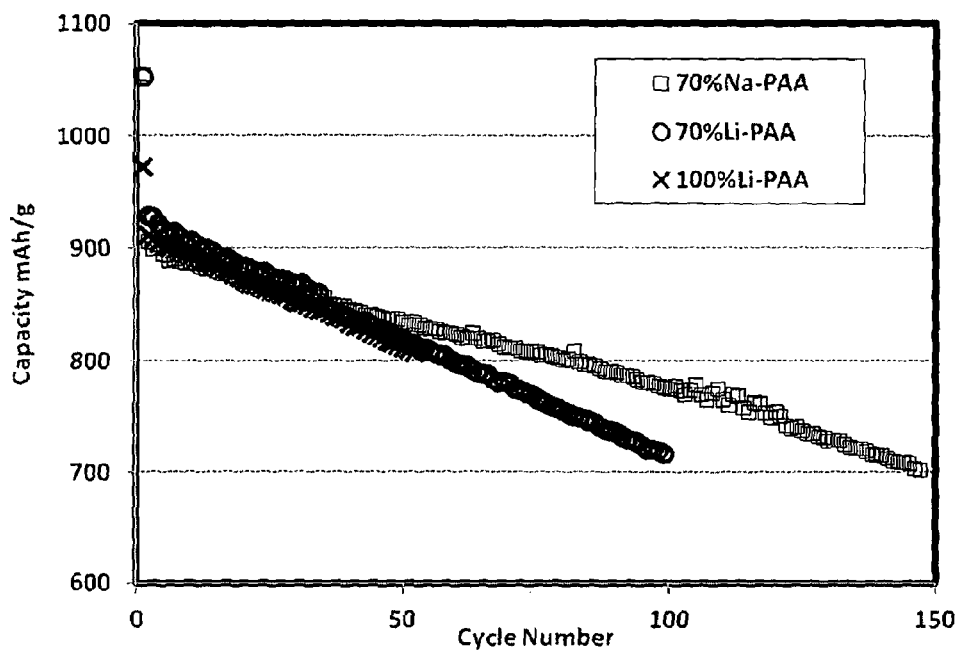
FIG. 3 is a graph of capacity (mAh/cm$^2$ vs the cycle number for cells comprising either a sodium or a lithium polyacrylate binder having a molecular weight of 450,000 and a degree of neutralisation of either 70% or 100%.

From FIG. 3 it can be seen that full cells comprising an anode material including a NaPAA binder having a degree of neutralisation of 70% exhibit superior capacity retention to full cells including LiPAA binders having a degree of neutralisation of either 70% or 100%.

Results 7

The effect that changing the ratio of the silicon material to the other components of the electrode material of an anode comprising an NaPAA binder and a LiNiCoAlO2 cathode was investigated. The results are shown in Table 6 below.

TABLE 6

Effect of Composition of Composite Electrode Material on Cell Life. All cells were charged to 1200 mAh/g at a charging rate of C/1. From the table it can be seen that compositions comprising silicon powder exhibit better cycling performance when the proportion of silicon in the electrode mix is between 70 and 76 parts in 100. When the electrode material comprises silicon pillared particles, cells including these pillared particles are able to undergo more than 200 cycles before 50% capacity is reached, irrespective of the proportion of silicon present.

| MW of Binder (1000s) | Neutralising Agent | Si Type | Characteristics of Si Structure | Composition of Composite Material Silicon:Binder:Carbon | D50 | Coat Weight gsm |
|---|---|---|---|---|---|---|
| 240 | $Na_2CO_3$ | Silgrain HQ | $d_{50}$ = 4.5 μm BET = 5.2 $m^2$/g | 70:12.4:17.7 | 120 | 18 |
| 240 | $Na_2CO_3$ | Silgrain HQ | $d_{50}$ = 4.5 μm BET = 5.2 $m^2$/g | 70:17:13 | 122 | 19 |
| 240 | $Na_2CO_3$ | Silgrain HQ | $d_{50}$ = 4.5 μm BET = 5.2 $m^2$/g | 72:12.4:15.6 | 111 | 22 |
| 240 | $Na_2CO_3$ | Silgrain HQ | $d_{50}$ = 4.5 μm BET = 5.2 $m^2$/g | 72:15.3:12.7 | 131 | 19.5 |
| 240 | $Na_2CO_3$ | Silgrain HQ | $d_{50}$ = 4.5 μm BET = 5.2 $m^2$/g | 74:12.3:13.7 | 151 | 17 |
| 240 | $Na_2CO_3$ | Silgrain HQ | $d_{50}$ = 4.5 μm BET = 5.2 $m^2$/g | 74:14.2:11.8 | 145 | 18 |
| 240 | $Na_2CO_3$ | Silgrain HQ | $d_{50}$ = 4.5 μm BET = 5.2 $m^2$/g | 76:12:12 | 233 | 21 |
| 240 | | | | | 223 | 18.9 |
| 240 | $Na_2CO_3$ | Silgrain HQ | $d_{50}$ = 4.5 μm BET = 5.2 $m^2$/g | 78:11.5:10.5 | 171/100 | 17 |
| 240 | $Na_2CO_3$ | Silgrain HQ | $d_{50}$ = 4.5 μm BET = 5.2 $m^2$/g | 80:8.9:11.1 | 100 | 20 |
| 240 | $Na_2CO_3$ | Silgrain HQ | $d_{50}$ = 4.5 μm BET = 5.2 $m^2$/g | 80:11.1:8.9 | 100 | 20 |
| 240 | $Na_2CO_3$ | Silgrain HQ | $d_{50}$ = 4.5 μm BET = 5.2 $m^2$/g | 82:7.4:10.6 | 151 | 18.9 |
| 240 | $Na_2CO_3$ | Silgrain HQ | $d_{50}$ = 4.5 μm BET = 5.2 $m^2$/g | 82:10.2:7.8 | 171 | 17.7 |
| 450 | $Na_2CO_3$ | ppSi | $D_{10}$ = 6.1 μm $D_{50}$ = 11.1 μm $D_{90}$ = 19.9 μm BET = 23-51 $m^2$/g | 70:14:16 (Si:graphite = 70:12) | >200 | |
| 450 | $Na_2CO_3$ | Silgrain HQ ppSi | $D_{10}$ = 6.1 μm $D_{50}$ = 11.1 μm $D_{90}$ = 19.9 μm BET = 23-51 $m^2$/g | 50:14:36 (Si:graphite = 50:32) | >200 | |

TABLE 6-continued

Effect of Composition of Composite Electrode Material on Cell Life. All cells were charged to 1200 mAh/g at a charging rate of C/1. From the table it can be seen that compositions comprising silicon powder exhibit better cycling performance when the proportion of silicon in the electrode mix is between 70 and 76 parts in 100. When the electrode material comprises silicon pillared particles, cells including these pillared particles are able to undergo more than 200 cycles before 50% capacity is reached, irrespective of the proportion of silicon present.

| MW of Binder (1000s) | Neutralising Agent | Si Type | Characteristics of Si Structure | Composition of Composite Material Silicon:Binder:Carbon | D50 | Coat Weight gsm |
|---|---|---|---|---|---|---|
| 450 | $Na_2CO_3$ | Silgrain HQ ppSi | $D_{10}$ = 6.1 μm $D_{50}$ = 11.1 μm $D_{90}$ = 19.9 μm BET = 23-51 $m^2/g$ | 40:14:46 (Si:graphite = 40:42) | >200 | |
| 450 | $Na_2CO_3$ | Silgrain HQ | $D_{10}$ = 6.1 μm $D_{50}$ = 11.1 μm $D_{90}$ = 19.9 μm BET = 23-51 $m^2/g$ | 30:14:56 (Si:graphite = 30:52) | >200 | |

Results 8

The effect that changing the ratio of silicon to graphite in a cell comprising silicon pillared particles as an anode material had on the conductivity, viscosity and peel strength of an electrode material was investigated. The results are shown in Table 7 below:

| NaPAA (MW) | Si material used | Anode Formulation (silicon:binder: graphite:conductive carbon) | Coat thickness gsm | Conductivity S/cm | Peel Strength mN/cm | Viscosity mPa·s |
|---|---|---|---|---|---|---|
| 450,000 (70%) | ppSi BET = 19.9 $m^2/g$ | 70:14:12:4 (Si:graphite = 70:12) | 25 | 0.48 | 2300 | 214 |
| | | 50:14:32:4 (Si:graphite = 50:32) | 30 | 2.34 | 3900 | 139 |
| | | 40:14:42:4 (Si:graphite = 40:42) | 35 | 5.27 | 5000 | 174 |
| | | 30:14:52:4 (Si:graphite = 30:52) | 45 | 7.77 | 5120 | 295 |

From the results set out in table 7 it can be seen that the conductivity and Peel Test strength of a composite material comprising 30 parts silicon and 52 parts graphite is greater than those compositions comprising a higher proportion of silicon. Cells were prepared using silicon pillared particles having a $d_{50}$ of 11.1 μm, NaPAA binder having a molecular weight of 450,000 and a degree of neutralisation of 70%, SFG6 graphite and a conductive carbon mix comprising 5:5:2 mixture of carbon nanotubes, vapour grown carbon fibres and carbon black.

Example 3

The structure and homogeneity of electrodes comprising a copper current collector and a silicon comprising composite active electrode material comprising silicon pillared particles having a d50 value of 11.1 μm; a NaPAA binder having a degree of neutralisation of 70% and a molecular weight of either 450,000 or 3,000,000; SFG6 graphite and a 5:5:2 conductive carbon mixture (carbon nano-tubes, vapour grown carbon fibres and carbon black) in a ratio of 70:14:12:4 were investigated using SEM and EDX techniques.

Example 3a

SEM Characterisation of Electrode Surfaces

Electrode samples were prepared by casting an aqueous dispersion of a composite material comprising a 70:14:12:4 mixture of silicon pillared particles having a d50 value of 11.1 μm, NaPAA having a degree of neutralisation of 70% and a molecular weight of either 450,000 or 3,000,000; SFG6 graphite and a conductive carbon mixture (5:5:2 mixture of carbon nano-tubes, vapour grown carbon fibres and carbon black) onto a copper current collector and drying the dispersion. The slurry comprising the 450,000 NaPAA binder had a viscosity of 2487 mPa·s and a solids content of 34.79%. The slurry comprising the 3,000,000 NaPAA binder had a viscosity of 9991 mPa·s and a solids content of 21%.

Figure 4:
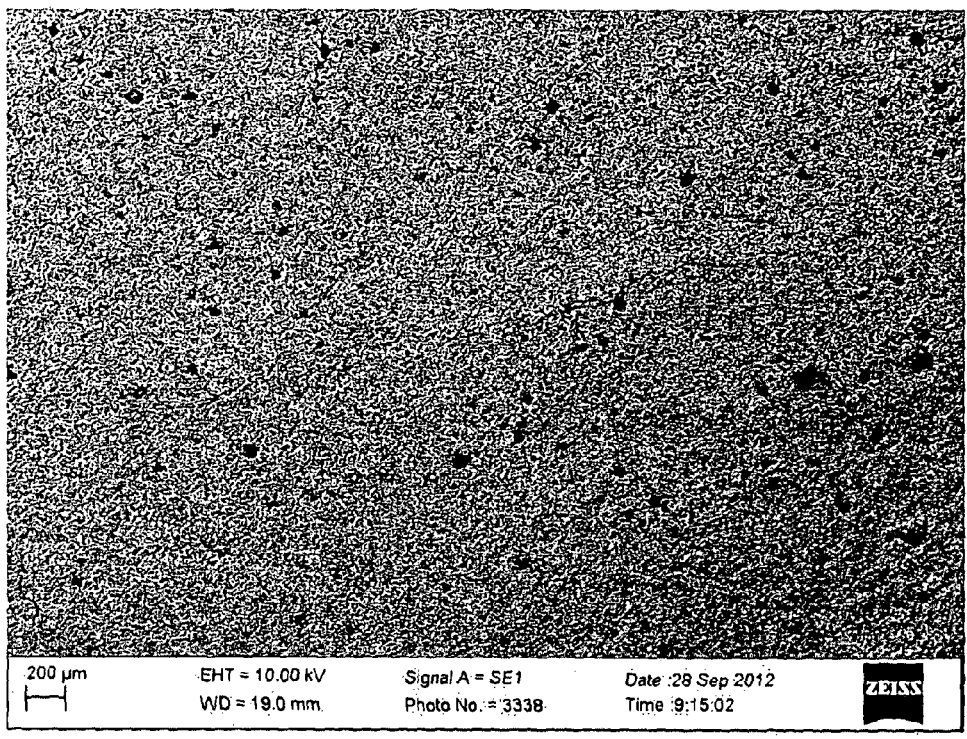
FIGS. 4 to 9 are SEM images of a composite material including the binder according to the invention.
Figure 5:
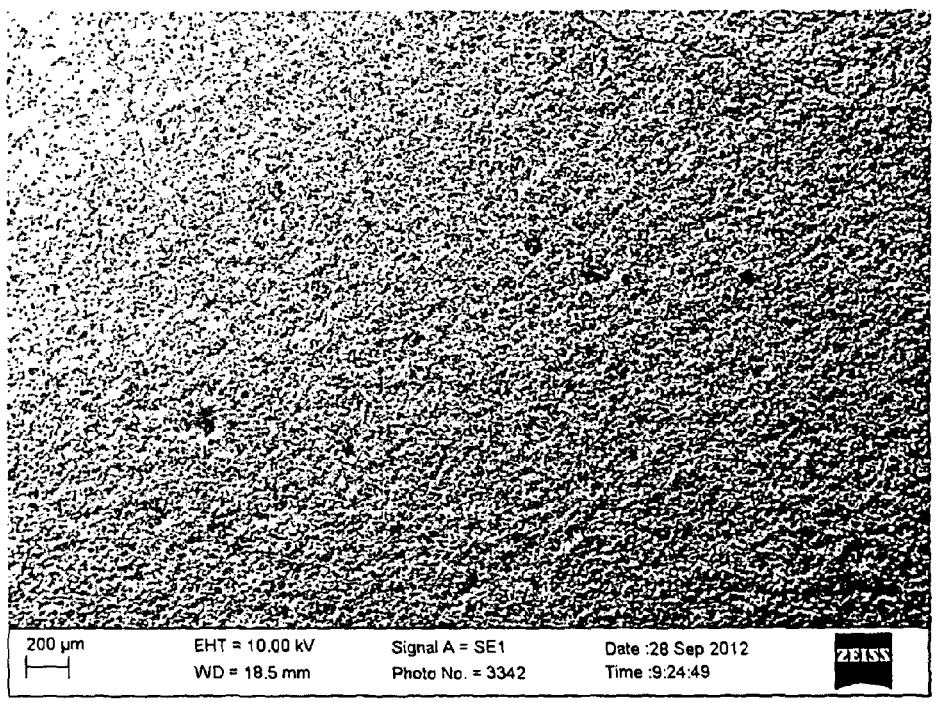
Figure 6:
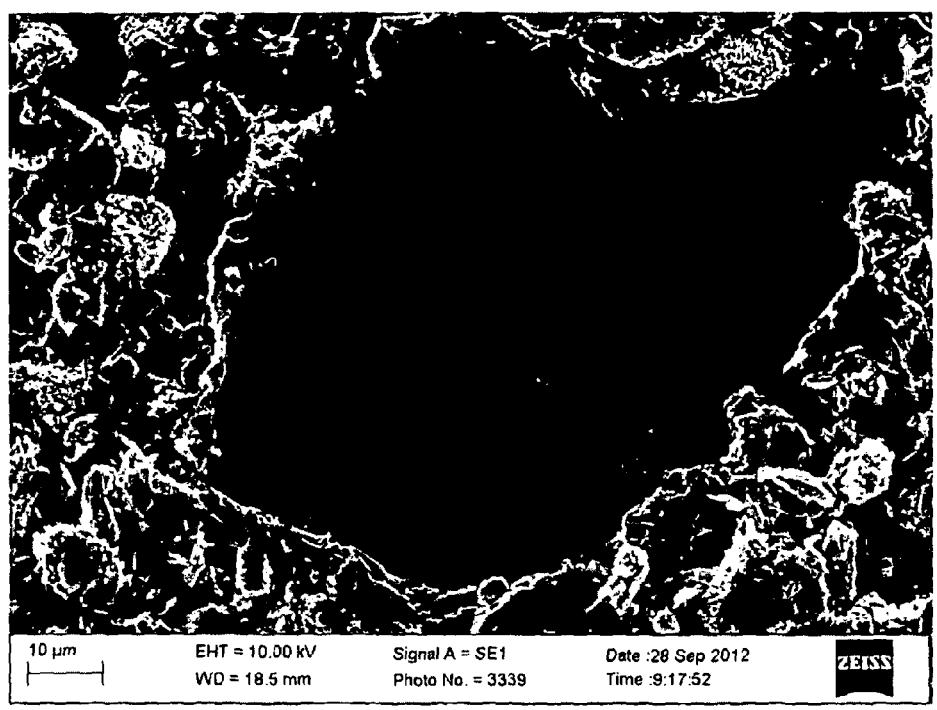
Figure 7:
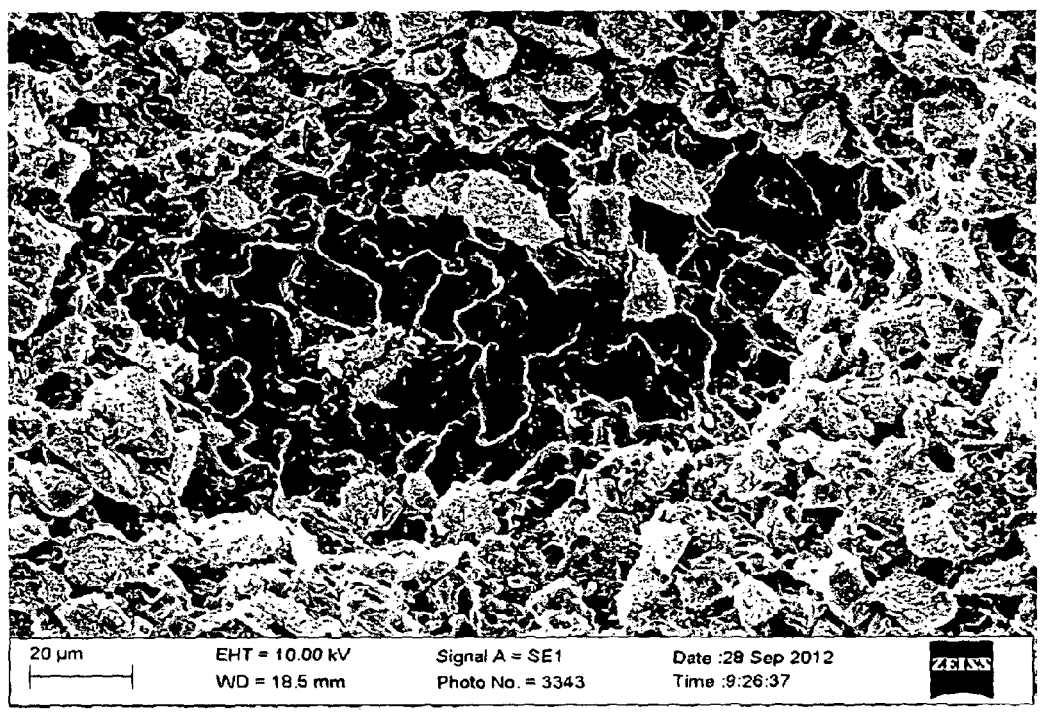

Surface examination of the coating was carried out using SEM (Carl Zeiss EVO 50). The prepared films were dried overnight at 180° C. Sections were cut, adhered to sticky carbon tabs and placed into the SEM vacuum chamber ($10^{-5}$ mBar). The pressure in the vacuum chamber was adjusted to $10^{-7}$ mBar. The samples were then analysed using a gun voltage of 10KV and a current of 1.95 mA. The results are shown in FIGS. 4 and 5. Magnified versions of the figures are illustrated in FIGS. 6 and 7. It can be seen from FIG. 4 that the composite coating comprising the NaPAA binder having a molecular weight of 450,000 had a significant amount of deep pores or craters across the surface. These pores were deep (of the order of 60 μm) (FIG. 6). The composite coating comprising a NaPAA binder having a molecular weight of 3,000,000 (FIG. 5) were characterised by a smooth surface comprising relatively few voids. Some crack formation was observed at the edges of the sample, but this was believed to be associated with sample preparation. The voids that were present in the surface of the electrode material of FIG. 5 were typically of the order of 20 μm deep (FIG. 6), which is far less than the depth of the voids associated with the composite material prepared from the NaPAA having a molecular weight of 450,000.

Figure 8:
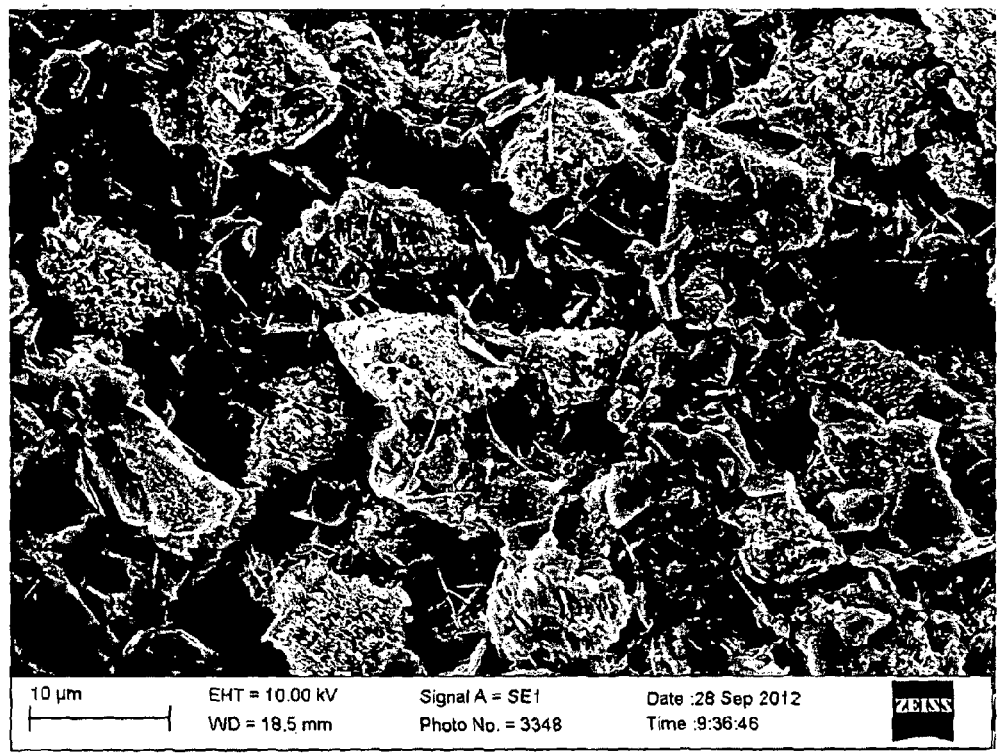
Figure 9:
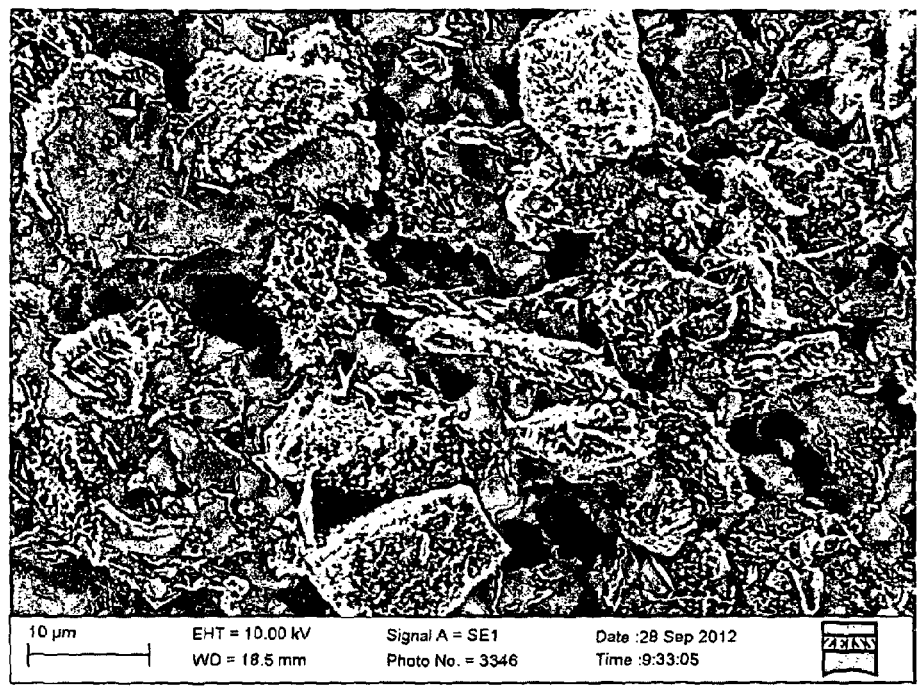

FIGS. 8 and 9 are further SEM images of the composite materials first presented in FIGS. 4 and 5 respectively. It can be seem (from both figures) that the silicon pillared particles are evenly and homogeneously distributed across the surface of the composite material.

Example 3b

EDX Characterisation of a Cross-Section Through an Electrode

Figure 10:
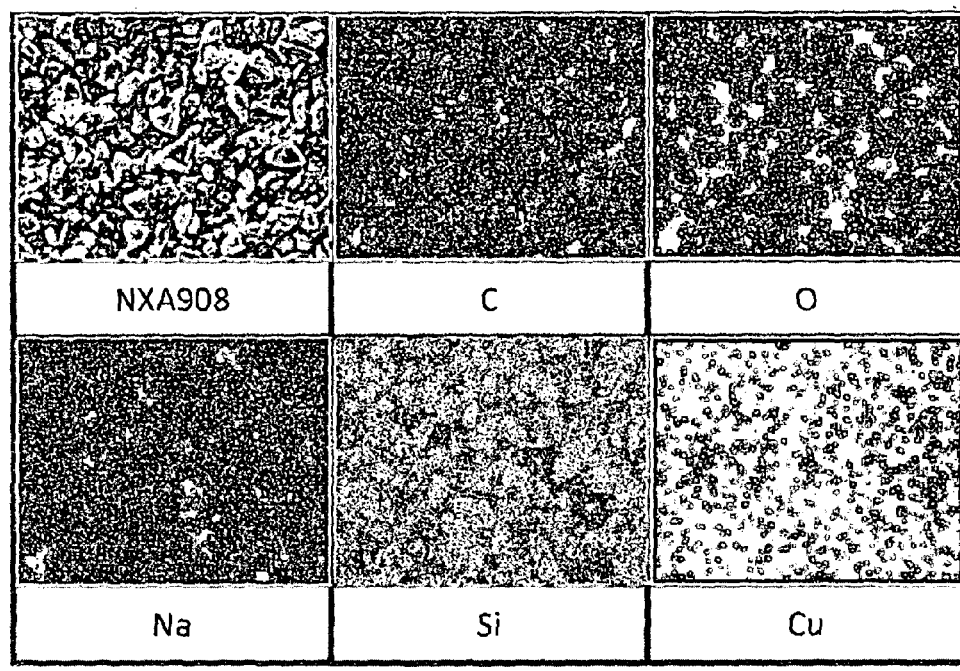
FIGS. 10 and 11 are EDX images of composite materials including the binder according to the invention, showing the distribution of species throughout.
Figure 11:
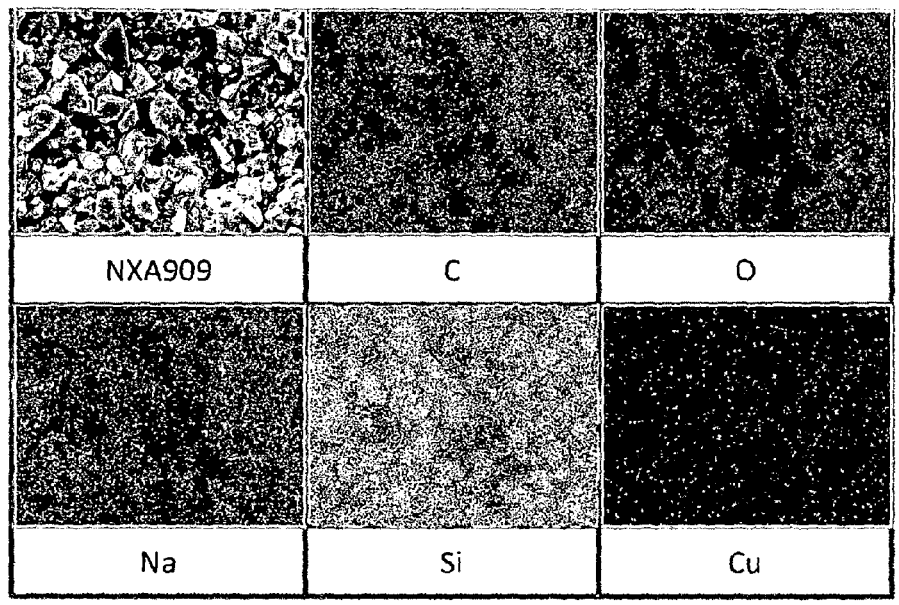

Samples of the electrodes prepared in Example 3a were microtomed to provide a series of cross-sections for cross-sectional analysis using EDX. The samples were analysed for carbon, oxygen, sodium, silicon and copper and the results for the composite material comprising NaPAA having a molecular weight of 450,000 are shown in FIG. 10. The results for the composite material comprising NaPAA having a molecular weight of 3,000,000 are shown in FIG. 11. It is clear from both FIGS. 10 and 11 that carbon, oxygen, sodium and silicon are evenly distributed throughout the cross-section of the composite material indicating that the composite materials for both materials are homogeneous. The results were further supported by SEM analysis of the cross-sections as set out in FIGS. 12 (NaPAA; MW=450,000) and 13 (NaPAA; MW=3,000,000), which show that the components of the composite layer are evenly distributed across the thickness of the composite material.

Example 3c

Conductivity Measurements

The conductivity of a composite material comprising a 70:14:12:4 mixture of silicon pillared particles having a $d_{50}$ value of 11.1 μm, NaPAA having a degree of neutralisation of 70% and a molecular weight of either 450,000 or 3,000,000; SFG6 graphite and a conductive carbon mixture (5:5:2 mixture of carbon nano-tubes, vapour grown carbon fibres and carbon black) coated onto a Mylar® film was measured using a four point conductivity probe, Loresta GP Model MCP-T610 supplied by Mitsubishi chemical analytech, The results are shown in the table below:

| Molecular Weight (PAA) | Solid Content (%) | Viscosity (mPa · s) | Conductivity (S/cm) | Peel Strength (mN/cm) |
| --- | --- | --- | --- | --- |
| 450,000 | 34.7 | 2487 | 0.324 | 132 |
| 3,000,000 | 21 | 9991 | 0.636 | 123.5 |

From the table it can be seen that the composite material comprising NaPAA having a molecular weight of 3,000,000 is characterised by both a higher viscosity and a higher conductivity.

Example 3d

Coating Thickness Measurements

Figure 12:
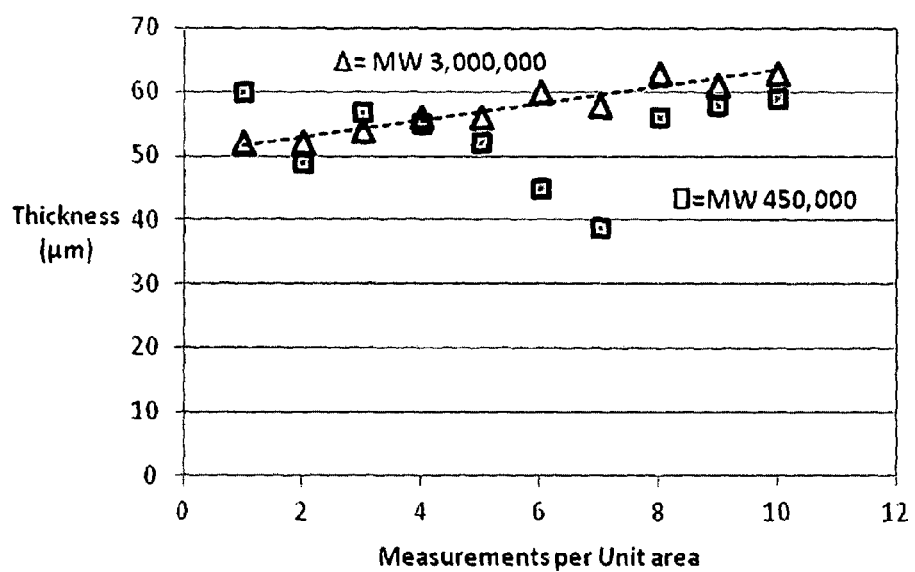
FIG. 12 is a graph of coating thickness vs measurements per unit area for composite materials including the binder according to the invention.
Figure 13:
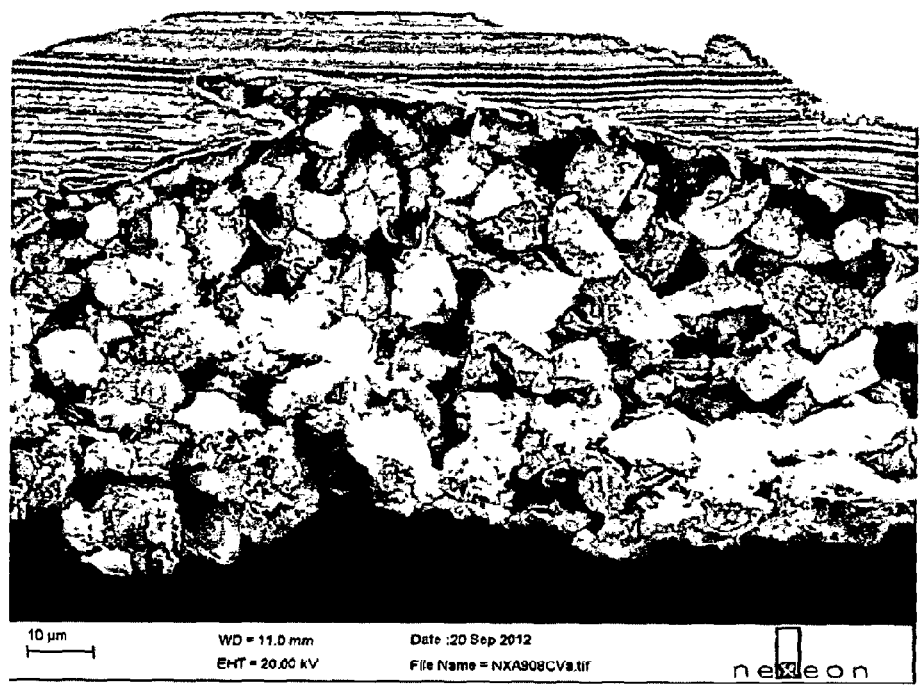
FIGS. 13 and 14 are cross-sectional SEM images through a composite material including a binder according to the invention.
Figure 14:
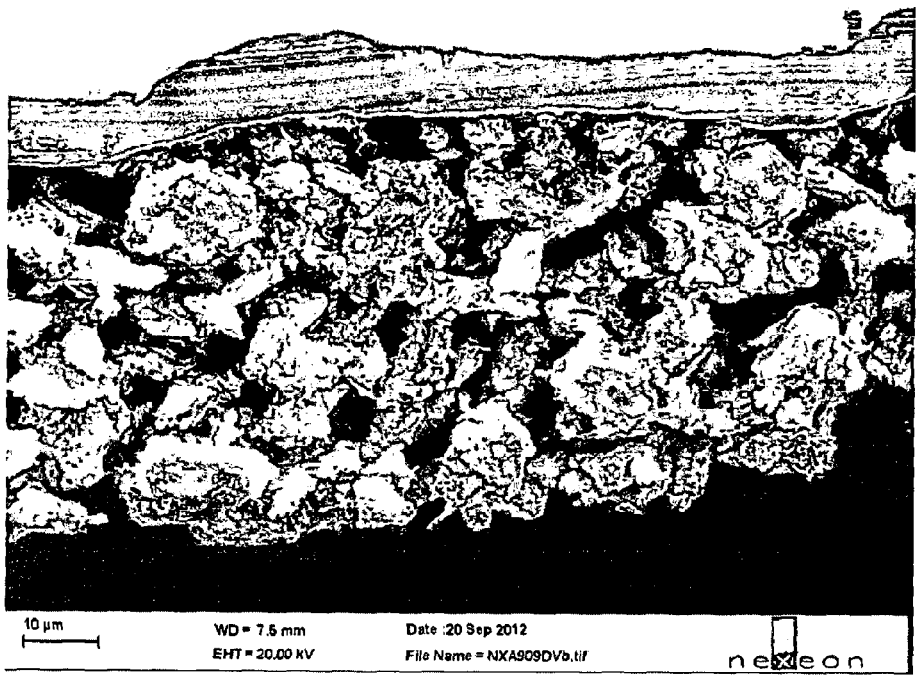

Soft pack pair type electrodes were prepared using a composite material comprising a 70:14:12:4 mixture of silicon pillared particles having a $d_{50}$ value of 11.1 μm, NaPAA having a degree of neutralisation of 70% and a molecular weight of either 450,000 or 3,000,000; SFG6 graphite and a conductive carbon mixture (5:5:2 mixture of carbon nano-tubes, vapour grown carbon fibres and carbon black) as described herein. Using a micrometer, ten measurements were taken over an area corresponding to 14.7 cm². The results are shown in FIG. 12. From the figure it can be seen that the composite material comprising a 3,000,000 molecular weight binder is characterised by a very uniform thickness distribution across the area of the electrode (the thickness varies from 52-62 μm). In contrast, the composite material comprising a 450,000 molecular weight binder is characterised by significant differences in thickness across the area of the electrode (a range of 40-60 μm).

The invention claimed is:

1. A composite electrode material for a rechargeable battery cell, comprising:
    a. an electroactive material comprising silicon; and
    b. a polymeric binder comprising metal ion carboxylate groups and free carboxyl groups, the binder comprising partially neutralized polyacrylic acid;
    characterized in that
        i) the polymeric binder has a number average molecular weight in the range 300,000 to 3,000,000;
        ii) the ratio of the number of metal ion carboxylate groups of the polymeric binder to the sum of the number of metal ion carboxylate groups of the polymeric binder and free carboxyl groups of the polymeric binder is 0.40-0.90; and
        iii) the metal ions of the metal ion carboxylate groups are sodium ions.

2. A composite electrode material according to claim 1, in which the ratio of the number of metal ion carboxylate groups of the polymeric binder to the sum of the number of metal ion carboxylate groups of the polymeric binder and free carboxyl groups of the polymeric binder is 0.60-0.80.

3. A composite electrode material according to claim 1, which further comprises an electroactive carbon selected from graphite, hard carbon, carbon microbeads and graphene, wherein the electroactive carbon constitutes 0 to 70 percent by weight of the total weight of the electroactive materials of the composite electrode material.

4. A composite electrode material according to claim 3, wherein the electroactive material and the electroactive carbon together constitute at least 50 percent by weight of the composite electrode material.

5. A composite electrode material according to claim 1, which comprises 0.5 to 15 percent by weight of the polymeric binder.

6. A composite electrode material according to claim 1, which further comprises 4 to 16 percent by weight of a conductive carbon selected from one or more of carbon black, acetylene black, ketjen black, lamp black, carbon nano-tubes and vapour grown carbon fibres.

7. A composite electrode material according to claim 1, wherein the electroactive material is a structured electroactive material selected from one or more of the structure group consisting of particles, elongate elements, pillared particles, porous particles, porous particle fragments, substrate particles, bundles of elongate elements, and scaffold structures.

8. A composite electrode material according to claim 1, wherein the electroactive material comprises an elongate element selected from the group consisting of fibres, threads, pillars, wires, nano-wires, filaments, tubes, ribbons and flakes.

9. A composite electrode material according to claim 8, wherein the fibre, thread, pillar, filament or wire has an aspect ratio in the range of 5:1 to 1000:1.

10. A composite electrode material according to claim 1, wherein the electroactive material comprises particles having a diameter in the range 1 µm to 20 µm.

11. A composite electrode material according to claim 1, wherein the electroactive material is selected from a ribbon, a flake and a tube having a first dimension in the range of 0.03 µm to 2 µm.

12. A composite electrode material according to claim 1, wherein the electroactive material comprises a pillared particle having an overall diameter in the range 5 to 30 µm and/or a porous particle having a plurality of voids or channels extending therethrough having a maximum diameter of 1 to 40 µm.

13. An electrode for a rechargeable battery comprising a current collector and a composite electrode material according to claim 1.

14. An electrode according to claim 13, wherein the composite electrode material is in the form of a layer adhered to the current collector, said composite electrode material having a thickness of at least 6 µm and no more than 60 µm.

15. An electrode according to claim 13, wherein the composite electrode material has a porosity of at least 10% and no more than 60% in the uncharged state.

16. A cell comprising an electrode according to claim 13 comprising a composite electrode material, a cathode, a separator and an electrolyte.

17. A cell according to claim 16, wherein the composite electrode material of the electrode forms a gel on contact with the electrolyte.

18. A device comprising a cell according to claim 16.

19. A composite electrode material according to claim 1, wherein the electroactive material is silicon or an alloy thereof.

20. A composite electrode material according to claim 1, wherein the electroactive material is silicon of at least 90% purity.

21. A composite electrode material according to claim 1, wherein the composite electrode material comprises at least 50 wt % of the electroactive material and 3-40% of the polymeric binder.

22. A composite electrode material according to claim 6, wherein the conductive carbon is a mixture of carbon nano-tubes, carbon nano-fibres and carbon black.

23. A composite material according to claim 1, wherein the electroactive material comprising silicon further comprises one or more of an organic polymer, a ceramic material, an inorganic semi-conductor and a biologically derived compound.

24. A composite electrode material according to claim 7, wherein the porous particles comprise a random or ordered network of linear, branched or elongate elements, wherein one or more discrete or interconnected void spaces or channels are defined between the elongate elements of the network.

25. A composite electrode material according to claim 7, wherein the elongate elements include structures in which the elongate elements are fused together.

26. A composite electrode material according to claim 1, wherein the electroactive material comprising silicon further comprises one or more carbon materials selected from an amorphous carbon, graphite, electroactive hard carbon, conductive carbon, carbon-based polymers and carbon black, or a conductive ceramic.

27. A composite electrode material according to claim 1, wherein the electroactive silicon material is selected from one or more of a coated particle, a coated pillared particle, a coated porous particle and a coated porous particle fragment.

28. A composite electrode material according to claim 1, wherein the binder further comprises one or more binder species selected from PVDF, SBR, CMC and sodium CMC.

* * * * *